United States Patent
Takatoku et al.

(10) Patent No.: US 9,250,743 B2
(45) Date of Patent: Feb. 2, 2016

(54) SENSOR DEVICE, METHOD OF DRIVING SENSOR ELEMENT, DISPLAY DEVICE WITH INPUT FUNCTION, ELECTRONIC UNIT AND RADIATION IMAGE PICKUP DEVICE

(75) Inventors: Makoto Takatoku, Aichi (JP); Michiru Senda, Aichi (JP)

(73) Assignee: JAPAN DISPLAY INC., Tokyo (JP)

( * ) Notice: Subject to any disclaimer, the term of this patent is extended or adjusted under 35 U.S.C. 154(b) by 1138 days.

(21) Appl. No.: 12/949,221

(22) Filed: Nov. 18, 2010

(65) Prior Publication Data

US 2011/0128428 A1 Jun. 2, 2011

(30) Foreign Application Priority Data

Nov. 27, 2009 (JP) ................. P2009-270424
Oct. 5, 2010 (JP) ................. P2010-225548

(51) Int. Cl.
*G06F 3/042* (2006.01)
*G06F 3/041* (2006.01)
*G06F 3/0488* (2013.01)

(52) U.S. Cl.
CPC .............. *G06F 3/042* (2013.01); *G06F 3/0412* (2013.01); *G06F 3/0416* (2013.01); *G06F 3/0488* (2013.01)

(58) Field of Classification Search
CPC ..... G06F 3/0416; G06F 3/0488; G06F 3/042; G06F 3/0412
See application file for complete search history.

(56) References Cited

U.S. PATENT DOCUMENTS

| 6,476,867 B1 | 11/2002 | Kobayashi et al. |
| 6,855,935 B2 | 2/2005 | Morishita |
| 2002/0180722 A1* | 12/2002 | Yamashita et al. ............ 345/211 |
| 2004/0043676 A1* | 3/2004 | Tada et al. ..................... 439/894 |

(Continued)

FOREIGN PATENT DOCUMENTS

| JP | 08-214177 | 8/1996 |
| JP | 09-092807 | 4/1997 |

(Continued)

OTHER PUBLICATIONS

Hidekazu, Takahashi, JPH 08-214177, Aug. 1996, AIPN Machine Translation, pp. 1-17.*

(Continued)

*Primary Examiner* — Gerald Johnson
*Assistant Examiner* — Maheen Javed
(74) *Attorney, Agent, or Firm* — Dentons US LLP

(57) ABSTRACT

A sensor device includes sensor elements two-dimensionally arranged and a sensor driving section driving the sensor elements. Each of the sensor elements includes a photoelectric conversion element generating electric charge according to an amount of received light, a charge storage section connected to one end of the photoelectric conversion element and storing electric charge generated by the photoelectric conversion element, a readout section reading either a voltage value resulted from the electric charge in the charge storage section or the stored electric charge, to output the read voltage value or the read electric charge and a reset section resetting the electric charge in the charge storage section through supplying a predetermined reset voltage to the charge storage section. The sensor driving section controls the reset section so that the predetermined reset voltage is continuously or intermittently supplied to the charge storage section over a period exceeding one horizontal scan period.

15 Claims, 47 Drawing Sheets

(56) References Cited

U.S. PATENT DOCUMENTS

| | | | |
|---|---|---|---|
| 2004/0218077 A1* | 11/2004 | Petrick et al. | 348/297 |
| 2005/0275626 A1* | 12/2005 | Mueller et al. | 345/156 |
| 2006/0214892 A1* | 9/2006 | Harada et al. | 345/81 |
| 2007/0215969 A1* | 9/2007 | Koide et al. | 257/431 |
| 2009/0147191 A1 | 6/2009 | Nakajima et al. | |
| 2009/0201231 A1* | 8/2009 | Takahara et al. | 345/76 |

FOREIGN PATENT DOCUMENTS

| | | |
|---|---|---|
| JP | 2001-345440 | 12/2001 |
| JP | 2003-134401 | 5/2003 |
| JP | 2004-112768 | 4/2004 |
| JP | 2006-237789 | 9/2006 |
| JP | 2006-276223 | 10/2006 |
| JP | 2007-215030 | 8/2007 |
| JP | 2007-300183 | 11/2007 |
| JP | 2008-233257 | 10/2008 |
| JP | 2008-287061 | 11/2008 |
| JP | 2009-139597 | 6/2009 |
| WO | WO/2009/119417 A1 | 10/2009 |

OTHER PUBLICATIONS

Taiwan Office Action issued in connection with related Taiwan counterpart TW patent application No. TW099138740 dated Mar. 21, 2014.

Rankov, A., et al., "A novel correlated double sampling poly-Si circuit for readout systems in large area X-ray sensors", ISCAS 2005, IEEE International Symposium on Circuits and Systems, 2005, vol. 1, pp. 728-731, May 23-26, 2005.

English Translation of Japanese Office Examination Report issued in connection with related Japanese patent application No. JP 2010-225548 dated Nov. 11, 2014.

English Translation of Japanese Office Examination Report issued in connection with related Japanese patent application No. JP 2010-225548 dated Feb. 12, 2014.

Japanese Office Examination Report issued in connection with related Japanese patent application No. JP 2010-225548 dated Nov. 11, 2014.

Japanese Office Examination Report issued in connection with related Japanese patent application No. JP 2010-225548 dated Feb. 12, 2014.

* cited by examiner

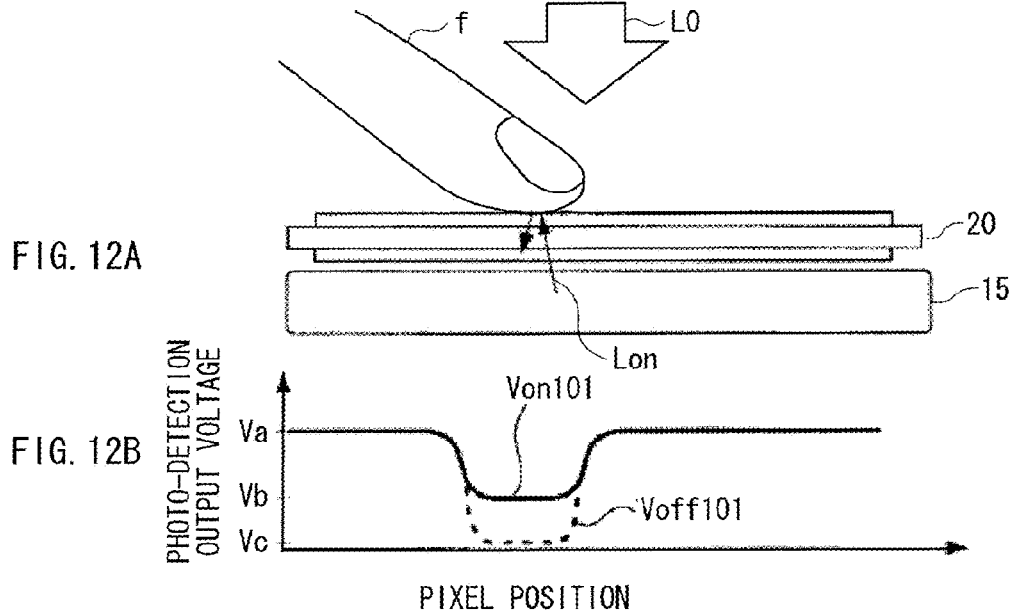
FIG. 12A
FIG. 12B
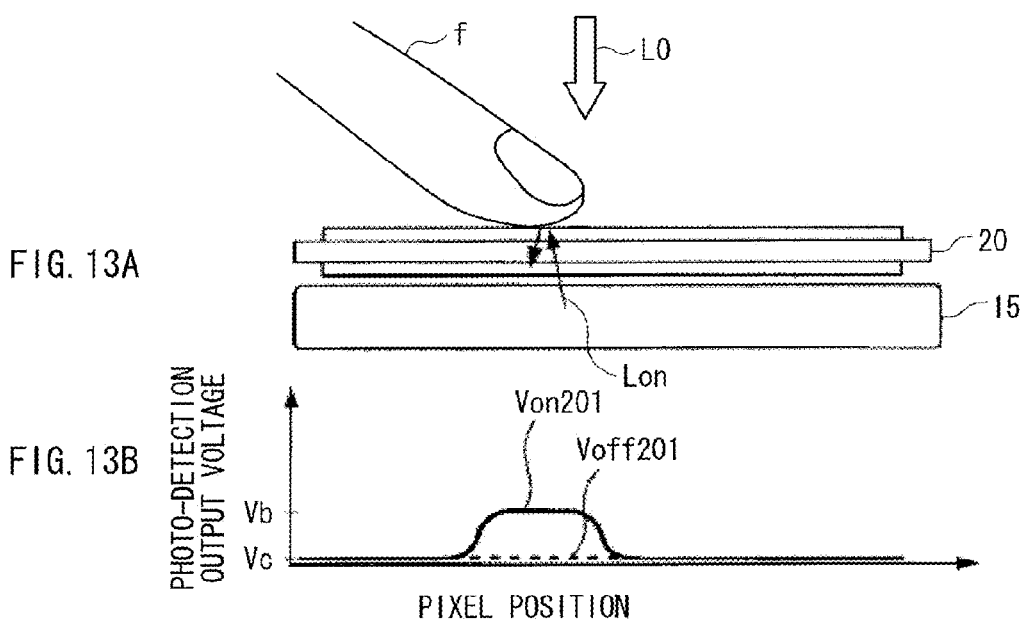
FIG. 13A
FIG. 13B

IMAGE A' (BACKLIGHT OFF)
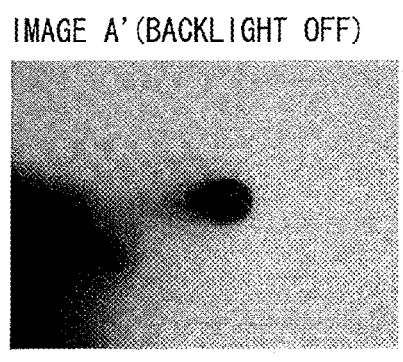
IMAGE B' (BACKLIGHT ON)
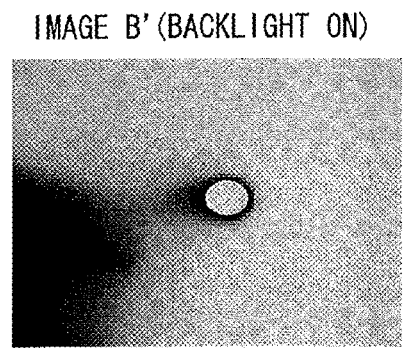
DIFFERENTIAL IMAGE C' (=B'−A')
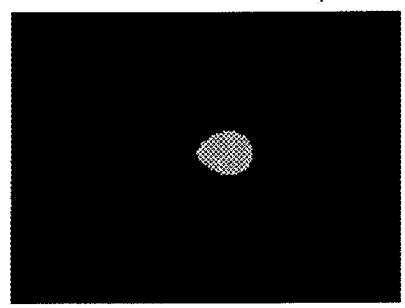
FIG. 14

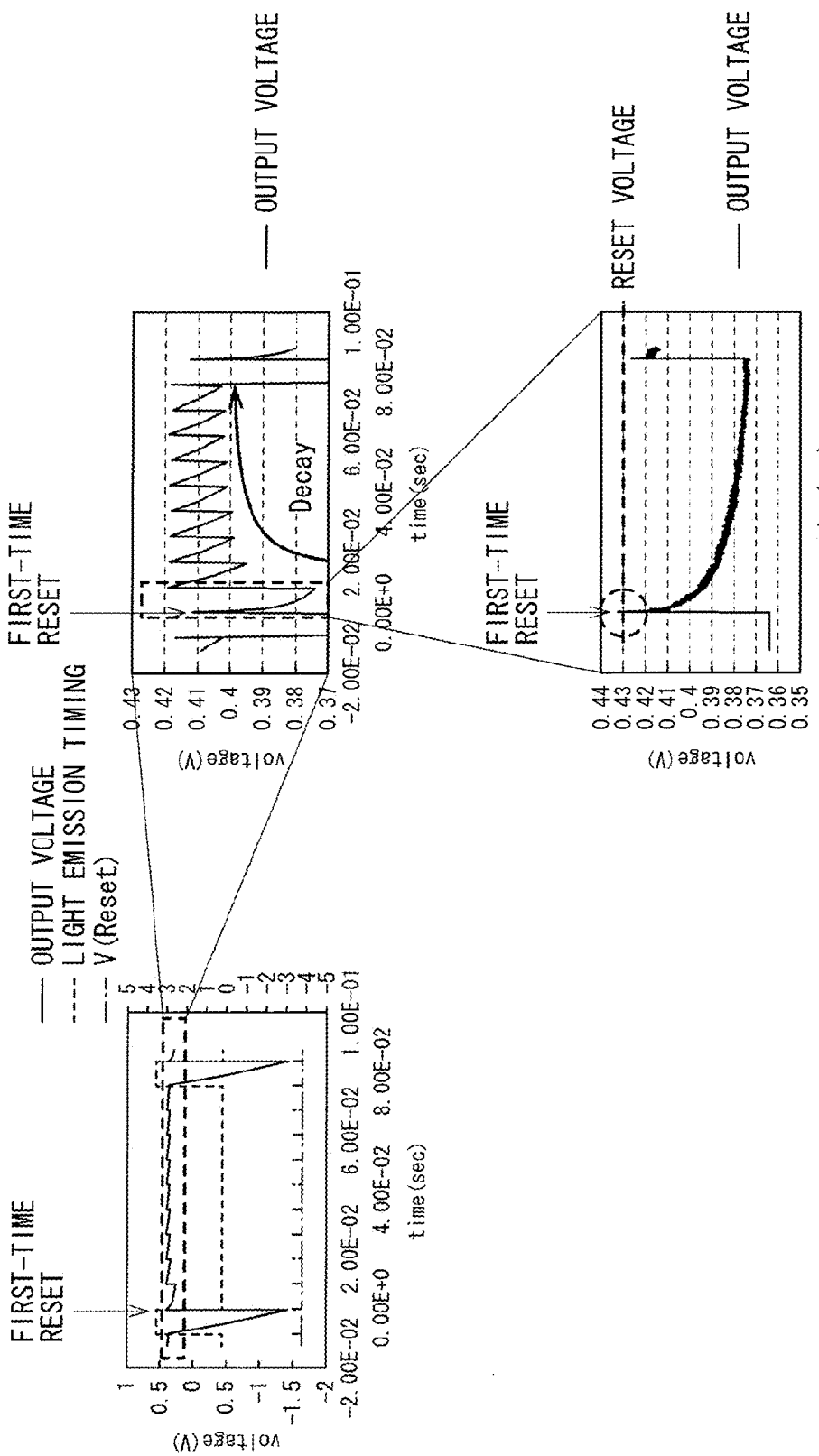

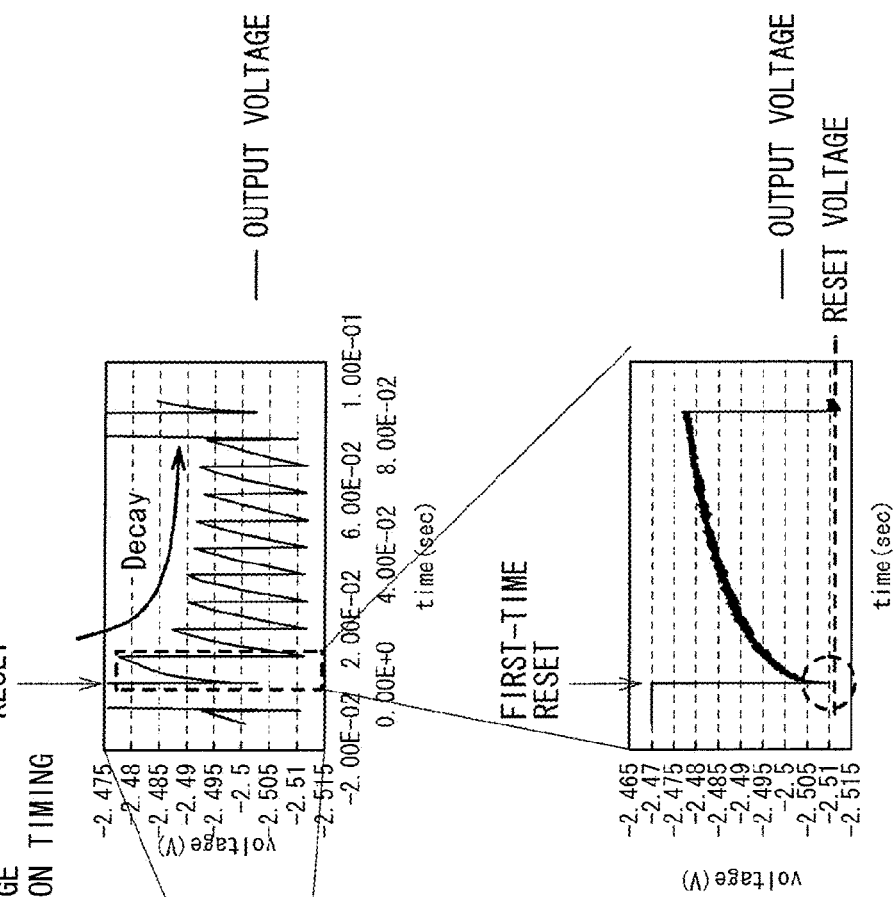
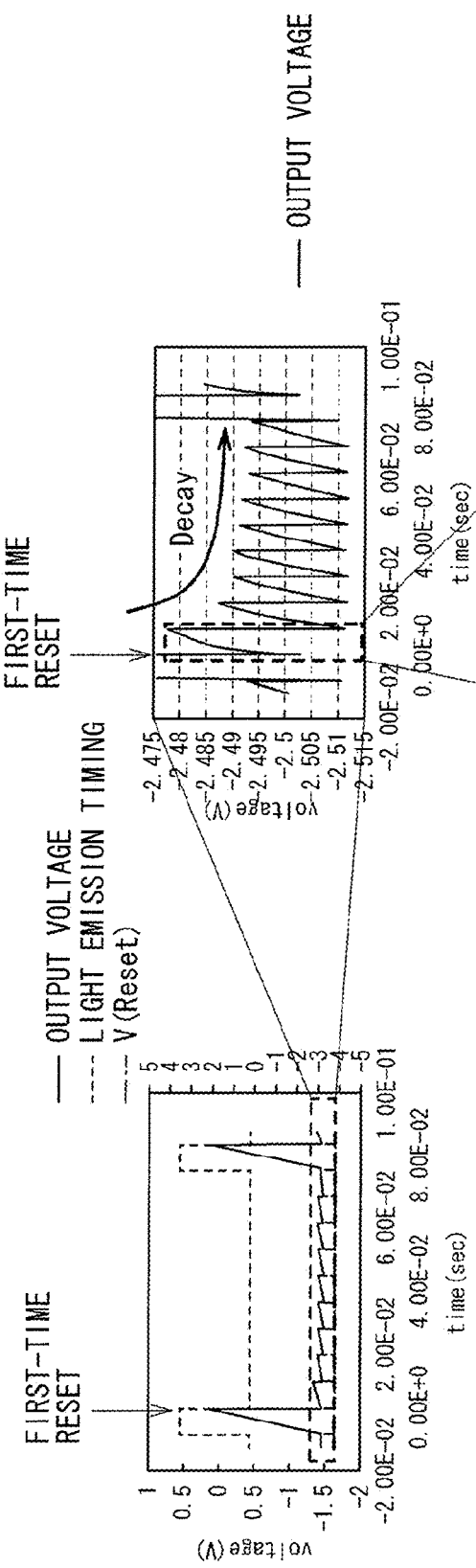
FIG. 47A
FIG. 47B
FIG. 47C

SENSOR DEVICE, METHOD OF DRIVING SENSOR ELEMENT, DISPLAY DEVICE WITH INPUT FUNCTION, ELECTRONIC UNIT AND RADIATION IMAGE PICKUP DEVICE

BACKGROUND OF THE INVENTION

1. Field of the Invention

The present invention relates to a sensor device picking up an image of an object and detecting the position of a proximity object, a method of diving a sensor element applied to such a sensor device, a display device with an input function, which includes a sensor function (input function) and a display function, and an electronic unit including such a display device. The present invention also relates to a radiation image pickup device reading information based on radiation by converting the waveform of radiation represented by alpha-ray, beta-ray, gamma-ray, and X-ray.

2. Description of the Related Art

Previously, there has been known an optical sensor device including a sensor panel in which photoelectric conversion elements are arranged in a matrix form (Japanese Unexamined Patent Application Publications No. 09-92807 and No. 2001-345440). Further, there has been developed a display device in which display pixels and photoelectric conversion elements are arranged in a matrix form within a display panel so that the display panel itself has an optical sensor function (see Japanese Unexamined Patent Application Publications No. 2006-276223 and No. 2008-233257).

SUMMARY OF THE INVENTION

In the sensor device or the display device described above, electric charge generated according to an amount of received light and supplied from the photoelectric conversion element is stored in a storage capacity, and a voltage value according to the electric charge stored in the storage capacity is read out and output as a sensor detection signal. An amount of light entering the photoelectric conversion element changes according to the position, distance, size and the like of an object close to a panel surface and thus the sensor detection signal changes as well. Therefore, it may be possible to detect the position and the like of the object close to the surface of the panel, by appropriately processing the sensor detection signal from each of plural light receiving elements arranged in a matrix form. In such a device, readout operation is carried out after a predetermined light-receiving (exposure) period by the photoelectric conversion element and then, a predetermined reset voltage is applied to the storage capacity so that the electric charged stored in the storage capacity is reset. Afterwards, sensor operation such as light receiving and reading is repeated.

In such sensor operation, there is a case in which even after reset operation is carried out, a pre-reset state of the storage capacity remains. When the pre-reset state of the storage capacity remains, a so-called afterimage occurs at the time of the subsequent reading operation, making it difficult to obtain a satisfactory detection result. As a past technique, for example, Japanese Unexamined Patent Application Publication No. 2001-345440 mentioned above discloses an invention of reducing afterimages by using a reset transistor. However, in such a technique of the past, sufficient measures are not taken to deal with a problem of an afterimage that occurs in a case in which a PIN photodiode having a gate electrode is used as the photoelectric conversion element. In the case of the PIN photodiode, an i-layer is in any of a storage state (saturated state), a depletion state, and an inversion state. In particular, there is such a problem that even when a reset voltage is supplied for a short period of time after the i-layer enters the storage state, the electric charge stored in the storage capacity cannot be sufficiently reset and thus, a remedy to address this problem is desired.

In view of the foregoing, it is desirable to provide a sensor device, a method of driving a sensor element, a display device with an input function, and an electronic unit, which enable stable detection operation by reliably resetting electric charge stored in a charge storage section to reduce afterimages, even when, for example, a photoelectric conversion element is in a storage state (saturated state), and provide a radiation image pickup device.

According to an embodiment of the present invention, there is provided a sensor device including a plurality of sensor elements two-dimensionally arranged and a sensor driving section driving the sensor elements. Each of the sensor elements includes: a photoelectric conversion element generating electric charge according to an amount of received light; a charge storage section connected to one end of the photoelectric conversion element and storing electric charge generated by the photoelectric conversion element; a readout section reading either a voltage value resulted from the electric charge stored in the charge storage section or the stored electric charge to output the read voltage value or the read electric charge as a sensor detection signal; and a reset section resetting the electric charge stored in the charge storage section through supplying a predetermined reset voltage to the charge storage section. The sensor driving section controls the reset section so that the predetermined reset voltage is continuously or intermittently supplied to the charge storage section over a period exceeding one horizontal scan period.

According to another embodiment of the present invention, there is provided a method of driving a sensor element, the method including steps of:

providing a plurality of sensor elements two-dimensionally arranged, each of the sensor elements including a photoelectric conversion element generating electric charge according to an amount of received light, a charge storage section connected to one end of the photoelectric conversion element and storing electric charge generated by the photoelectric conversion element, a readout section reading either a voltage value resulted from the electric charge stored in the charge storage section or the stored electric charge, to output the read voltage value or the read electric charge as a sensor detection signal, and a reset section resetting the electric charge stored in the charge storage section through supplying a predetermined reset voltage to the charge storage section, and controlling a reset transistor so that the predetermined reset voltage is continuously or intermittently supplied to the charge storage section over a period exceeding one horizontal scan period.

According to another embodiment of the present invention, there is provided a display device with an input function, the display device including: a display panel provided with a plurality of display pixels and a plurality of sensor elements which are two-dimensionally arranged, a display driving section driving the display pixels; and a sensor driving section driving the sensor elements. In the display device with the input function, each of the sensor elements is subjected to control similar to that performed by the sensor driving section according to the above-described embodiment of the present invention.

According to another embodiment of the present invention, there is provided an electronic unit including the display device with the input function according to the above-described embodiment of the present invention.

According to another embodiment of the present invention, there is provided a radiation image pickup device including a pixel section, which is provided with a plurality of sensor elements two-dimensionally arranged and generates electric charge in response to incident radiation or light obtained by wavelength conversion of the incident radiation. In the radiation image pickup device, each of the sensor elements is subjected to control similar to that performed by the sensor driving section according to the above-described embodiment of the present invention.

In the sensor device, the method of driving the sensor element, the display device with the input function, the electronic unit, or the radiation image pickup device according to the embodiment of the present invention, the electric charge according to the amount of received light is generated in the photoelectric conversion element. Subsequently, the electric charge converted by the photoelectric conversion element is stored in the charge storage section, and the electric charge stored in the charge storage section or the voltage value according to the stored electric charge is output as the sensor detection signal. The electric charge stored in the charge storage section is reset by supply of the predetermined reset voltage to the charge storage section. At the time, by continuously or intermittently supplying the predetermined reset voltage to the charge storage section over the period exceeding one horizontal scan period, it may be possible to reliably reset the electric charge stored in the charge storage section so as to reduce afterimages, even when, for example, the photoelectric conversion element is in a saturated state.

According to the sensor device, the method of driving the sensor element, the display device with the input function, the electronic unit, or the radiation image pickup device in the embodiment of the present invention, the predetermined reset voltage is supplied to the charge storage section continuously or intermittently over the period exceeding one horizontal scan period and thus, it may be possible to perform stable detection operation (image-pickup operation) by reliably resetting the electric charge stored in the charge storage section so as to reduce afterimages, even when, for example, the photoelectric conversion element is in a saturated state.

Other and further objects, features and advantages of the present invention will appear more fully from the following description.

BRIEF DESCRIPTION OF THE DRAWINGS

FIGS. 12A and 12B are a diagram illustrating a state in which a proximity object is in the sensor area when there is strong external light, and a diagram illustrating an example of a sensor output voltage in such a state, respectively, in the display device illustrated in FIG. 1;

FIGS. 13A and 13B are a diagram illustrating a state in which a proximity object is in the sensor area when there is weak external light, and a diagram illustrating an example of a sensor output voltage in such a state, respectively, in the display device illustrated in FIG. 1;

FIG. 14 is a diagram that shows images for describing a method of detecting a proximity object by using a differential image;

FIGS. 23A and 23B are a front view and a side view in an open state, respectively, and FIGS. 23C through 23G are a front view, a left-side view, a right-side view, a top view, and a bottom view in a closed state, respectively;

FIG. 46 is a graph showing results obtained by measuring output voltages of the single pixel circuit, after passing through an amplifier, in the second configuration example of the active pixel circuit illustrated in FIG. 27;

FIG. 47 is a graph showing results obtained by measuring output voltages of the single pixel circuit, after passing through an amplifier, in the first configuration example of the active pixel circuit illustrated in FIG. 26;

DETAILED DESCRIPTION OF THE PREFERRED EMBODIMENTS

Embodiments of the present invention will be described below in detail with reference to the drawings.

<First Embodiment>
[Entire Structure of Display Device with Input Function]

Figure 1:
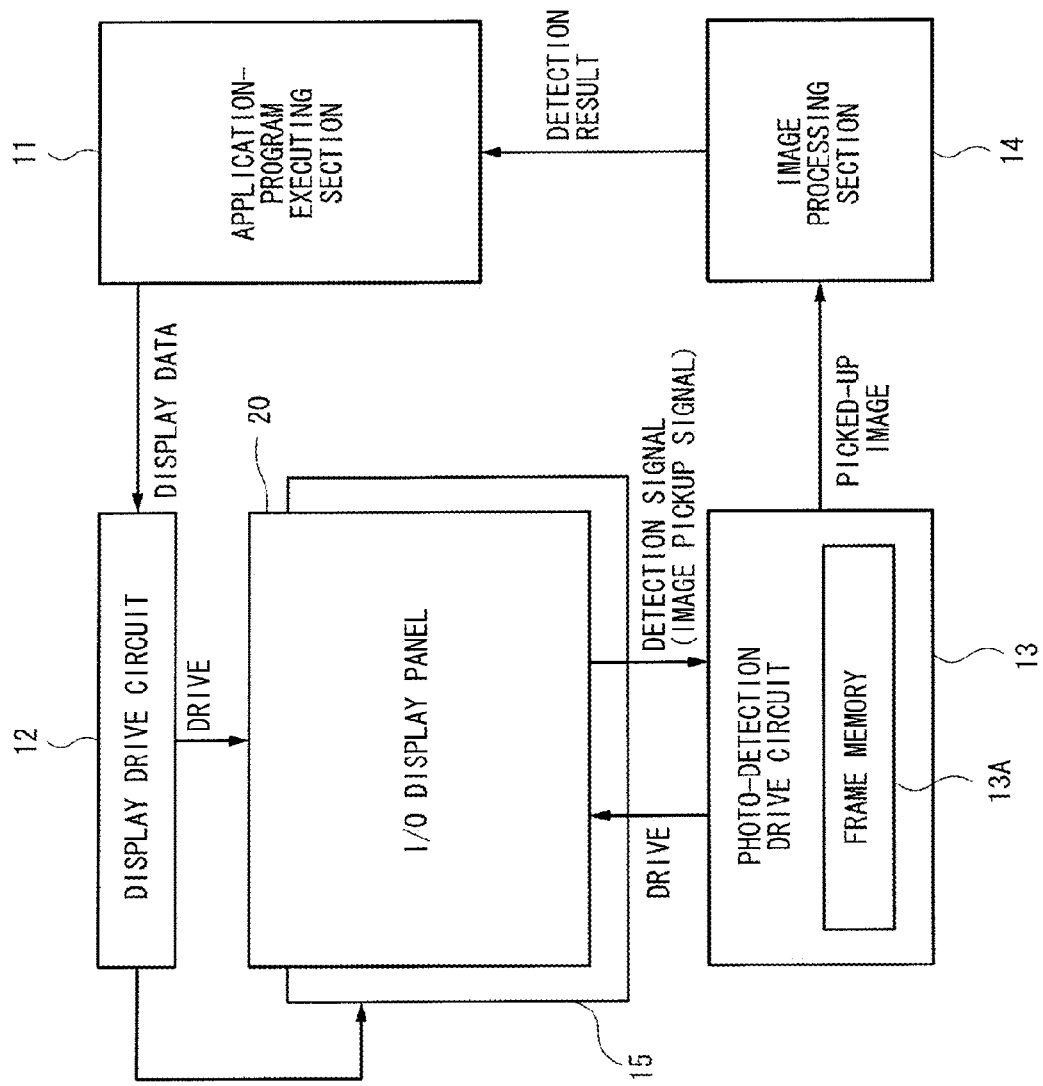
FIG. 1 is a block diagram illustrating a configuration example of a display device with an input function according to a first embodiment of the present invention.

FIG. 1 illustrates an example of the entire structure of a display device (display image-pickup device) with an input function according to a first embodiment of the present invention. This display device includes an I/O display panel 20, a backlight 15, a display drive circuit 12, a light-receiving drive circuit 13, an image processing section 14, and an application-program executing section 11.

Figure 3:
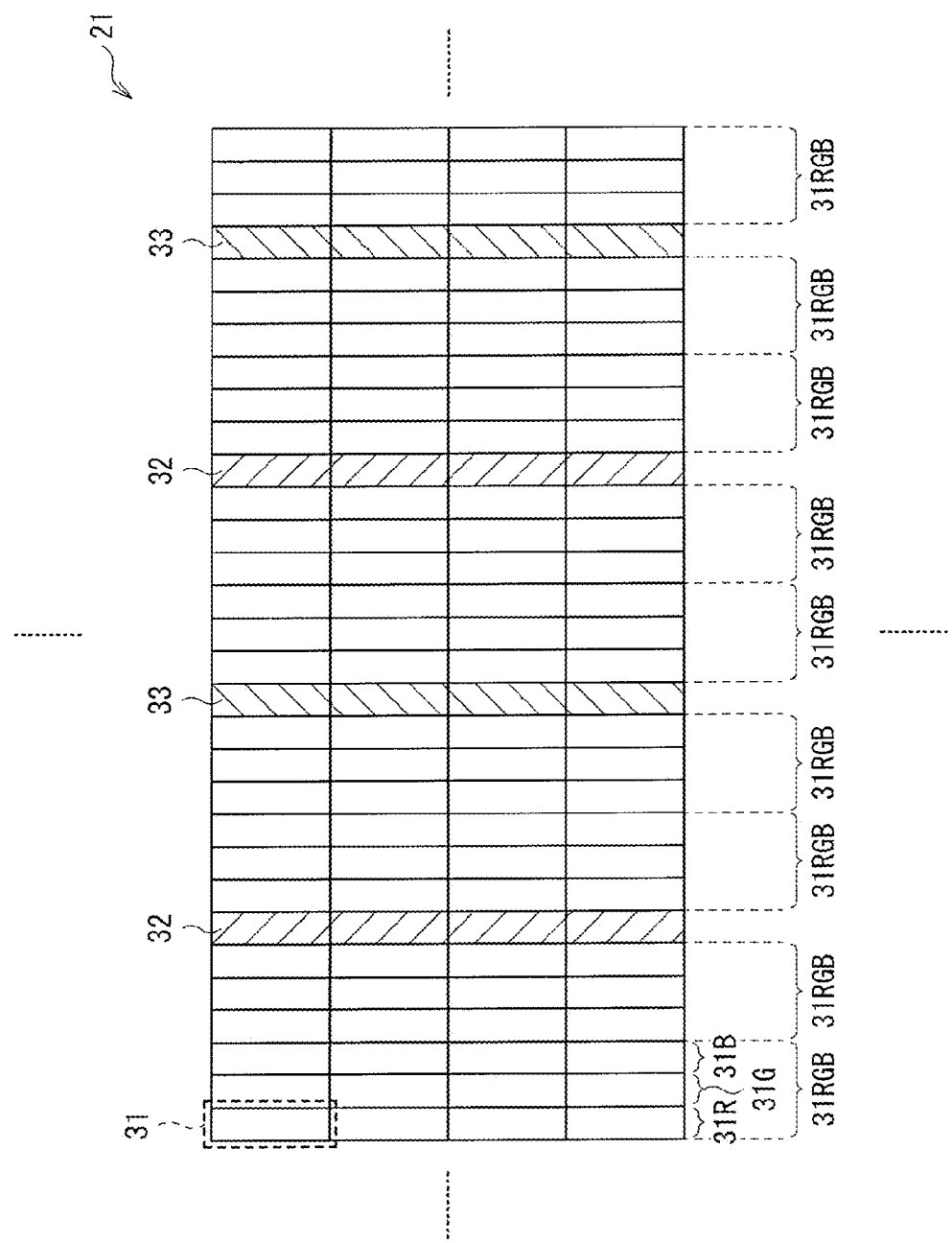
FIG. 3 is a plan view illustrating an example of pixel arrangement in a display area (sensor area) illustrated in FIG. 2.

The I/O display panel 20 is, for example, a Liquid Crystal Display (LCD) panel. The I/O display panel 20 includes plural display pixels 31RGB arranged in a matrix form as illustrated in FIG. 3 to be described later, and has a function of displaying (display function) a predetermined image such as graphics and characters based on image data while performing line-sequential operation. The I/O display panel 20 further includes sensor elements 33 arranged as image pickup pixels in a matrix form as illustrated in FIG. 3 to be described later, and has a function to serve as a sensor panel (detection function, image pickup function) that detects and images an object (proximity object) touching or close to a panel surface.

The backlight 15 is a light source for display and detection in the I/O display panel 20, and includes, for example, arranged plural light-emitting diodes. The backlight 15 is driven and controlled by the display drive circuit 12, and is capable of performing on-off (illuminating and not illuminating) operation at a high speed based on predetermined timing synchronized with operation timing of the I/O display panel 20, which will be described later. The backlight 15 emits illumination light Lon periodically from a rear side of the I/O display panel 20 toward the panel surface.

The display drive circuit 12 is a circuit that drives the display pixels 31RGB of the I/O display panel 20 (i.e. performs driving of line-sequential display operation), so that an image is displayed on the I/O display panel 20 based on display data (i.e. so that display operation is performed). The display drive circuit 12 also performs on-off (illuminating and not illuminating) control of the backlight 15.

The light-receiving drive circuit 13 is a circuit that drives the I/O display panel 20 (i.e. performs driving of line-sequential image pickup operation), so that a sensor detection signal (image pickup signal) is obtained from each of the sensor elements (image pickup pixels) 33 of the I/O display panel 20 (i.e. so that an object is detected or imaged). Incidentally, the sensor detection signals (image pickup signals) from the respective sensor elements 33 are stored in a frame memory 13A, for example, per frame, and output to the image processing section 14 as a detected image (picked-up image).

The image processing section 14 performs predetermined image processing (arithmetic processing) based on the picked-up image output from the light-receiving drive circuit 13. As a result of performing the image processing, the image processing section 14 detects and obtains, for example, object information about an object (positional coordinates data, data related to the shape and size of the object, and the like) that has made an approach or the like to the I/O display panel 20.

Based on a detection result obtained by the image processing section 14, the application-program executing section 11 performs processing according to a predetermined piece of application software. As an example of this processing, there is processing of including the positional coordinates of the detected object in the display data to be displayed on the I/O display panel 20. Incidentally, the display data produced by the application-program executing section 11 is supplied to the display drive circuit 12.

[Configuration Example of I/O Display Panel 20]

Figure 2:
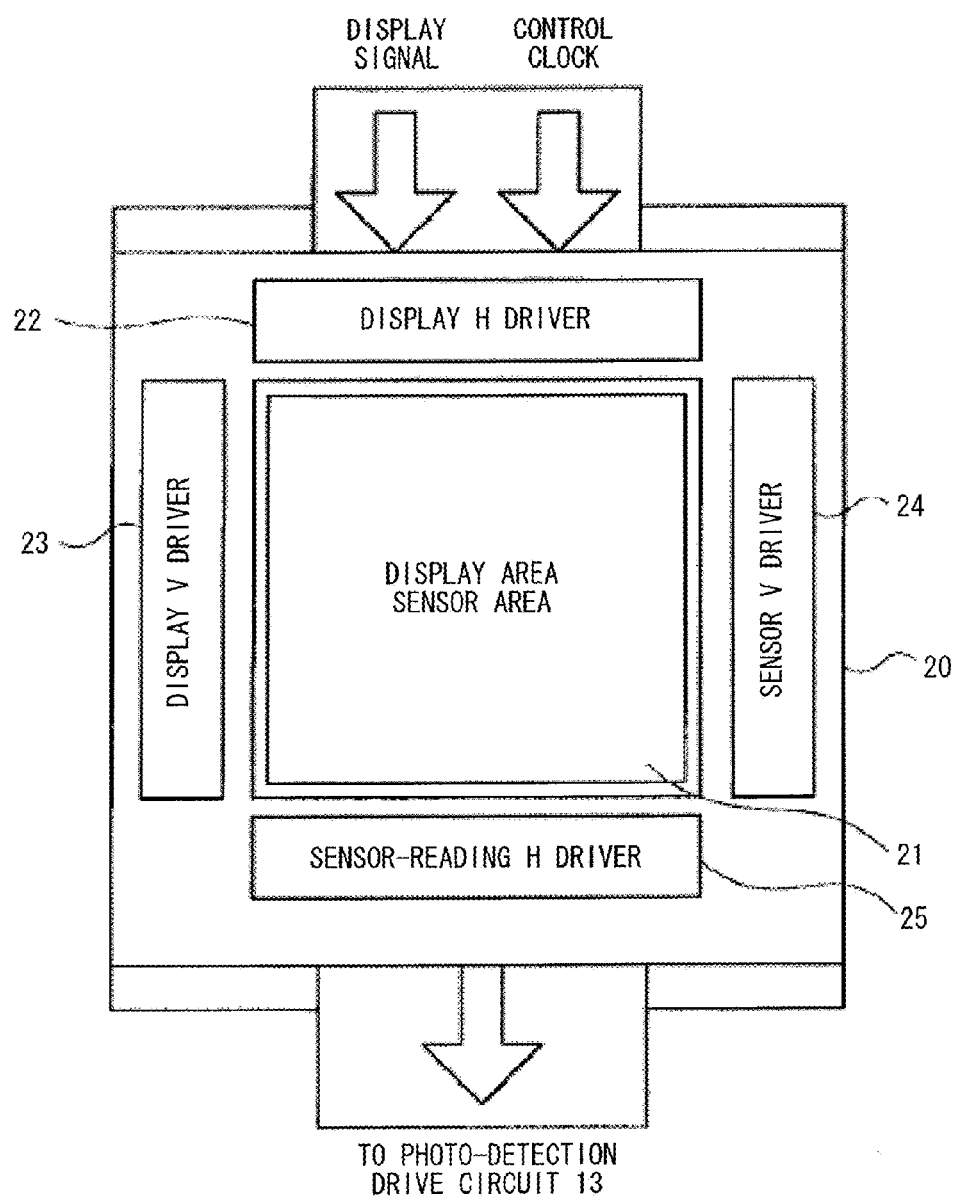
FIG. 2 is a block diagram illustrating a configuration example of an I/O display panel illustrated in FIG. 1.

FIG. 2 illustrates a configuration example of the I/O display panel 20. The I/O display panel 20 includes a display area (sensor area) 21, a display H driver 22, a display V driver 23, a sensor-reading H driver 25, and a sensor V driver 24.

The light-receiving drive circuit 13, the sensor V driver 24, and the sensor-reading H driver 25 in FIG. 1 and FIG. 2 combined are a specific example of the "sensor driving section" according to the embodiment of the present invention. The display drive circuit 12, the display H driver 22, and the display V driver 23 combined are a specific example of the "display drive section" according to the embodiment of the present invention. The I/O display panel 20 is a specific example of the "display panel" and the "sensor panel" according to the embodiment of the present invention. The light-receiving drive circuit 13 and the image processing section 14 combined are a specific example of the "signal processing section" according to the embodiment of the present invention.

The display area (sensor area) 21 is an area that modulates light from the backlight 15 and emits the modulated light as irradiation light (hereinafter referring to light that includes display light and irradiation light for detection emitted by, for example, an infrared light source (not illustrated)). The display area (sensor area) 21 is also an area that detects (images) an object touching or close to this area. In the display area (sensor area) 21, the display pixels 31RGB (e.g. liquid crystal display elements) and the sensor elements 33 that will be described later are arranged in respective matrix forms.

Based on display signals for driving the display and control clocks supplied by the display drive circuit 12, the display H driver 22 line-sequentially drives, together with the display V driver 23, the display pixels 31RGB within the display area 21.

According to driving control by the light-receiving drive circuit 13, the sensor-reading H driver 25, together with the sensor V driver 24, line-sequentially drives the sensor elements 33 serving as the image pickup pixels within the display area 21, and obtains detection signals (image pickup signals). The light-receiving drive circuit 13 is configured to carry out, when the irradiation light is emitted from the backlight 15 to a proximity object, driving control to store electric charge for charging in the sensor elements 33 according to a sum of an amount of reflected light resulting from the irradiation light and an amount of ambient light (external light). Also, the light-receiving drive circuit 13 is configured to carry out, when the irradiation light is not emitted from the backlight 15, driving control to store electric charge for charging in the sensor elements 33 according to an amount of ambient light. The sensor-reading H driver 25 is configured to output, to the light-receiving drive circuit 13, sensor detection signals (image pickup signals) when the backlight 15 is turned on and sensor detection signals (image pickup signals) when the backlight 15 is turned off, which are obtained from the sensor elements 33 through these kinds of driving control.

Figure 4:
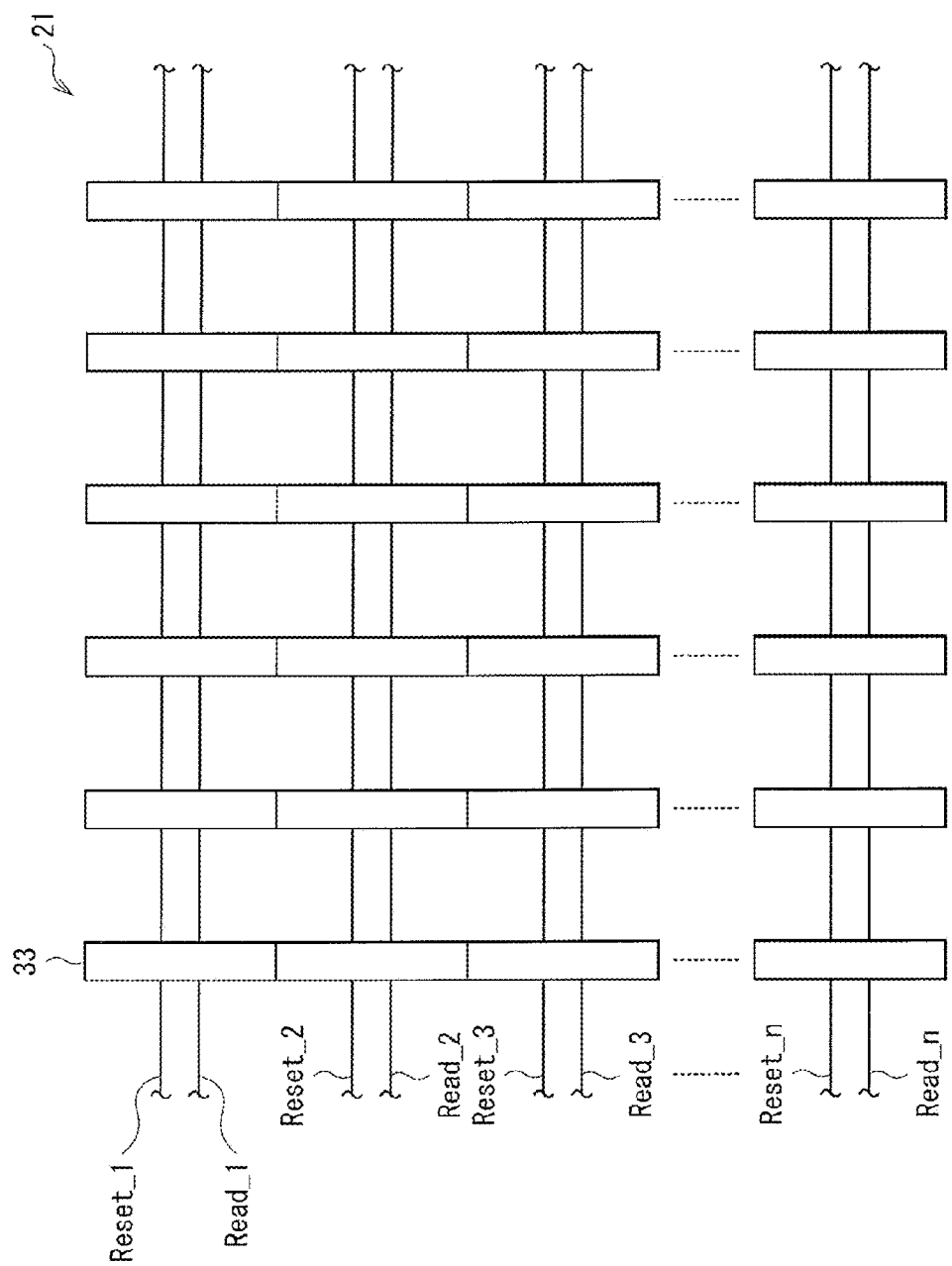
FIG. 4 is a schematic plan view illustrating an example of a connection relation between sensor elements (image pickup pixels) and signal lines in the pixel arrangement illustrated in FIG. 3.

FIG. 3 illustrates a detailed configuration example of each pixel in the display area (sensor area) 21. For example, as illustrated in FIG. 3, pixels 31 of the display area 21 include the display pixels 31RGB, the sensor elements 33 serving as the image pickup pixels and wire sections 32 in which wires for the sensor elements 33 are formed. Each of the display pixels 31RGB includes a display pixel 31R for red (R), a display pixel 31G for green (G) and a display pixel 31B for blue (B). The display pixels 31RGB, the sensor elements 33 and the wire sections 32 are arranged in respective matrix forms on the display area (sensor area) 21. Further, the sensor elements 33 and the wire sections 32 for driving the sensor elements 33 are arranged to be separated from each other periodically. With such an arrangement, a sensor area including the sensor elements 33 and the wire sections 32 is extremely hard to recognize relative to the display pixels 31RGB, and a reduction in aperture ratio in the display pixels 31RGB is suppressed to a minimum. Furthermore, when the wire sections 32 are disposed in an area that does not contribute to the aperture of the display pixels 31RGB (for example, an area shielded from light by a black matrix, or a reflection area), it may be possible to dispose a light-receiving circuit without reducing display quality. Incidentally, for example, as illustrated in FIG. 4, reset-control signal lines Reset_1 through Reset_n and read-control signal lines Read_1 through Read_n are connected to each of the sensor elements 33, along a horizontal line direction.

[Configuration Example of Sensor Element 33]

Figure 5:
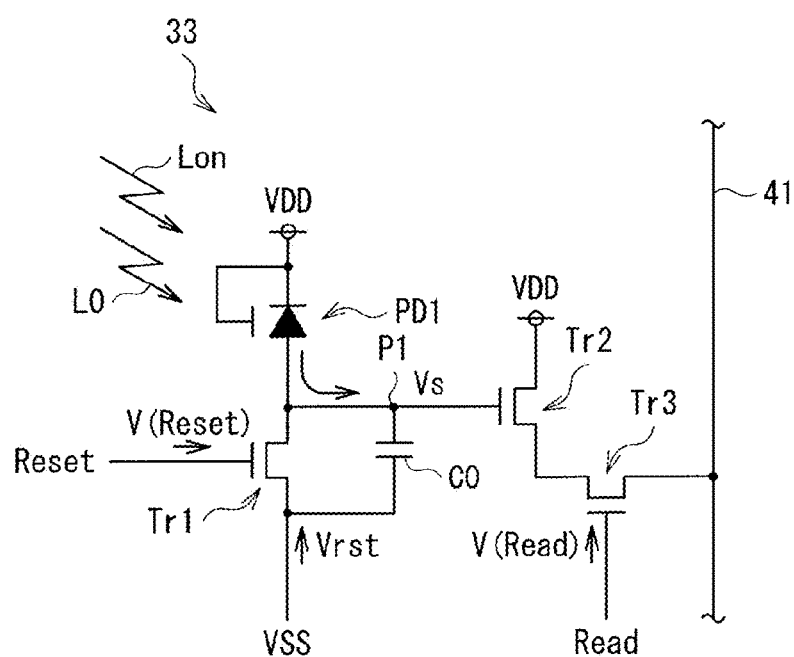
FIG. 5 is a circuit diagram illustrating a configuration example of the sensor element in the display device illustrated in FIG. 1.

For example, as illustrated in FIG. 5, the sensor element 33 includes a photoelectric conversion element PD1, a reset transistor Tr1, a storage node P1, an amplification transistor Tr2, a select/read transistor Tr3 and a storage capacity C0 (charge storage section).

Figure 6:
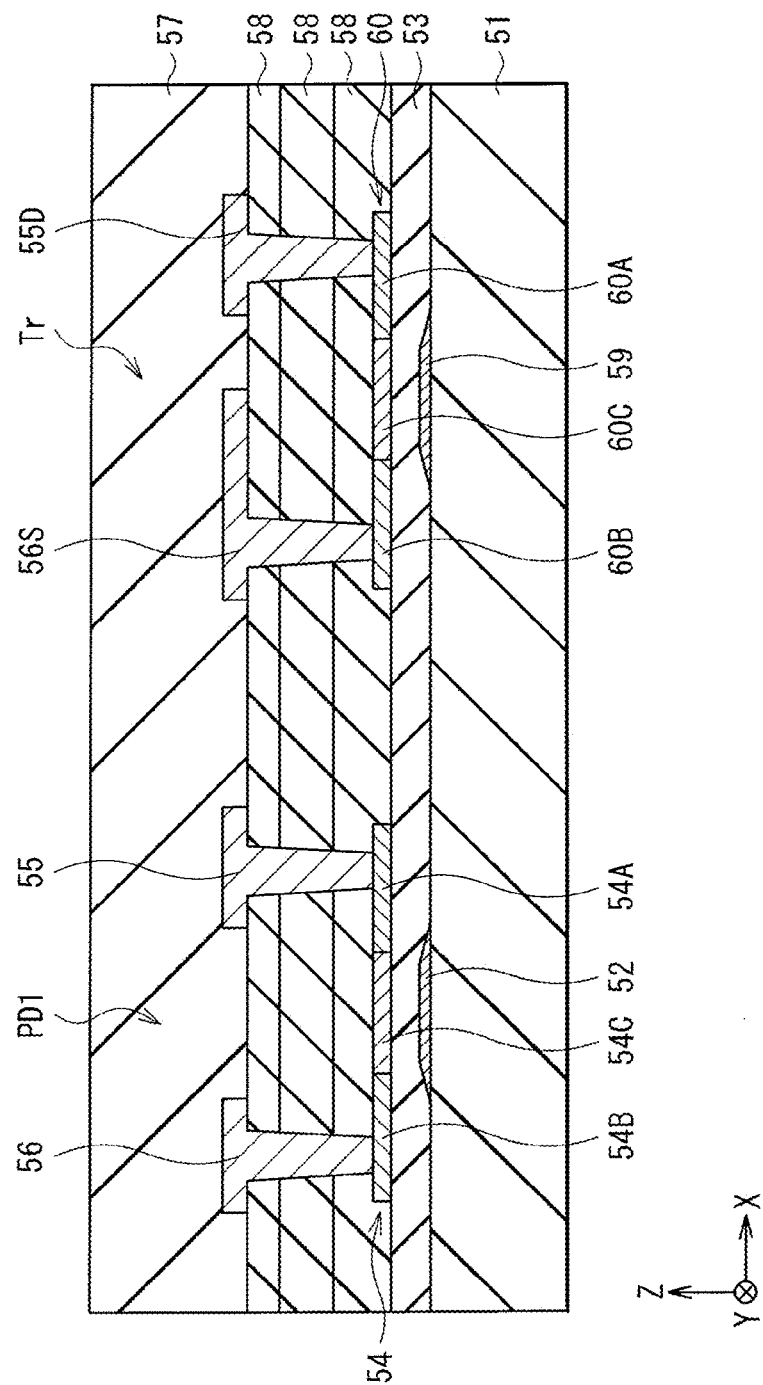
FIG. 6 is a cross-sectional diagram illustrating a structure of a main part of the sensor element illustrated in FIG. 5.

The photoelectric conversion element PD1 generates electric charge according to an amount of incident light and is, for example, a PIN photodiode. The PIN photodiode has, as illustrated in FIG. 6 to be described later, a p-type semiconductor region 54A, an n-type semiconductor region 54B and an intrinsic semiconductor region (i region) 54C formed between the p-type semiconductor region 54A and the n-type semiconductor region 54B. The photoelectric conversion element PD1 also has, as illustrated in FIG. 6 to be described later, an anode electrode 55, a cathode electrode 56 and a gate electrode 52. The anode electrode 55 is connected to the p-type semiconductor region 54A, and the cathode electrode 56 is connected to the n-type semiconductor region 54B. The cathode electrode 56 of the photoelectric conversion element PD1 is connected to a power supply line for supplying a power supply voltage VDD. One end (anode electrode 55) of the photoelectric conversion element PD1 is connected to one end (drain terminal) of the reset transistor Tr1.

One end of the storage capacity C0 is connected, via the storage node P1, to the one end (anode electrode 55) of the photoelectric conversion element PD1, the one end (drain terminal) of the reset transistor Tr1, and a gate terminal of the amplification transistor Tr2. In the storage capacity C0, electric charge converted by the photoelectric conversion element PD1 is to be stored. A voltage fluctuation occurs in the voltage value of the storage capacity C0 according to the electric charge stored in the storage capacity C0. The other end of the storage capacity C0 is connected, together with a source terminal of the reset transistor Tr1, to a supply line VSS for supplying a predetermined reset voltage Vrst (e.g. 0V).

Each of the reset transistor Tr1, the amplification transistor Tr2 and the select/read transistor Tr3 includes a Thin Film Transistor (TFT) and the like.

A gate terminal of the reset transistor Tr1 is connected to the reset-control signal line Reset (see FIG. 4 and FIG. 5) for supplying a reset-control signal V(Reset), and the source terminal of the reset transistor Tr1 is connected to the supply line VSS for supplying the reset voltage Vrst (e.g. 0V). The drain terminal of the reset transistor Tr1 and the gate terminal of the amplification transistor Tr2 are connected to the one end (storage node P1) of the storage capacity C0. A drain terminal of the amplification transistor Tr2 is connected to the power supply line for supplying the power supply voltage VDD. A source terminal of the amplification transistor Tr2 is connected to a drain terminal of the select/read transistor Tr3. A gate terminal of the select/read transistor Tr3 is connected to the read-control signal line Read for supplying a read-control signal V(Read), and a source terminal of the select/read transistor Tr3 is connected to a readout line 41.

The reset transistor Tr1 is provided to supply the predetermined reset voltage Vrst to the storage capacity C0, thereby resetting the voltage value of the storage node P1 to the predetermined reset voltage Vrst (to release the electric charge stored in the storage capacity C0). In the present embodiment, as illustrated in Parts (B) and (C) of FIG. 11 to be described later, the light-receiving drive circuit 13 controls a pulse period of the reset-control signal V(Reset) applied to the gate terminal of the reset transistor Tr1, so that the predetermined reset voltage Vrst is continuously or intermittently supplied to the storage capacity C0 over a period exceeding 1H (horizontal scan) period (for example, 32 μsec).

The amplification transistor Tr2 and the select/read transistor Tr3 form a signal readout circuit to read the voltage value according to the electric charge stored in the storage capacity C0 and output the read voltage value as the sensor detection signal. The sensor detection signal is output to the readout line 41 at the time when the select/read transistor Tr3 is turned on in response to the read-control signal V(Read) applied to the gate terminal The amplification transistor Tr2 and the select/read transistor Tr3 combined are a specific example of the "readout section" according to the embodiment of the present invention.

[Element Structures of Sensor Element 33 and Transistor]

FIG. 6 illustrates an example of the element structure of the photoelectric conversion element PD1. FIG. 6 depicts a configuration example of a bottom gate type. The sensor element 33 includes: a substrate 51; and a gate electrode 52, a gate dielectric film 53, a PIN semiconductor layer 54, an anode electrode 55, a cathode electrode 56, a dielectric film (flattening film) 57 and interlayer dielectric films 58, which are formed on the substrate 51. The PIN semiconductor layer 54 includes the p-type semiconductor region 54A, the n-type semiconductor region 54B and the intrinsic semiconductor region (i region) 54C formed between the p-type semiconductor region 54A and the n-type semiconductor region 54B.

FIG. 6 also illustrates an example of the element structure of a transistor Tr. A semiconductor layer 60 of the transistor Tr and the PIN semiconductor layer 54 of the photoelectric conversion element PD1 are formed in a common layer level on the substrate 51. The transistor Tr illustrated in FIG. 6 is, for example, the amplification transistor Tr2 or the select/read transistor Tr3. Besides, in this display device, each of the sensor driving section (the light-receiving drive circuit 13, each of the sensor V driver 24 and the sensor-reading H driver 25), as well as the display pixels 31RGB and the display driving section (the display drive circuit 12, the display H driver 22, and the display V driver 23) has a switching transistor that includes a semiconductor layer. In the switching transistor of each of these circuit sections as well, it is desirable that the semiconductor layer and the PIN semiconductor layer 54 of the photoelectric conversion element PD1 be formed in a common layer level on the substrate 51.

First, the element structure on the photoelectric conversion element PD1 side will be described. The substrate 51 is, for example, an insulating substrate such as a plastic film substrate and a glass substrate. The gate electrode 52 includes, for example, Al (aluminum) or Mo (molybdenum). The gate electrode 52 is formed at least in an area facing the intrinsic semiconductor region 54C and is, for example, rectangular. Incidentally, FIG. 6 illustrates, as an example, a case in which the gate electrode 52 is formed in an area that faces a portion including not only the intrinsic semiconductor region 54C but a part of the p-type semiconductor region 54A and a part of the n-type semiconductor region 54B. Therefore, the gate electrode 52 functions as a shielding film that prevents the entrance of light from the substrate 51 side into the intrinsic semiconductor region 54C.

The gate dielectric film 53 includes silicon oxide ($SiO_2$), silicon nitride (SiN) or the like, as a main component. The gate dielectric film 53 is disposed opposite the PIN semiconductor layer 54 in a lamination direction (Z direction in FIG. 6). For example, the gate dielectric film 53 is disposed in an area facing a portion at least including the intrinsic semiconductor region 54C, so as to cover, for example, the gate electrode 52. Incidentally, FIG. 6 illustrates, as an example, a case in which the gate dielectric film 53 is formed over the entire surface of the substrate 51 including the gate electrode 52.

The PIN semiconductor layer 54 is formed to traverse an area facing the gate electrode 52 and extend in a direction facing the anode electrode 55 and the cathode electrode 56 (X direction in FIG. 6). A top surface of the PIN semiconductor layer 54 is covered by the flattening film 57 and the interlayer dielectric films 58, except portions in contact with the anode electrode 55 and the cathode electrode 56. External light is incident upon the PIN semiconductor layer 54 from the top surface sides of the flattening film 57 and the interlayer dielectric films 58. The flattening film 57 and the interlayer dielectric films 58 are made of a material transparent with respect to the incident light, and include silicon oxide ($SiO_2$), silicon nitride (SiN) or the like, as a main component.

The p-type semiconductor region 54A and the n-type semiconductor region 54B face each other along a first direction (X direction in FIG. 6) in a lamination plane (XY plane in FIG. 6). The p-type semiconductor region 54A and the n-type semiconductor region 54B do not directly contact each other and are disposed via the intrinsic semiconductor region 54C. Therefore, in the PIN semiconductor layer 54, a PIN structure is formed in an in-plane direction. The PIN semiconductor layer 54 is a non-single-crystal semiconductor layer such as polycrystalline silicon. The p-type semiconductor region 54A is formed by, for example, a silicon thin film containing a p-type impurity ($p^+$), and the n-type semiconductor region 54B is formed by, for example, a silicon thin film containing an n-type impurity ($n^+$). The intrinsic semiconductor region 54C is formed by, for example, a silicon thin film doped with no impurity.

The anode electrode 55 and the cathode electrode 56 include, for example, Al. The anode electrode 55 is electrically connected to the p-type semiconductor region 54A, while the cathode electrode 56 is electrically connected to the n-type semiconductor region 54B.

Next, the element structure on the transistor Tr side will be described. Incidentally, a structural part similar to that on the photoelectric conversion element PD1 side will not be described. The transistor Tr includes a gate electrode 59, a semiconductor layer 60, a drain electrode 55D and a source electrode 56S. The semiconductor layer 60 includes a source region 60B, a drain region 60A and a channel region 60C.

The gate electrode 59 includes, for example, Al (aluminum) or Mo (molybdenum). The gate electrode 59 is formed at least in an area facing the channel region 60C. A top surface of the semiconductor layer 60 is covered by the flattening film 57 and the interlayer dielectric films 58, except portions in contact with the drain electrode 55D and the source electrode 56S. The source region 60B and the drain region 60A face each other along the first direction (X direction in FIG. 6) in the lamination plane (XY plane in FIG. 6). The source region 60B and the drain region 60A do not directly contact each other and are disposed via the channel region 60C. The semiconductor layer 60 is a non-single-crystal semiconductor layer such as polycrystalline silicon.

The drain electrode 55D and the source electrode 56S include, for example, Al. The drain electrode 55D is electrically connected to the drain region 60A, and the source electrode 56S is electrically connected to the source region 60B.

In the element structures illustrated in FIG. 6, the respective layers are formed with the thickness of, for example, the following values.
Gate electrodes 52 and 59: 50-100 nm
Gate dielectric film 53: 50-200 nm
PIN semiconductor layer 54: 40-200 nm
Semiconductor layer 60: 40-200 nm
Anode electrode 55: 500-1000 nm
Cathode electrode 56: 500-1000 nm
Interlayer dielectric films 58: 500-1000 nm
Drain electrode 55D: 500-1000 nm
Source electrode 56S: 500-1000 nm

[Entire Operation of Display Device]

First, a summary of the entire operation of this display device will be described.

In this display device, based on display data supplied by the application-program executing section 11, the display drive circuit 12 generates a drive signal for display. Based on this drive signal, the I/O display panel 20 is subjected to line-sequential display driving, and an image is displayed. At the time, the backlight 15 also is driven by the display drive circuit 12, so that periodical turning on and off operation is performed in synchronization with the I/O display panel 20.

When there is an object (a proximity object such as a fingertip) touching or close to the I/O display panel 20, the object is detected (imaged) by the sensor elements (image pickup pixels) 33 in the I/O display panel 20 through line-sequential image-pickup driving by the light-receiving drive circuit 13. A detection signal (image pickup signal) from each of the sensor elements 33 is supplied from the I/O display panel 20 to the light-receiving drive circuit 13. The light-receiving drive circuit 13 accumulates the detection signals of the sensor elements 33 for one frame and outputs the accumulated detection signals to the image processing section 14 as a picked-up image. Here, two frame images are output to the image processing section 14, namely, an image based on the sensor detection signals from the sensor elements 33 obtained when the backlight 15 is in the ON state, and an image based on the sensor detection signals from the sensor elements 33 obtained when the backlight 15 is in the OFF state.

The image processing section 14 obtains object information about the object (such as positional coordinates data and data related to the shape and size of the object) touching or close to the I/O display panel 20, by performing predetermined image processing (arithmetic processing) based on this picked-up image. For example, the arithmetic processing to determine a barycenter of a differential image produced in the light-receiving drive circuit 13 is performed, and a contact (approach) center is identified. Subsequently, a result of detecting the proximity object is output from the image processing section 14 to the application-program executing section 11. The application-program executing section 11 executes an application program as will be described later.

[Specific Example of Detection of Proximity Object]

Next, a specific example of sensor operation (image-pickup operation) in this display device will be described. In this display device, in the I/O display panel 20, sequentially from upper to lower lines, there is performed processing for resetting the voltage value of the storage node P1 (electric charge stored in the storage capacity C0) in the sensor element 33 with the reset voltage Vrst (Reset period). Subsequently, in a state in which the backlight 15 is on, exposure (storage of electric charge converted by the photoelectric conversion element PD1 in the storage capacity C0) is performed (exposure period (bright)). Next, from upper to lower lines sequentially, there is performed processing for reading, as the sensor detection signal, the voltage value (voltage value of the storage node P1) according to the electric charge stored in the storage capacity C0 in the sensor element 33 (Read period).

Next, again, from upper to lower lines sequentially, there is performed the processing for resetting the voltage value of the storage node P1 (electric charge stored in the storage capacity C0) in the sensor element 33 with the reset voltage Vrst (Reset period). Subsequently, in a state in which the backlight 15 is off, exposure (storage of electric charge converted by the photoelectric conversion element PD1 in the storage capacity C0) is performed (exposure period (dark)). Subsequently, from upper to lower lines sequentially, there is performed the processing for reading, as the sensor detection signal, the voltage value (voltage value of the storage node P1) according to the electric charge stored in the storage capacity C0 in the sensor element 33 (Read period).

As described above, there are performed the exposure in the state in which the backlight 15 is on (bright state) and the exposure in the state in which the backlight 15 is off (dark state), while the Reset period is provided in between, and then, the processing for reading the sensor detection signal in each state is performed.

FIG. 12A illustrates a state in which a proximity object (finger f) is in the sensor area 21 of the I/O display panel 20 when there is strong external light L0 in the display device, and FIG. 12B illustrates an example of a sensor output voltage (received-light output voltage) in such a state. For example, when incident external light (ambient light) L0 is strong as illustrated in FIG. 12A, a received-light output voltage Von101 in a state in which the backlight 15 is on is as illustrated in FIG. 12B. In other words, the received-light output voltage Von101 is a voltage value Va corresponding almost only to the intensity of the external light L0 in any part other than a part approached by the finger f within the sensor area 21 on the panel. Further, at the part approached by the finger f, the received-light output voltage Von101 is reduced to a voltage value Vb corresponding to the intensity of illumination light Lon emitted from the backlight 15 and reflected off a surface of the finger f. In contrast, a received-light output voltage Voff101 in a state in which the backlight 15 is off is, similarly, the voltage value Va corresponding to the intensity of the external light L0 in the part other than the part approached by the finger f, but at the part approached by the finger f, the external light L0 is almost blocked and thus, the received-light output voltage Voff101 is a voltage value Vc at an extremely low level.

FIG. 13A illustrates a state in which a proximity object (finger f) is in the sensor area 21 of the I/O display panel 20 when the external light L0 is weak in the display device, and FIG. 13B illustrates an example of the sensor output voltage (received-light output voltage) in such a state. For example, in a state in which the incident external light L0 is weak (almost absent) as illustrated in FIG. 13A, a received-light output voltage Von201 in the state in which the backlight 15 is on is as illustrated in FIG. 13B. In other words, in any part other than the part approached by the finger f within the sensor area 21, the received-light output voltage Von201 is the voltage value Vc at the extremely low level because the external light L0 is weak. On the other hand, at the part approached by the finger f within the sensor area 21, the received-light output voltage Von201 is increased to the voltage value Vb corresponding to the intensity of the illumination light Lon emitted from the backlight 15 and reflected off the surface of the finger f. In contrast, at both of the part approached by the finger f and the other part, a received-light output voltage Voff201 in the state in which the backlight 15 is off remains unchanged at the voltage value Vc at the extremely low level.

Thus, at the part to which no approach of the finger f is made in the sensor area 21, received-light output voltage is greatly different depending on whether the external light L0 is present or absent. In contrast, at the part approached by the finger f in the sensor area 21, the voltage value Vb at the time when the backlight 15 is on and the voltage value Vc at the time when the backlight 15 is off remain approximately constant regardless of the presence or absence of the external light L0. Therefore, by detecting a difference between a voltage at the time when the backlight 15 is on and a voltage at the time when the backlight 15 is off, it may be possible to determine that a part, in which there is a difference not lower than a certain level such as the difference between the voltage value Vb and the voltage value Vc, is a part where there is an approach or the like of an object.

In the image processing section 14 (FIG. 1), for example, a differential image C' as illustrated in FIG. 14 is obtained. An image B' is an example of the image based on the sensor detection signals from the sensor elements 33 obtained in a state in which the illumination light Lon is emitted by the backlight 15. An image A' is an example of the image based on the sensor detection signals from the sensor elements 33 obtained in a state in which the illumination light Lon is not emitted by the backlight 15. It may be possible to detect the position and the like of an object based on the differential image C' between the image A' and the image B'.

[Description of Afterimage in Sensor Operation]

When the above-described sensor operation is performed by using the sensor element 33 in FIG. 5, there is a case where a pre-reset state of the storage capacity C0 remains even after the reset operation is carried out. When the pre-reset state of the storage capacity C0 remains, a so-called afterimage occurs at the time of the subsequent reading operation, making it difficult to obtain a satisfactory detection result.

Figure 7:
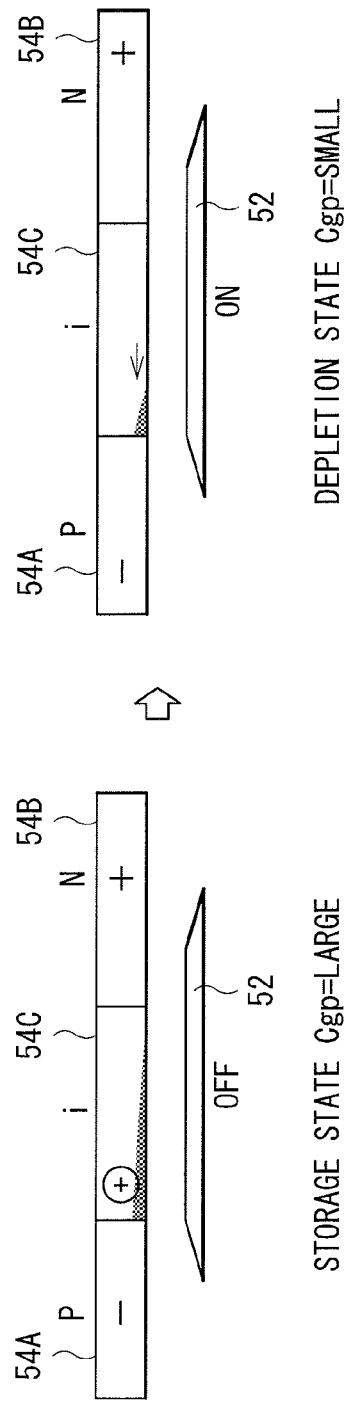
FIGS. 7A and 7B are explanatory diagrams illustrating a case in which a photoelectric conversion element is in a storage state (saturated state) in FIG. 7A and a case in which the photoelectric conversion element is in a depletion state in FIG. 7B.
Figure 8:
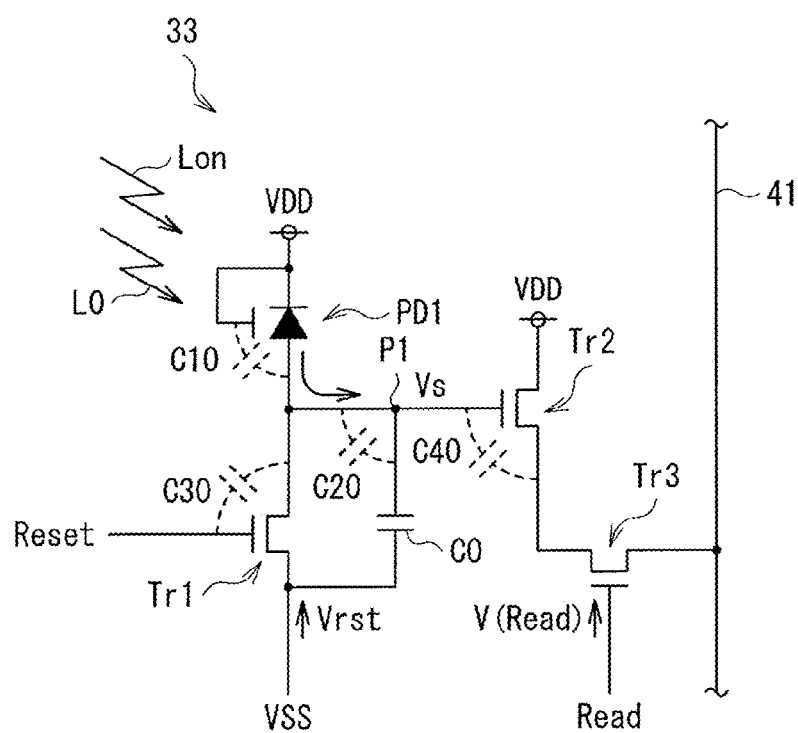
FIG. 8 is a circuit diagram for describing capacitive coupling in the sensor element illustrated in FIG. 5.

With reference to FIGS. 7A, 7B and 8, there will be described below a cause of the afterimage that occurs when the PIN photodiode is used as the photoelectric conversion element PD1. In the case of the PIN photodiode, an i-layer is in any of a storage state (saturated state), a depletion state, and an inversion state, due to the gate voltage. In the case of a thin film photodiode, a shift from a state, in which electric charge is induced in an interface on the side of the gate electrode in the storage state or the inversion state (FIG. 7A), to the depletion state (FIG. 7B) requires time of the order of several hundred μsec. Usually, the PIN photodiode is used in the depletion state because its photosensitivity is at maximum in the depletion state, but when being irradiated with strong external light and thereby entering a state of Vnp<0V, the PIN photodiode shifts to the storage state. Incidentally, Vnp is a potential of the n-type semiconductor region 54B (cathode electrode 56) when viewed from the p-type semiconductor region 54A (anode electrode 55) side. For this reason, even when an environment shifts to a dark state immediately after the irradiation of the strong external light, and also when the reset operation is performed so that a return to a state of Vnp>0V is made, it is difficult to shift from the storage state to the depletion state for several hundred μsec. It has been found that, at this moment, there is a difference in capacitance characteristic of a PIN diode due to an influence of the electric charge induced on a surface, between the depletion state and the storage state or between the depletion state and the inversion state. In other words, as illustrated in Parts (A) and (B) of FIG. 7, a capacity Cgp between the gate electrode 52 and the p-type semiconductor region 54A (anode electrode 55) is large in the storage state and small in the depletion state.

On the other hand, as for the storage capacity C0, the reset transistor Tr1 is turned on and therefore the storage capacity C0 is momentarily stabilized at the predetermined reset voltage Vrst. However, when the reset transistor Tr1 shifts from the ON state to the OFF state, a potential of the storage capacity C0 is affected by capacitive coupling in each circuit element and slightly changes from the predetermined reset voltage Vrst. FIG. 8 illustrates capacities C10, C20, C30 and C40 caused by the capacitive coupling, as examples.

Here, as described above, when the capacity C10 (Cgp) of the PIN photodiode (photoelectric conversion element PD1) connected to the storage capacity C0 in the depletion state is different from that in the storage state or the inversion state, the entire coupling amount changes depending on the state of the photoelectric conversion element PD1. Due to an influence of this, information about light received immediately before remains in the storage capacity C0 even after the reset operation is carried out. As a result, the problem of afterimage occurs.

As mentioned above, a state shift in the PIN photodiode requires several hundred μsec. Therefore, it is conceivable that the problem of afterimage can be improved by continuously or intermittently supplying the reset voltage Vrst to the storage capacity C0, for example, for about 100 μsec. Actually, however, if the period in which the reset voltage Vrst is supplied exceeds 1H (horizontal scan) period (for example, 32 μsec) as will be described later, the afterimage starts remarkably reducing.

[Specific Example of Control Operation for Controlling Reset Voltage]

Figure 10:
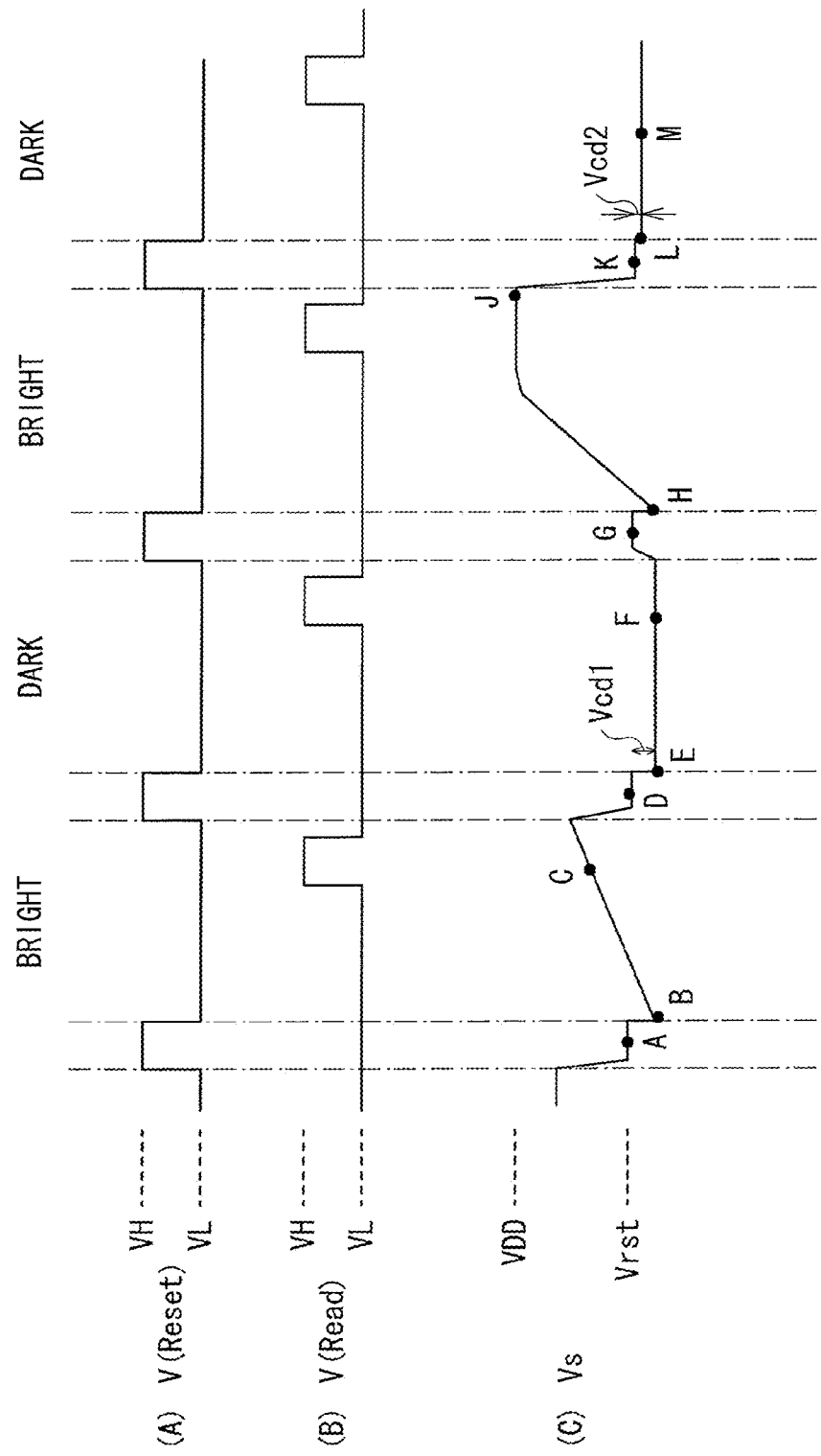
FIG. 10 is a timing waveform diagram illustrating an example of sensor operation (image-pickup operation) in the display device illustrated in FIG. 1.

FIG. 10 illustrates, in Part (A) through Part (C), timing waveforms representing an example of the sensor operation (image pickup operation) in this display device. In particular, Part (A) of FIG. 10 shows a voltage waveform of the reset-control signal V(Reset) applied to the gate of the reset transistor Tr1 illustrated in FIG. 5. Part (B) of FIG. 10 shows a voltage waveform of the read-control signal V(Read) applied to the select/read transistor Tr3. Part (C) of FIG. 10 shows a waveform of a voltage Vs in the storage node P1, on the one end of the storage capacity C0. "BRIGHT" and "DARK" shown in an upper portion of Part (A) of FIG. 10 indicate a period (bright period) during which the backlight 15 is on and a period (dark period) during which the backlight 15 is off, respectively.

First, at an operation point A shown in Part (C) of FIG. 10, the reset transistor Tr1 enters the ON state and therefore the voltage Vs of the storage node P1 is momentarily stabilized at the predetermined reset voltage Vrst. Subsequently, at an operation point B, accompanying the reset transistor Tr1 shifting to the OFF state, the voltage Vs of the storage node P1 shows a voltage drop by Vcd1=(VH−VL)×C30/(C10+C20+C30+C40) due to the capacitive coupling as illustrated in FIG. 8. Subsequently, at an operation point C (bright period), the light is subjected to photoelectric conversion by the photoelectric conversion element PD1, causing a rise in the voltage. And then, the select/read transistor Tr3 is turned on and therefore the voltage is output as the detection signal.

Afterwards, like the operation points A, B and C, it can be readily understood that in the dark period as well, operation voltages at operation points D, E, F, G and H would result. Subsequently, in the next bright period, at an operation point J, when a state of a potential of Q>(VDD−Vrst)/(C10+C20+C30+C40) resulting from the photoelectric conversion by the photoelectric conversion element PD1, a so-called saturated state, is achieved, and the voltage Vs of the storage node P1 at the operation point J is stabilized at an arbitrary potential. At this moment, as described above, the coupling capacity C10 of the photoelectric conversion element PD1 is larger than that in a non-saturated state and thus, a capacitive coupling amount Vcd2 received at the next operation point L is a potential smaller than Vcd1. For this reason, as indicated by the operation point F and an operation point M, even when the same amount of light is received, a signal voltage output after non-saturation is different from that after saturation and therefore, an image appears as if it were an afterimage from the viewpoint of the signal potential. At this moment, by subjecting the reset transistor Tr1 to driving control so that the predetermined reset voltage Vrst is supplied to the storage capacity C0 continuously or intermittently over a period exceeding 1H (horizontal scan) period, preferably, over a period of 100 μsec or more, the change in the coupling capacity C10 of the photoelectric conversion element PD1 is substantially dissolved so that Vcd1=Vcd2 is achieved and an afterimage phenomenon substantially disappears.

Figure 11:
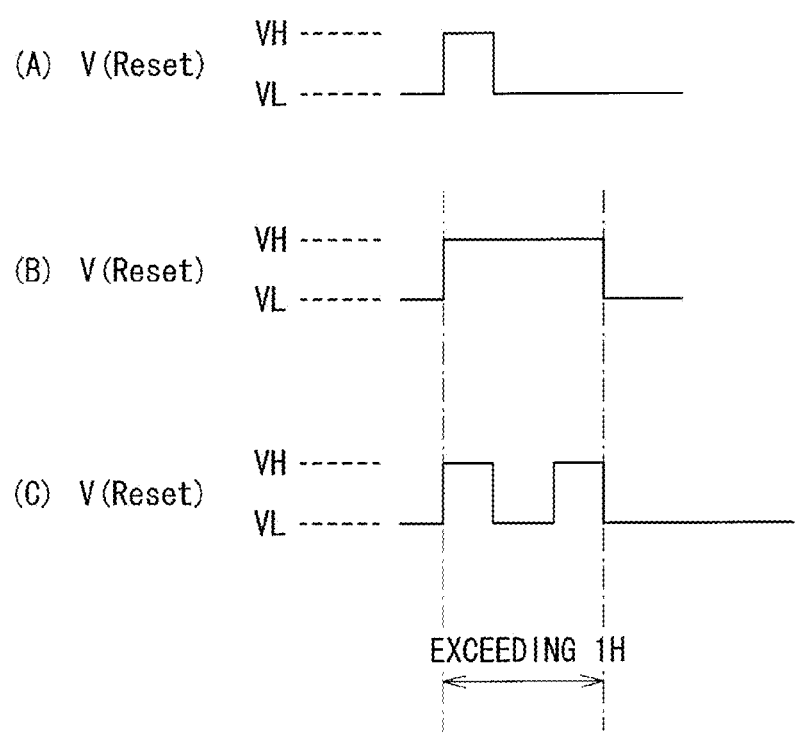
FIG. 11 is a diagram illustrating a timing waveform of a comparative example of a reset-control signal in Part (A), a timing waveform showing a first example of the reset-control signal in Part (B), and a timing waveform showing a second example of the reset-control signal in Part (C)

Part (B) and Part (C) of FIG. 11 illustrate a first example and a second example, respectively, of a voltage waveform suitable for the reset-control signal V(Reset) for eliminating the afterimage. Part (A) of FIG. 11 illustrates a voltage waveform of a comparative example.

For example, as illustrated in Part (B) of FIG. 11, a signal having a voltage pulse width corresponding a period exceeding 1H (horizontal scan) period (for example, 100 μsec or more) is applied to the gate terminal of the reset transistor Tr1 as the reset-control signal V(Reset). Consequently, the predetermined reset voltage Vrst is continuously supplied to the storage capacity C0 over the period exceeding 1H (horizontal scan) period. Thus, even when the photoelectric conversion element PD1 is in the saturated state, it may be possible to reliably reset the electric charge stored in the storage capacity C0 so as to prevent the occurrence of the afterimage.

Further, as illustrated in Part (C) of FIG. 11, a voltage pulse signal may be intermittently applied as the reset-control signal V(Reset) to the gate terminal of the reset transistor Tr1, twice or more, during the period exceeding 1H (horizontal scan) period (for example, 100 μsec or more). Consequently, the predetermined reset voltage Vrst is intermittently supplied to the storage capacity C0 over the period exceeding 1H period.

By performing the reset control as illustrated in Parts (B) and (C) of FIG. 11, even when the photoelectric conversion element PD1 is in the saturated state, it may be possible to reliably reset the electric charge stored in the storage capacity C0 so as to prevent the occurrence of the afterimage. In contrast, as illustrated in Part (A) of FIG. 11, when the reset-control signal V(Reset) having a voltage pulse width equal to or less than 1H (horizontal scan) period is applied, the predetermined reset voltage Vrst is applied only for a short period equal to or less than 1H period and thus, there is a case in which it is difficult to sufficiently reset the electric charge stored in the storage capacity C0.

Figure 9:
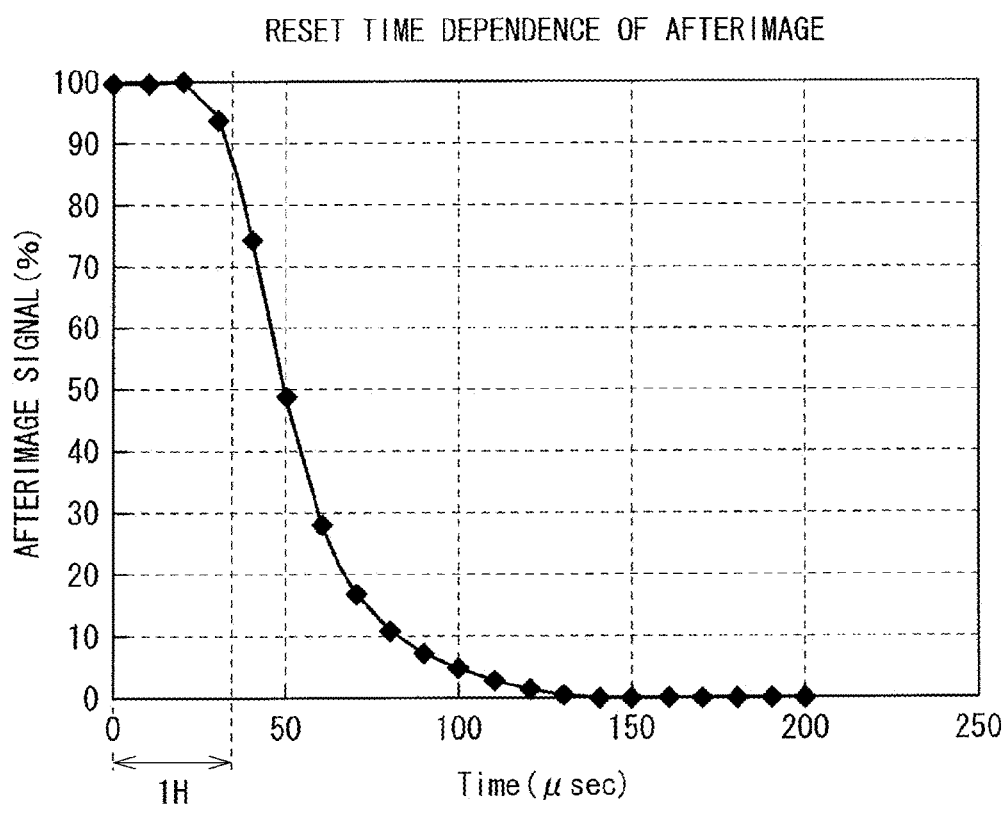
FIG. 9 is a graph showing an afterimage characteristic of the sensor element illustrated in FIG. 5.

FIG. 9 illustrates a result of verifying the afterimage characteristic of the sensor element 33 illustrated in FIG. 5 by experiment. This characteristic is based on the assumption that a vertical axis is an amount of signals (amount of afterimage signals) in the dark period when an amount of light, which makes the photoelectric conversion element PD1 saturate in the bright period in FIG. 10, is incident upon the sensor element 33 and no light is incident upon the sensor element 33 in the dark period. A horizontal axis indicates a period in which the reset voltage Vrst is applied. As measuring conditions of FIG. 9, one frame period is 16.6 msec and 1H (horizontal scan) period is 32 μsec. As apparent from FIG. 9, the longer the period of applying the reset voltage Vrst, the smaller the amount of afterimage signals. Particularly, the period of applying the reset voltage Vrst exceeds 1H period, then the amount of afterimage signals starts remarkably reducing. The afterimage signals reach an invisible level when the amount of afterimage signals is approximately 10% or less of the maximum. Therefore, a period exceeding 1H period, practically, 100 μsec or more is sufficient as the period of applying the reset voltage Vrst, and it is desirable to apply the reset voltage Vrst over a period of 140 μsec or more in which the afterimage signals are reduced to zero.

In this way, according to the display device with the input function of the present embodiment, the predetermined reset voltage Vrst is supplied to the storage capacity C0 continuously or intermittently over the period exceeding 1H period. Therefore, even when, for example, the photoelectric conversion element PD1 is in the saturated state, it may be possible to perform stable detection operation by reliably resetting the electric charge stored in the storage capacity C0 so as to reduce an afterimage. Consequently, for example, it may be possible to perform sensor operation to precisely detect the position of an object that moves faster.

[Examples of Executing Application Program]

Next, with reference to FIG. 15A through FIG. 18, there will be described some examples of executing an application program by the application-program executing section 11, in which the positional information and the like of the object detected by the proximity-object detection processing described above are used.

Figure 15A:
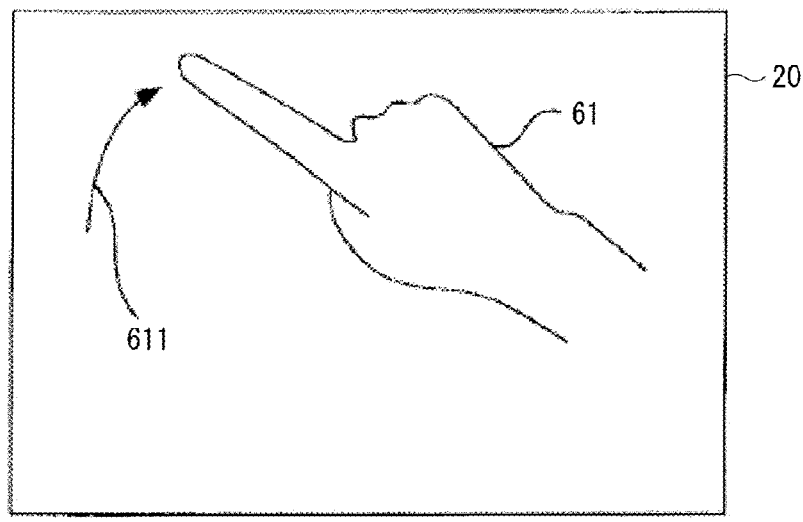
FIGS. 15A and 15B are explanatory diagrams illustrating a first example and a second example, respectively, of executing an application program by using a result of proximity-object detection processing in the display device illustrated in FIG. 1.

A first example illustrated in FIG. 15A is an example in which the surface of the I/O display panel 20 is touched by a finger tip 61, and a trail of touched points is displayed on a screen as a drawn line 611.

Figure 15B:
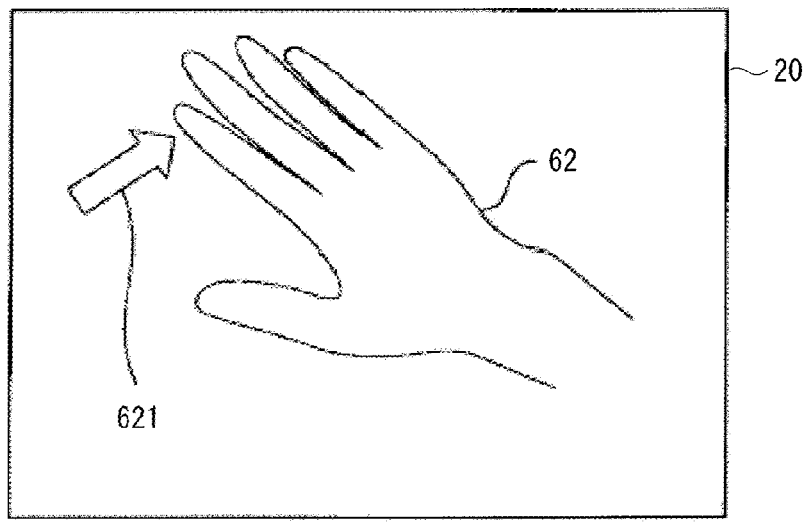

A second example illustrated in FIG. 15B is an example in which a gesture is recognized by using the shape of a hand. Specifically, the shape of a hand 62 touching (or near) the I/O display panel 20 is recognized, the recognized shape of the hand is displayed as a displayed object, and a movement 621 of the displayed object is used to carry out some processing.

Figure 16:
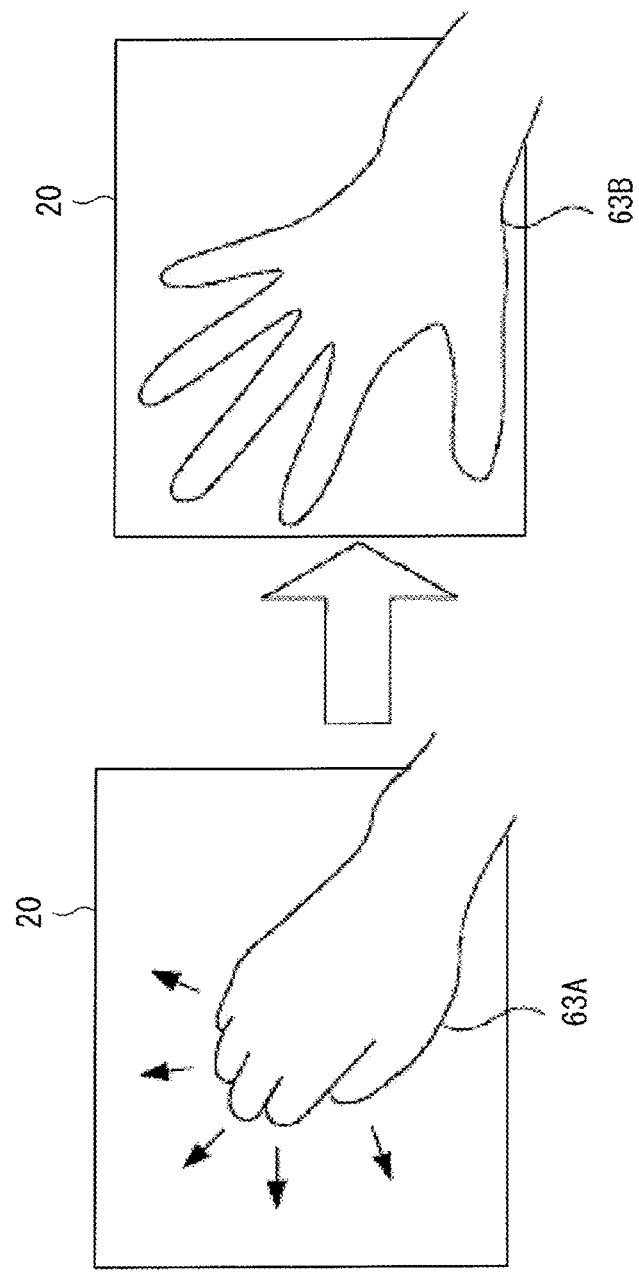
FIG. 16 is an explanatory diagram illustrating a third example of executing an application program by using a result of the proximity-object detection processing.

A third example illustrated in FIG. 16 is an example in which a closed hand 63A is changed to an open hand 63B, image recognition of a touch or an approach of each hand is performed by the I/O display panel 20, and processing based on the image recognition is executed. Through the processing based on the image recognition, it may be possible to give a direction such as zooming in. In addition, since it may be possible to give such a direction, when, for example, the I/O display panel 20 is connected to a personal computer, input through manipulation of switching commands on the personal computer can be replaced by input through the image recognition and thus, directions can be input more naturally.

Figure 17:
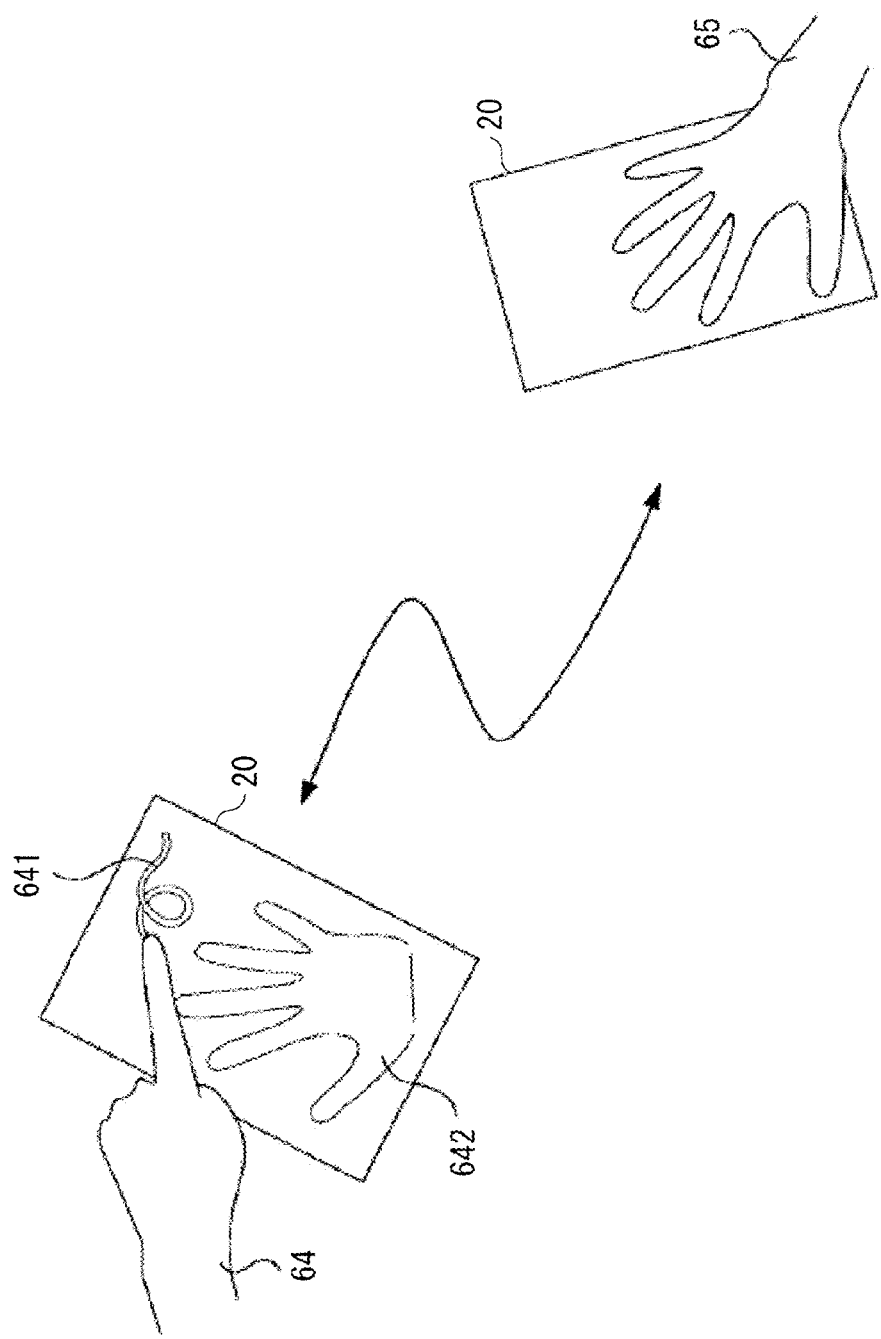
FIG. 17 is an explanatory diagram illustrating a fourth example of executing an application program by using a result of the proximity-object detection processing.

A fourth example illustrated in FIG. 17 is an example in which two I/O display panels 20 are prepared and connected to each other by some transmission means. In this structure, an image obtained by detecting a touch on or an approach to one of the I/O display panels 20 may be transmitted to and then displayed by the other of the I/O display panels 20, and users operating the respective I/O display panels 20 may communicate with each other. For example, as illustrated in FIG. 17, it may be possible to perform such processing that one of the I/O display panels 20 is caused to obtain an image of the shape of a hand 65 through image recognition and transmit the obtained image to the other of the I/O display panels 20 that in tern is caused to display a hand shape 642 identical to the shape of the hand 65. It may be also possible to perform, for instance, processing such as causing a trail 641 displayed as a result of a touch by a hand 64 on the other of the I/O display panels 20 to be transmitted to and then displayed by the one of the I/O display panels 20. In this way, a state of drawing is transmitted as a moving image and handwritten characters or graphics are sent to a counterpart, which creates a possibility that the I/O display panel 20 may become a new communication tool. For instance, the I/O display panel 20 is assumed to be applied to a display panel of a portable telephone terminal Incidentally, FIG. 17 illustrates the example in which two I/O display panels 20 are prepared, but it may be possible to perform similar processing by connecting three or more I/O display panels 20 to one another with a transmission means.

Figure 18:
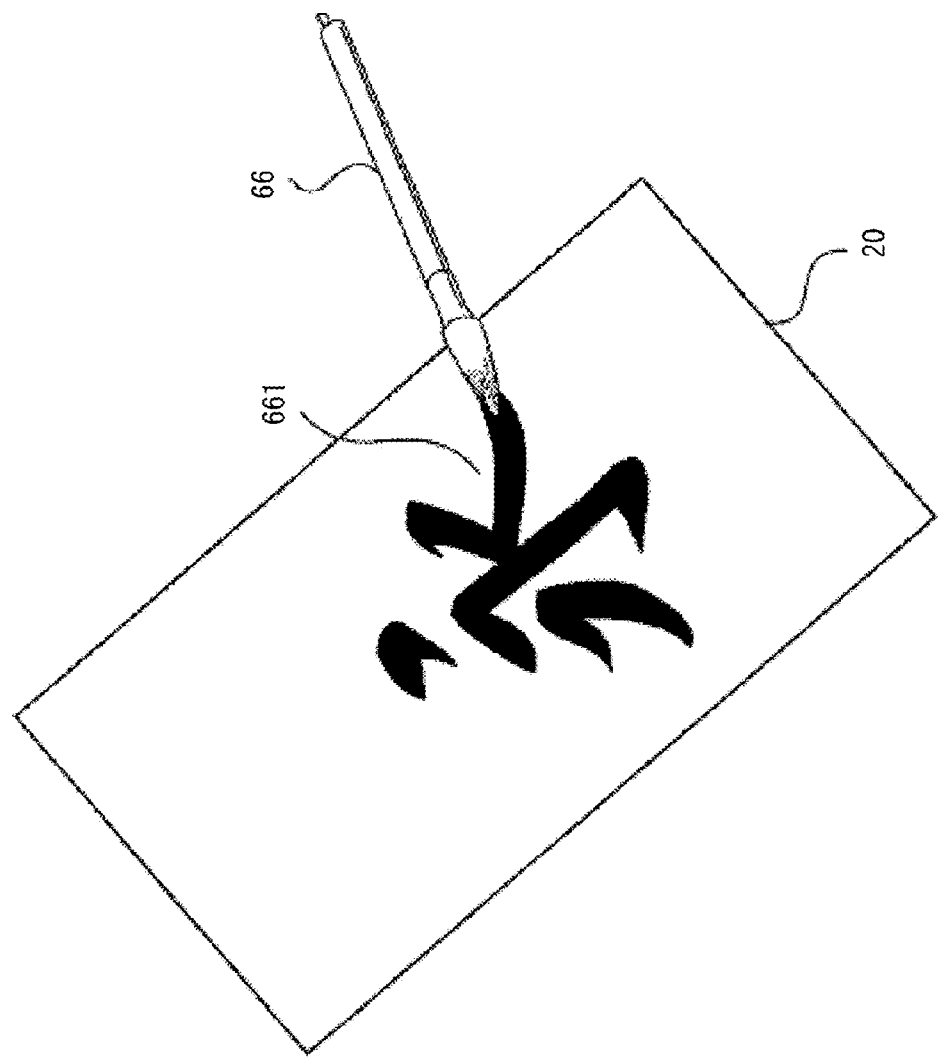
FIG. 18 is an explanatory diagram illustrating a fifth example of executing an application program by using a result of the proximity-object detection processing.

Further, as illustrated in a fifth example of FIG. 18, a writing brush 66 is used to write a character on the surface of the I/O display panel 20 by being caused to touch the surface of the I/O display panel 20, and points touched by the writing brush 66 are displayed as an image 661 on the I/O display panel 20 and thus, input of handwriting by the writing brush is made possible. In this case, it may be possible to recognize and realize even faint touches of the writing brush. In a case of recognition of handwriting in the past, for example, inclinations of a special pen are realized by electric-field detection in some digitizer. However, in the present example, a surface touched by the real writing brush is detected and thus, information can be input with a more realistic feeling.

MODULE AND APPLICATION EXAMPLES

Next, with reference to FIG. 19 through FIG. 23G, there will be described application examples of the display device with the input function described above. This display device can be applied to electronic units in all fields, which display externally-input video signals or internally-generated video signals as still or moving images. For example, the display device can be applied to electronic units such as television receivers, digital cameras, laptop computers, portable terminal devices such as portable telephones, and video cameras.

Application Example 1

Figure 19:
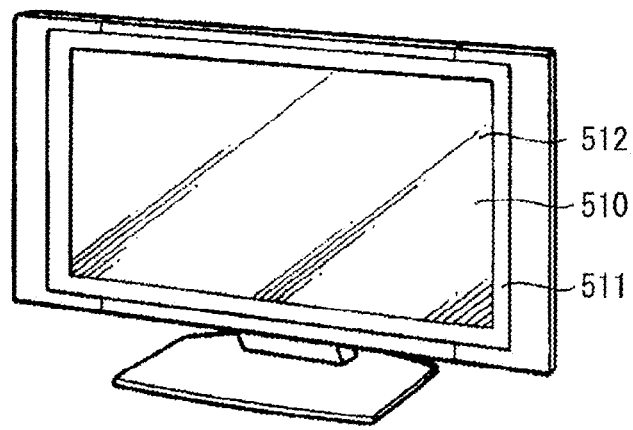
FIG. 19 is an external perspective view of a first application example of the display device illustrated in FIG. 1.

FIG. 19 illustrates an external view of a television receiver serving as a first example of the electronic units. This television receiver has, for example, a video display screen section 510 including a front panel 511 and a filter glass 512. The display device with the input function described above can be applied to the video display screen section 510 of this television receiver.

Application Example 2

Figure 20A:
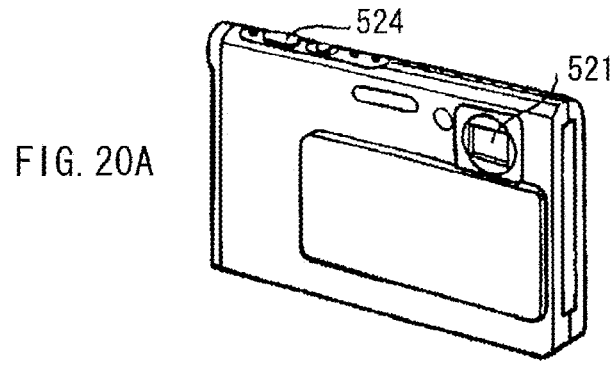
FIGS. 20A and 20B are perspective external views of a second application example, when viewed from the front and the back, respectively.
Figure 20B:
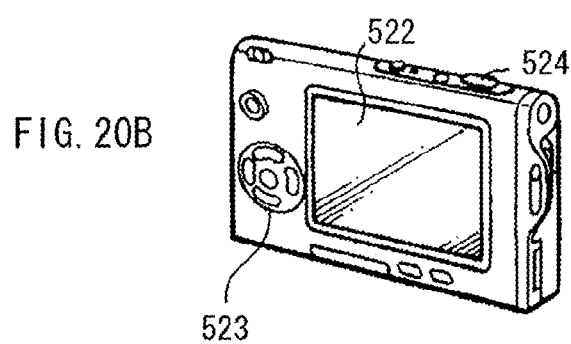

FIGS. 20A and 20B are external views of a digital camera serving as a second example of the electronic units. This digital camera includes, for example, a flash emitting section 521, a display section 522, a menu switch 523, and a shutter button 524. The display device with the input function described above can be applied to the display section 522 of this digital camera.

Application Example 3

Figure 21:
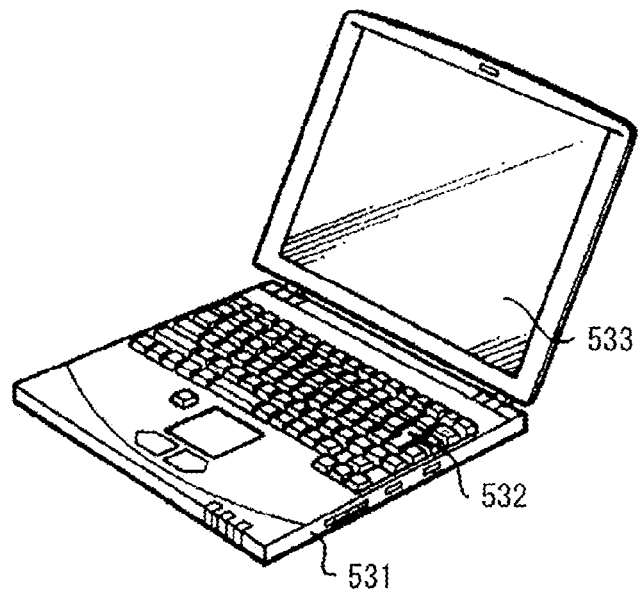
FIG. 21 is an external perspective view of a third application example.

FIG. 21 is an external view of a laptop computer serving as a third example of the electronic units. This laptop computer includes, for example, a main body 531, a keyboard 532 used to enter characters and the like, and a display section 533 displaying an image. The display device with the input function described above can be applied to the display section 533 of this laptop computer.

Application Example 4

Figure 22:
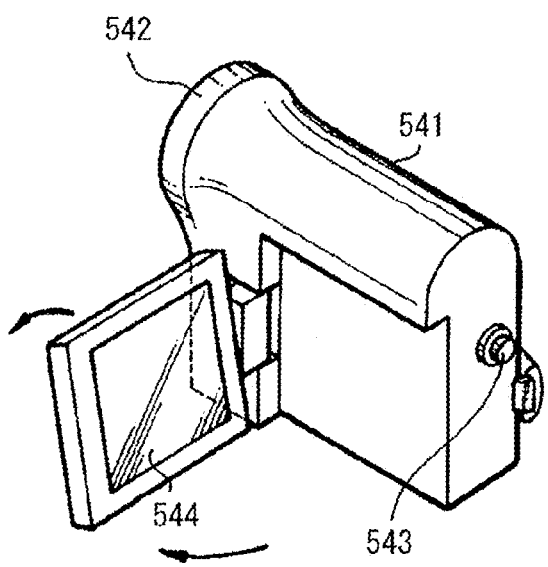
FIG. 22 is an external perspective view of a fourth application example.
Figure 23:
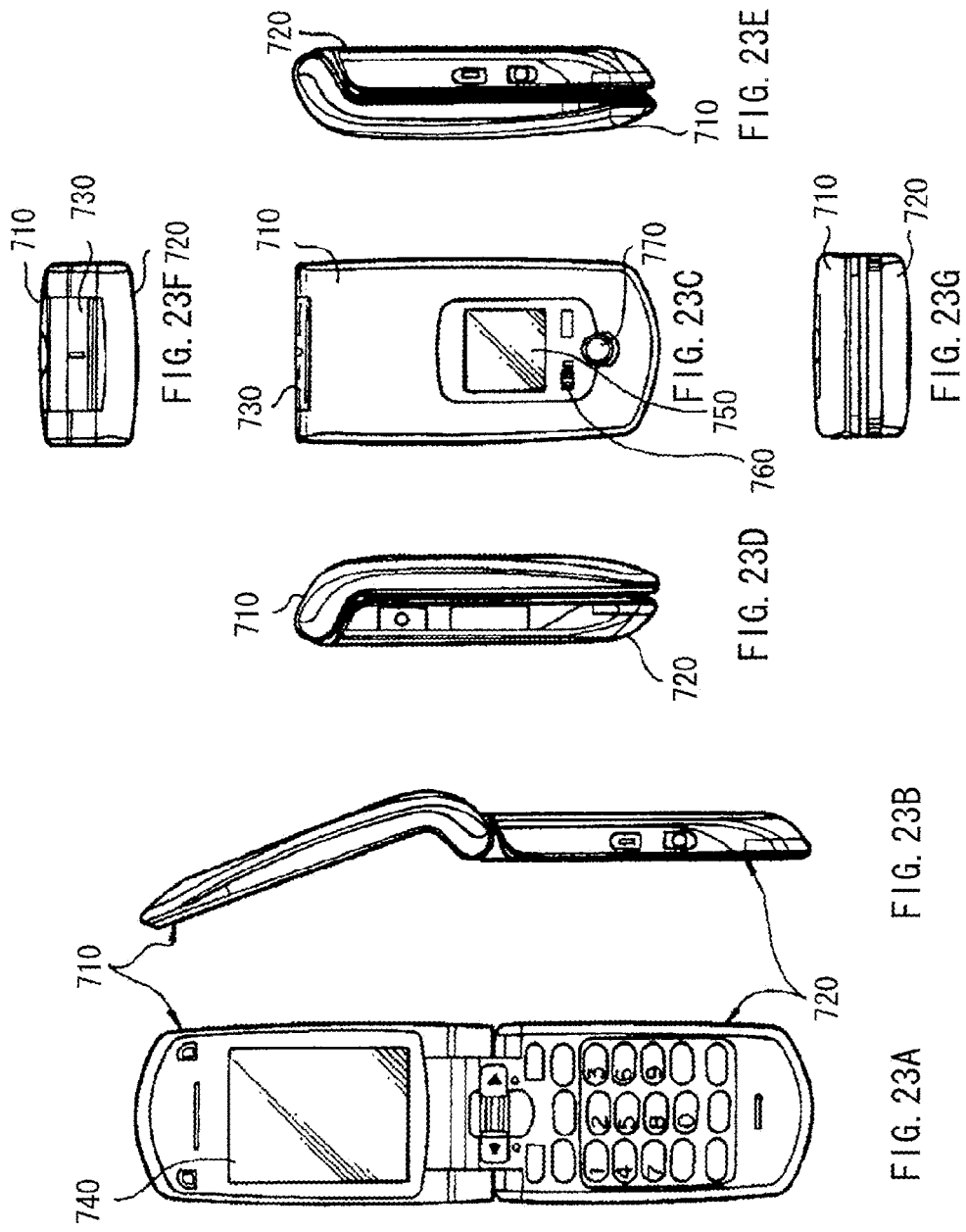
FIGS. 23A through 23G are diagrams illustrating a fifth application example, namely.

FIG. 22 is an external view of a video camera serving as a fourth example of the electronic units. This video camera includes, for example, a main unit 541, a lens 542 disposed on a front face of the main unit 541 to shoot an image of a subject, a start/stop switch 543 used at the time of shooting, and a display section 544. The display device with the input function described above can be applied to the display section 544 of this video camera.

Application Example 5

FIGS. 23A through 23G are external views of a portable telephone serving as a fifth example of the electronic units. This portable telephone includes, for example, an upper housing 710, a lower housing 720, a coupling section (hinge section) 730 that couples the upper and lower housings 710 and 720 to each other, a display 740, a sub-display 750, a picture light 760, and a camera 770. The display device with the input function described above can be applied to the display 740 or the sub-display 750 of this portable telephone.

<Modifications of First Embodiment>

The present invention can be modified and implemented in various ways without being limited to the above-described first embodiment and application examples. For example, the first embodiment and the like have been described above by taking the case of the I/O display panel 20 having the liquid crystal display panel provided with the backlight 15 as an example, but the backlight for display may double as a light for detection, or a light dedicated to detection may be provided. Moreover, when the light for detection is provided, it is preferable to use light in a wavelength range other than a visible-light range (for example, infrared ray).

Further, the first embodiment and the like have been described above by employing the display device with the input function, which has the display panel (I/O display panel 20) including the display pixels 31RGB and the sensor elements 33, but the present invention can be applied to any device other than the display device. For example, the present invention can be applied to a mere sensor device without a display function. In this case, for example, in place of the I/O display panel 20, there may be provided a sensor panel in which only the sensor elements 33 are arranged in a matrix form within a single plane while the display pixels 31RGB are not provided.

<Second Embodiment>
[Entire Structure of Radiation Image Pickup Device]

Figure 24:
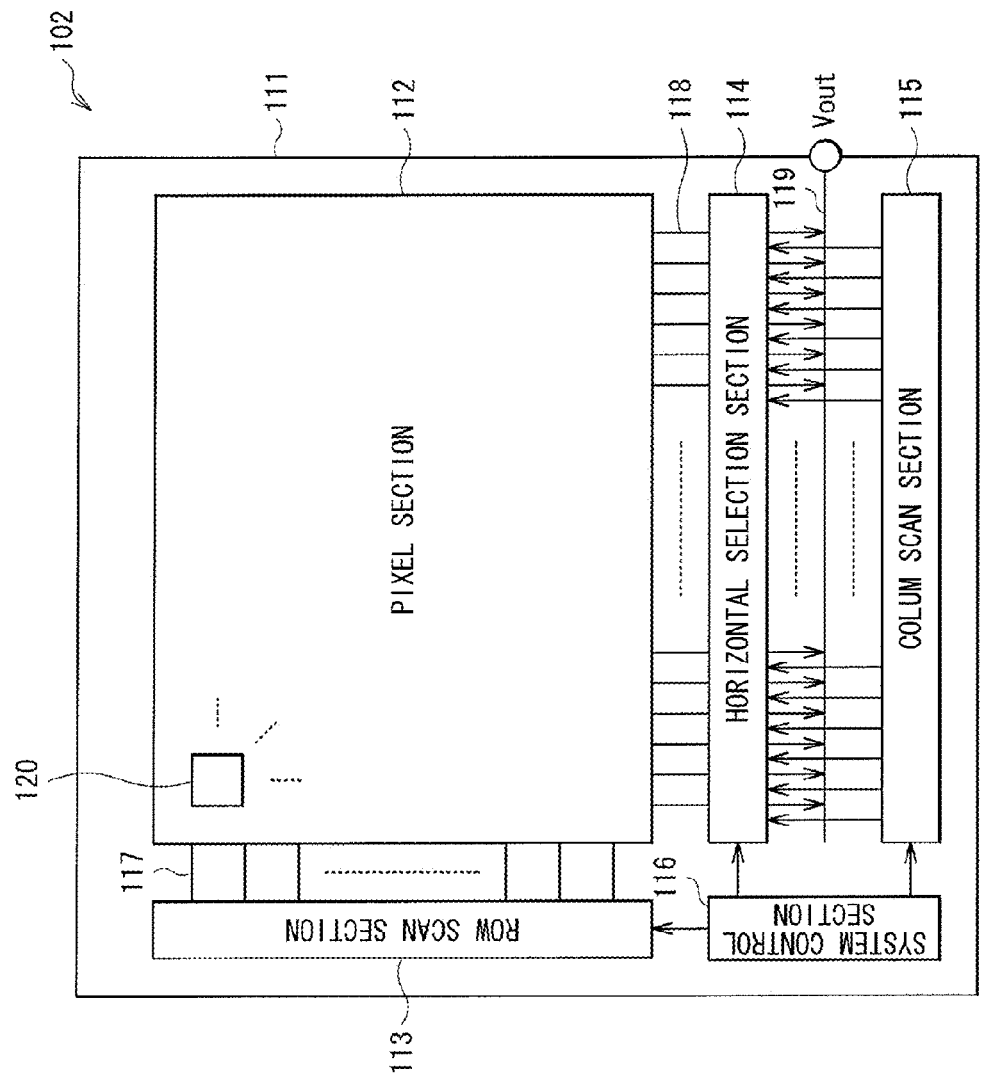
FIG. 24 is a block diagram illustrating a configuration example of a photoelectric converter according to a second embodiment of the present invention.
Figure 25:
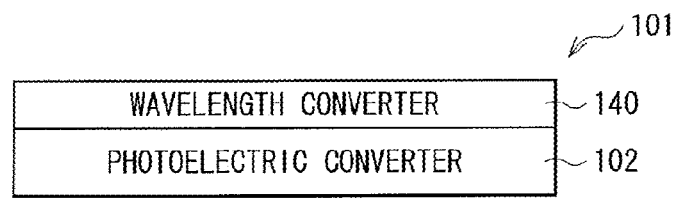
FIG. 25 is a configuration diagram illustrating a radiation image pickup device configured of a combination of the photoelectric converter and a wavelength converter.

In a second embodiment, the configuration example in which the present invention is applied to a radiation image pickup device will be described. FIG. 24 illustrates a system configuration of a photoelectric converter 102 incorporated in a radiation image pickup device 101 according to the embodiment. The radiation image pickup device 101 is provided with a wavelength converter 140 on the photoelectric converter 102 as illustrated in FIG. 25. The radiation image pickup device 101 reads information based on radiation through converting the wavelength of the radiation, which is represented by alpha-ray, beta-ray, gamma-ray, and X-ray, by the wavelength converter 140.

The wavelength converter 140 converts the wavelength of the radiation described above into the wavelength in the sensitive range of the photoelectric converter 102. The wavelength converter 140 is a phosphor (for example, a scintillator) converting radiation such as X-ray into light having a wavelength longer than that of the radiation (for example, visible light). Specifically, the wavelength converter 140 is obtained by forming phosphor film such as CsI, NaI, and CaF2 on the top surface of a flattening film composed of an organic flattening film, spin-on-glass material, or the like.

The photoelectric converter 102 includes a pixel section 112 on a substrate 111, and a peripheral circuit section (drive section) is provided so as to surround the pixel section 112. The peripheral circuit section is composed of, for example, a row scan section (vertical drive section) 113, a horizontal selection section 114, a column scan section (horizontal drive section) 115 and a system control section 116.

In the pixel section 112, a plurality of unit pixels 120 (hereinafter, simply refer to as a "pixel" in some cases) are two-dimensionally arranged in a matrix form. Each of the unit pixels 120 has a photoelectric conversion section (photoelectric conversion element PD11 to be described later) generating photoelectric charge of an amount according to an amount of incident light and storing the photoelectric charge therein.

In the pixel section 112, pixel drive lines 117 are provided along a row direction (a pixel arrangement direction in a pixel row) for each pixel row of the matrix pixel arrangement, and vertical signal lines (read lines) 118 are provided along a column direction (a pixel arrangement direction in a pixel column) for each pixel column. The pixel drive line 117 transmits drive signals for reading signals from pixels. As the pixel drive line 117, for example, a read-control signal line Read and a reset-control signal line Reset that are connected to a pixel circuit in FIG. 26 or the like (described later) are provided for each pixel row. One end of the pixel drive line 117 is connected to output end corresponding to each row of the row scan section 113.

The row scan section 113 includes a shift resistor, an address decoder or the like, and is served as a pixel drive section driving each pixel of the pixel section 112 in row unit, for example. The signal output from each unit pixel in the pixel row which is selectively scanned by the row scan section 113 is supplied to the horizontal selection section 114 through each vertical signal line 118. The horizontal selection section 114 includes an amplifier, a horizontal selection switch or the like provided for each vertical signal line 118.

The column scan section 115 includes a shift resistor, an address decoder or the like, and scans and sequentially drives each horizontal selection switch of the horizontal selection section 114. By the selective scanning of the column scan section 115, a signal of each pixel transmitted through each vertical signal line 118 is sequentially output to the horizontal signal line 119, and then transmitted to outside of the substrate 111 through the horizontal signal line 119.

The circuit section composed of the row scan section 113, the horizontal selection section 114, the column scan section 115 and the horizontal signal lines 119 is configured together with one or both of a circuit and an external control IC which are formed on the substrate 111. Alternatively, the circuit section may be formed on the other substrate connected by a cable or the like.

The system control section 116 receives, for example, a clock provided from the outside of the substrate 111 or data instructing an operation mode, and outputs data such as internal information of the photoelectric converter 102. The system control section 116 further has a timing generator for generating various timing signals, and controls drive of the peripheral circuit section including the row scan section 113, the horizontal selection section 114 and the column scan section 115, based on the various timing signals generated by the timing generator.

[Circuit Configuration of Unit Pixel 120 (Sensor Element)]

The circuit configuration of the unit pixel 120 is classified into active type and passive type. Examples of the circuit configuration in each type will be described with reference to FIG. 26 to FIG. 29.

(First Configuration Example of Active Pixel Circuit)

Figure 26:
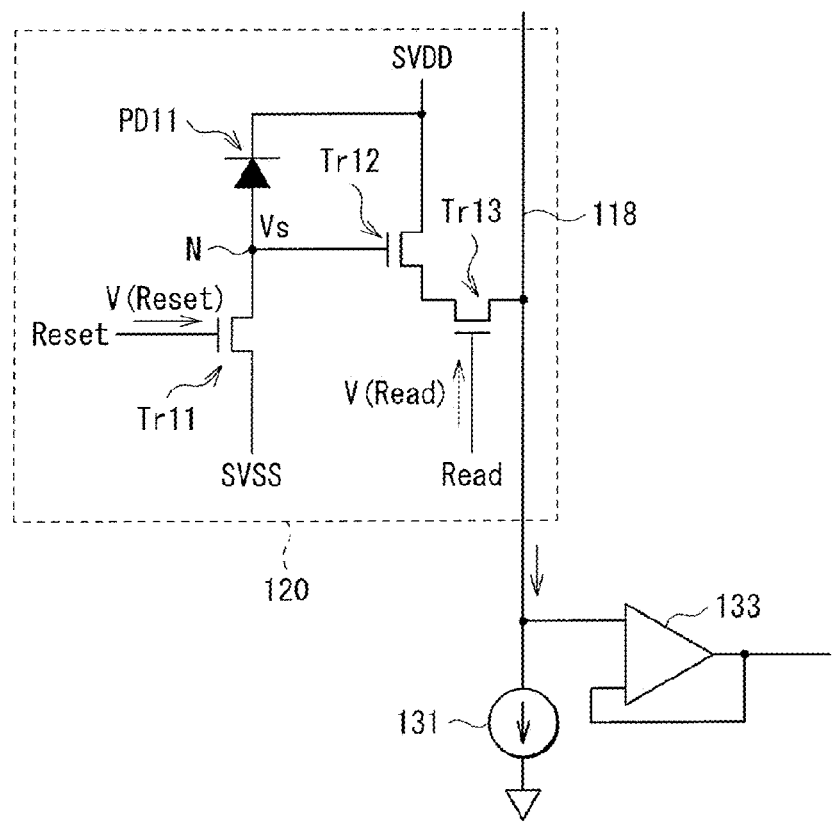
FIG. 26 is a circuit diagram illustrating a first configuration example of an active pixel circuit applied to the photoelectric converter illustrated in FIG. 24.

FIG. 26 illustrates a first configuration example in which the unit pixel 120 is configured with an active pixel circuit. In the first configuration example of the active pixel circuit, the unit pixel 120 is provided with the photoelectric conversion element PD11, a storage node N (a charge storage section), a reset transistor Tr11, an amplification transistor Tr12 and a select/read transistor Tr13. As the pixel drive line 117, for example, two wires, specifically, the read-control signal line Read and the reset-control signal line Reset are provided for each pixel row of the unit pixel 120.

Figure 30:
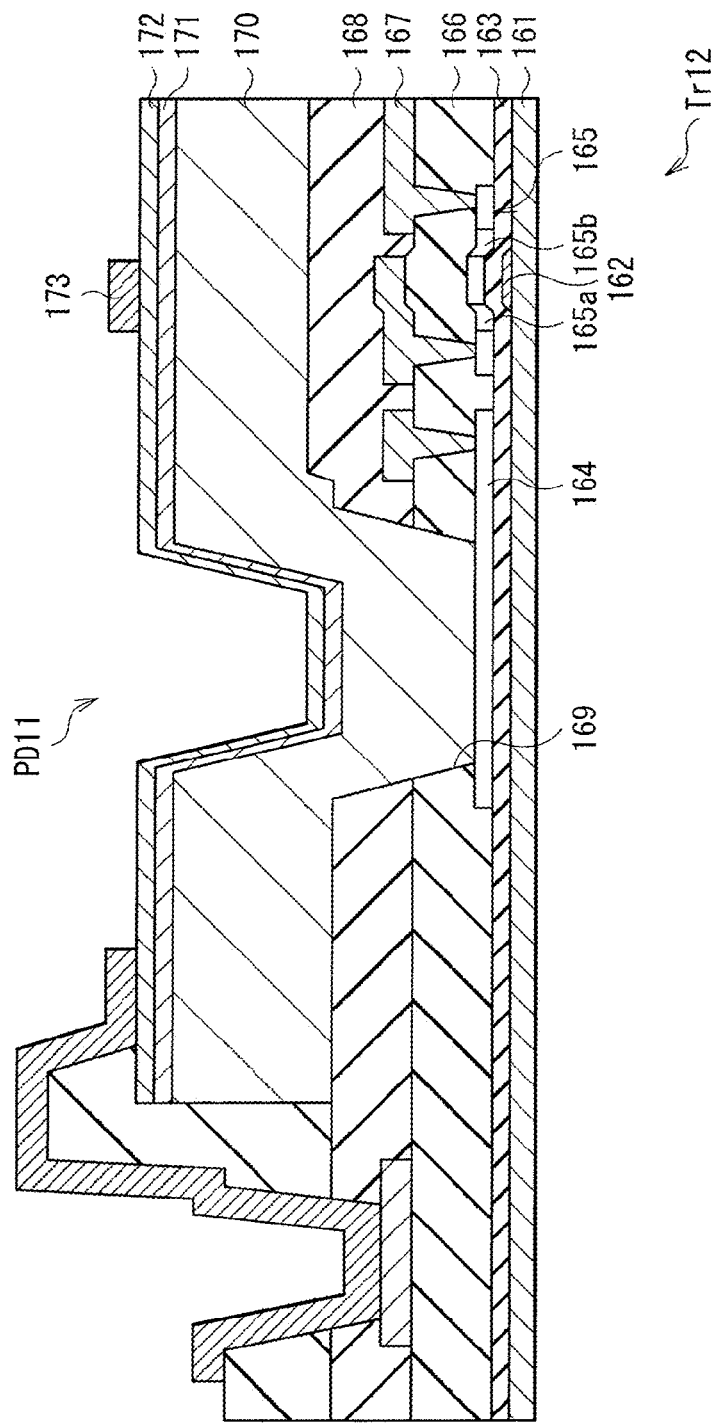
FIG. 30 is a cross-sectional diagram illustrating a main part of the photoelectric converter illustrated in FIG. 24.

The photoelectric conversion element PD11 generates electric charge according to an amount of incident light, and is, for example, a PIN photodiode. The PIN photodiode has, as illustrated in FIG. 30 to be described later, a p-type semiconductor region (p-type semiconductor layer 164), an n-type semiconductor region (n-type semiconductor layer 171), and an intrinsic semiconductor region (i-type semiconductor layer 170) formed between the p-type semiconductor region and the n-type semiconductor region. An anode electrode of the photoelectric conversion element PD11 is connected to the p-type semiconductor region, and a cathode electrode is connected to the n-type semiconductor region. The cathode electrode of the photoelectric conversion element PD11 is connected to a power supply line SVD for supplying a power supply voltage VDD. One end (anode electrode) of the photoelectric conversion element PD11 is connected to one end (drain terminal) of the reset transistor Tr11.

The storage node N is connected to one end (the anode electrode) of the photoelectric conversion element PD11, one end (the drain terminal) of the reset transistor Tr11, and a gate terminal of the amplification transistor Tr12. The storage node N stores electric charge converted by the photoelectric conversion element PD11. A voltage fluctuation occurs in a voltage value Vs of the storage node N according to the electric charge stored in the storage node N.

Each of the reset transistor Tr11, the amplification transistor Tr12 and the select/read transistor Tr13 includes a Thin Film Transistor (TFT) and the like.

A gate terminal of the reset transistor Tr11 is connected to the reset-control signal line Reset for supplying a reset-control signal V(Reset), and a source terminal of the reset transistor Tr11 is connected to a supply line SVSS for supplying a predetermined voltage (reset voltage Vrst). The drain terminal of the reset transistor Tr11 and the gate terminal of the amplification transistor Tr12 are connected to the storage node N. A drain terminal of the amplification transistor Tr12 is connected to the power supply line SVDD for supplying the power supply voltage VDD. A source terminal of the amplification transistor Tr12 is connected to a drain terminal of the select/read transistor Tr13. A gate terminal of the select/read transistor Tr13 is connected to the read-control signal line Read for supplying a read-control signal V(Read), and a source terminal of the select/read transistor Tr13 is connected to a readout line 41.

The reset transistor Tr11 is provided to supply the predetermined reset voltage Vrst to the storage node N, thereby resetting the voltage value Vs of the storage node N to the predetermined reset voltage Vrst (to release the electric charge stored in the storage node N). In the present embodiment, as illustrated in operation timing examples (FIG. 31, FIG. 33 and the like) to be described later, the row scan section 113 and the system control section 116 in FIG. 24 control a pulse period of the reset-control signal V(Reset) applied to the gate terminal of the reset transistor Tr11, so that the predetermined reset voltage Vrst is continuously or intermittently supplied to the storage node N over a period exceeding 1H (horizontal scan) period.

The amplification transistor Tr12 and the select/read transistor Tr13 form a signal readout circuit to read the voltage value according to the electric charge stored in the storage node N and output the read voltage value as the sensor detection signal. The sensor detection signal is output to the vertical signal line (readout line) 118 at the time when the select/read transistor Tr13 is turned on in response to the read-control signal V(Read) applied to the gate terminal The amplification transistor Tr12 and the select/read transistor Tr13 combined are a specific example of the "readout section" according to the embodiment of the present invention.

A constant current source 131 is connected to one end of the vertical signal line 118. An amplifier 133 configuring an input section of the horizontal selection section 114 in FIG. 24 is also connected to the vertical signal line 118. The signal output to the vertical signal line 118 is input to the amplifier 133 for each pixel column.

(Second Configuration Example of Active Pixel Circuit)

Figure 27:
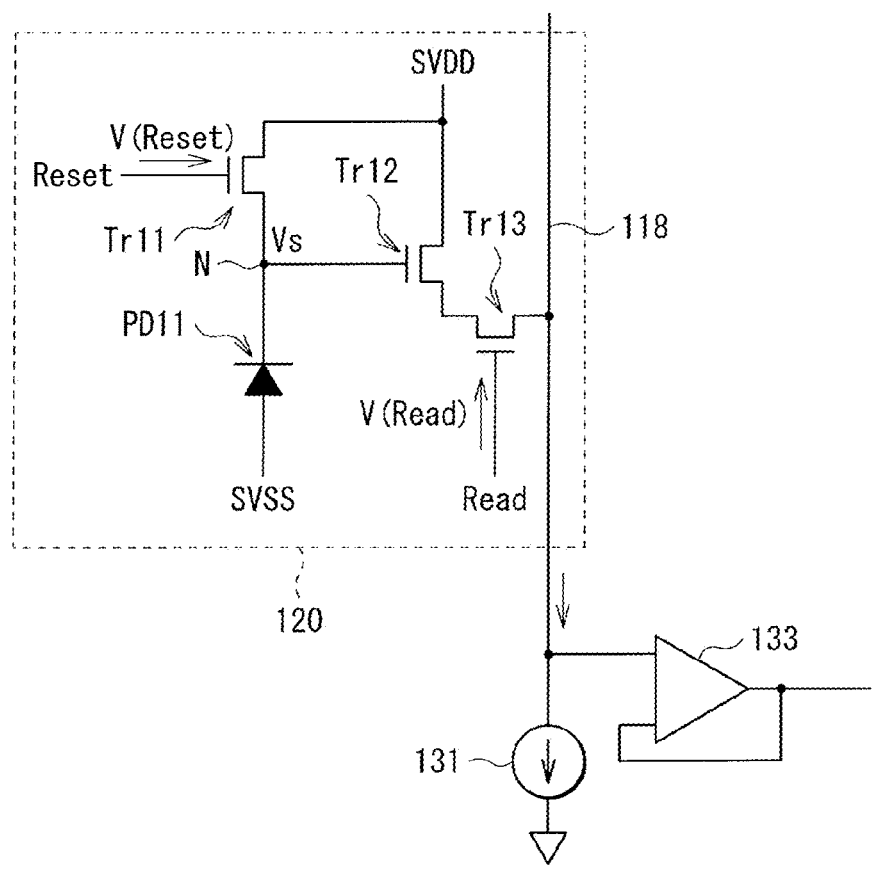
FIG. 27 is a circuit diagram illustrating a second configuration example of an active pixel circuit applied to the photoelectric converter illustrated in FIG. 24.

FIG. 27 illustrates a second configuration example in which the unit pixel 120 is configured with an active pixel circuit. In the second configuration example, positional relation between the photoelectric conversion element PD11 and the reset transistor Tr11 is different from that of the first configuration example (FIG. 26) with the active pixel circuit. In the first configuration example, the storage node N is formed between the anode electrode (p-type semiconductor region) of the photoelectric conversion element PD11 and the drain terminal of the reset transistor Tr11. In contrast, in the second configuration example, the storage node N is formed between the cathode electrode (n-type semiconductor region) of the photoelectric conversion element PD11 and the drain terminal of the reset transistor Tr11. In addition, the source terminal of the reset transistor Tr11 is connected to the power supply line SVDD for supplying the power supply voltage VDD. The anode electrode of the photoelectric conversion element PD11 is connected to the power supply line SVSS for supplying the predetermined voltage.

(First Configuration Example of Passive Pixel Circuit)

Figure 28:
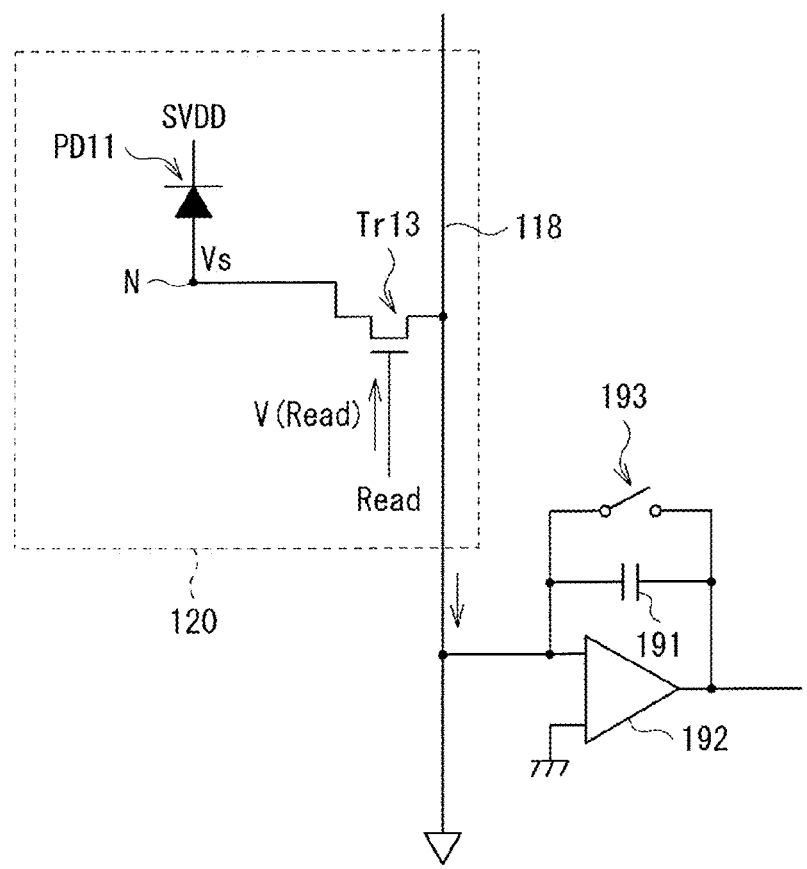
FIG. 28 is a circuit diagram illustrating a first configuration example of a passive pixel circuit applied to the photoelectric converter illustrated in FIG. 24.

FIG. 28 is a first configuration example in which the unit pixel 120 is configured with a passive pixel circuit. In the first configuration example of the passive pixel circuit, the unit pixel 120 is provided with the photoelectric conversion element PD11, the storage node N, and the select/read transistor Tr13. A charge amplification circuit configuring the input section of the horizontal selection section 114 in FIG. 24 is connected to the vertical signal line 118. The charge amplification circuit is composed of a capacitor (feedback capacitance) 191, a charge amplifier 192 and a switch 193.

The storage node N is formed between the anode electrode (p-type semiconductor region) of the photoelectric conversion element PD11 and the drain terminal of the select/read transistor Tr13. The cathode electrode (n-type semiconductor region) of the photoelectric conversion element PD11 is connected to the power supply line SVDD for supplying the power supply voltage VDD.

(Second Configuration Example of Passive Pixel Circuit)

Figure 29:
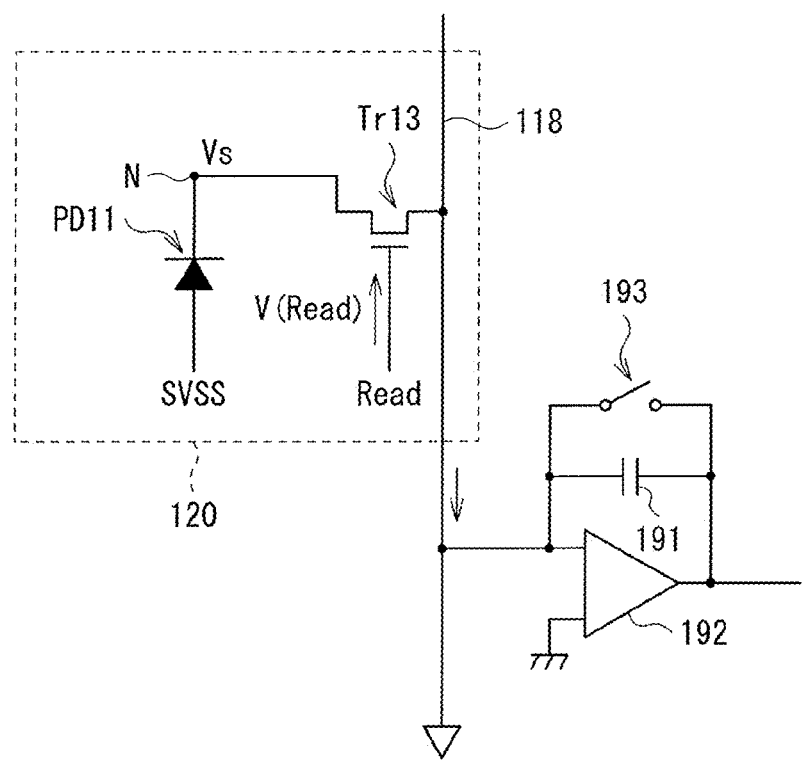
FIG. 29 is a circuit diagram illustrating a second configuration example of a passive pixel circuit applied to the photoelectric converter illustrated in FIG. 24.

FIG. 29 illustrates a second configuration example in which the unit pixel 120 is configured with a passive pixel circuit. In the second configuration example, the positional relation between the storage node N and the photoelectric conversion element PD11 is different from that of the first configuration example (FIG. 28) with the passive pixel circuit. In the second configuration example, the storage node N is formed between the cathode electrode (n-type semiconductor region) of the photoelectric conversion element PD11 and the drain terminal of the select/read transistor Tr13. The anode electrode (p-type semiconductor region) of the photoelectric conversion element PD11 is connected to the power supply line SVSS for supplying the predetermined voltage.

The passive pixel circuit in FIG. 28 and FIG. 29, different from the active pixel circuit in FIG. 26 and FIG. 27, the reset transistor Tr11 is not provided. Moreover, the reset-control signal V(Reset) is not used during the reset operation. In the passive pixel circuit, the readout operation of the sensor detection signal and the normal reset operation of the storage node N are carried out substantially at the same time. The readout operation is carried our at the time when the select/read transistor Tr13 is turned on in response to the read-control signal V(Read) applied to the gate terminal. When the select/read transistor Tr13 is turned on, the electric charge stored in the storage node N is then stored in the capacitor 191 of the charge amplification circuit, and the signal voltage according to the stored electric charge is output (read) from the charge amplifier 192. With the readout operation, the electric charge stored in the storage node N is reset to the predetermined reset voltage Vrst. The switch 193 of the charge amplification circuit is in ON state before the readout operation, and in OFF state at the time of the readout operation. The electric charge stored in the capacitor 191 of the charge amplification circuit is reset when the switch 193 is in ON state.

As described above, in the passive pixel circuit, the readout operation double as the normal reset operation. However, an additional reset operation may be intermittently performed by turning on the switch 193 of the charge amplification circuit in a state in which the select/read transistor Tr13 is in ON state similar to the time of the readout operation. In the embodiment, the row scan section 113 and the system control section 116 in FIG. 24 control operation timing so as to like examples of the operation timing to be described later (FIG. 32, FIG. 34 and the like), and therefore even in a case where the passive pixel circuit is employed, the predetermined reset voltage Vrst is intermittently supplied to the storage node N over a period exceeding 1H (horizontal scan) period.

In the passive pixel circuit, for example, a reset switch is separately provided on the vertical signal line 118, and the reset operation may be performed by the switch operation of the reset switch.

[Cross-Section Structure of Pixel]

FIG. 30 illustrates a cross-section structure of a main part (unit pixel 120) of the photoelectric converter 102. Here, as an example, a case in which the unit pixel 120 has a configuration similar to that of the first configuration example of the active pixel circuit (FIG. 26).

In the photoelectric converter 102, a gate electrode 162 composed of Ti, Al, Mo, W, Cr or the like is formed on a insulating substrate 161 such as a glass substrate. A gate dielectric film 163 composed of SiNx, SiO$_2$ or the like is formed on the gate electrode 162. On the gate dielectric film 163, for example, a p-type semiconductor layer (p+ region) 164 (first semiconductor layer) forming a PIN photodiode (photoelectric conversion element PD11) is formed.

The p-type semiconductor layer 164 is also served as a lower electrode for reading signal charge photoelectrically converted by the photoelectric conversion element PD11. On the gate dielectric film 163, a semiconductor layer 165 of a pixel transistor such as amplification transistor Tr12 is further formed. LDDs (Lightly Doped Drains) 165a and 165b are formed between a channel region and a drain/source region in the semiconductor layer 165 for reducing a leakage current. The semiconductor layer 165 is formed of, for example, microcrystalline silicon or polycrystalline silicon.

A first interlayer dielectric film 166 formed of SiNx, SiO$_2$ or the like is provided on the p-type semiconductor layer 164 and the semiconductor layer 165 of the pixel transistor. A wire layer 167 including a readout signal line and various wiring are formed of Ti, Al, Mo, W, Cr or the like on the top part of the first interlayer dielectric film 166. On the wire layer 167, a second interlayer dielectric film 168 formed of SiNx, SiO$_2$, organic dielectric film or the like is provided.

The insulating layer composed of the first and second interlayer dielectric films 166 and 168 is provided with a contact hole 169. A third semiconductor layer (i-type semiconductor layer 170) having conductive type between p-type and n-type is formed on the second interlayer dielectric film 168. The area of the i-type semiconductor layer 170 is larger than the aperture area on the upper side of the contact hole 169. The i-type semiconductor layer 170 is in contact with the p-type semiconductor layer 164 via the contact hole 169.

On the i-type semiconductor layer 170, a second semiconductor layer (for example, an n-type semiconductor layer (n+ region) 171) having the almost same shape as the i-type semiconductor layer 170 is stacked. By the p-type semiconductor layer 164 (first semiconductor layer), the i-type semiconductor layer 170 (third semiconductor layer) and the n-type semiconductor layer 171 (second semiconductor layer), the photoelectric conversion element PD11 (PIN photodiode) is configured. As described above, the photoelectric conversion element PD1 (see FIG. 6) in which the PIN structure is formed in in-plane direction (horizontal direction) has been described as an example in the first embodiment. In the present embodiment, the PIN structure of the photoelectric conversion element PD11 is formed in a stacking direction (a direction perpendicular to the incident direction of light).

Each of the semiconductor layers 164, 170, and 171 of the photoelectric conversion element PD11 is formed of amorphous silicon, microcrystalline silicon, polycrystalline silicon, or the like. Spectral sensitivity may be changed by introducing materials such as germanium or carbon into these silicons. The photoelectric conversion element PD11 may have an inverted structure in which the n-type semiconductor layer is provided on the lower side and the p-type semiconductor layer is provided on the upper side.

An upper electrode 172 for applying a predetermined voltage to the photoelectric conversion element PD11 is formed of a transparent conductive film such as ITO (Indium Tin Oxide) on the n-type semiconductor layer 171. On the upper electrode 172, power supply lines 173 for supplying a voltage to the upper electrode 172 is provided. The power supply line 173 is formed of materials having resistance lower than the transparent conductive film of the upper electrode 172, namely, Ti, Al, Mo, W, Cr, or the like. The power supply lines 173 are provided over the surface of the pixel section 112 in a mesh form, for example, so as to surround the unit pixel 120. A protection film (not illustrated) formed of SiN or the like may be further provided on the upper electrode 172.

[Timing Examples of Readout Operation and Reset Operation]

(First Example of Operation Timing Applied to Active Pixel Circuit)

Figure 31:
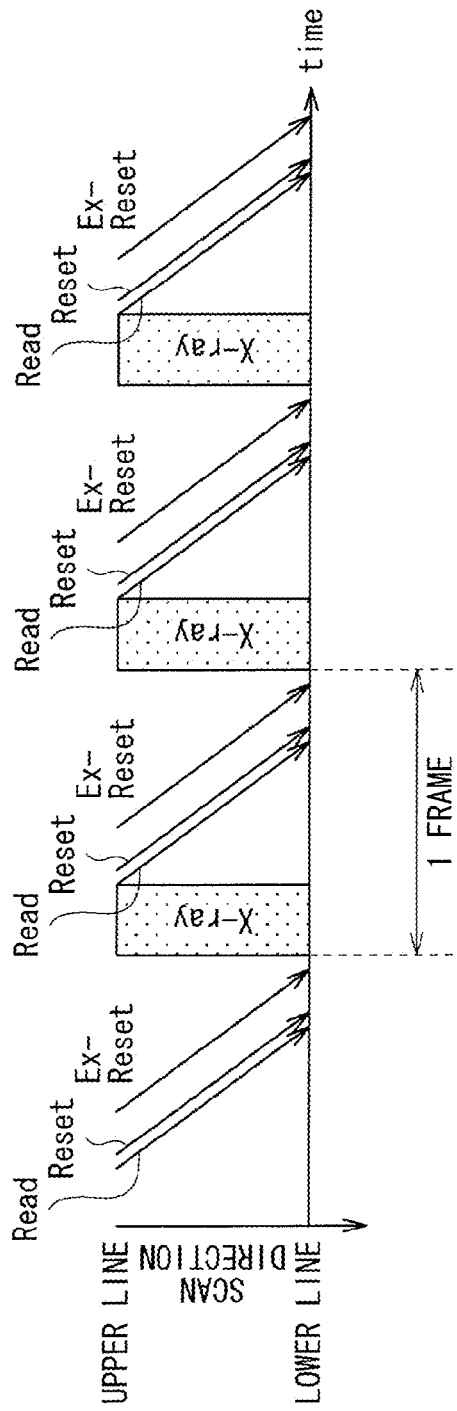
FIG. 31 is an explanatory diagram illustrating a first example of operation timing applied to the active pixel circuit illustrated in FIGS. 26 and 27.
Figure 33:
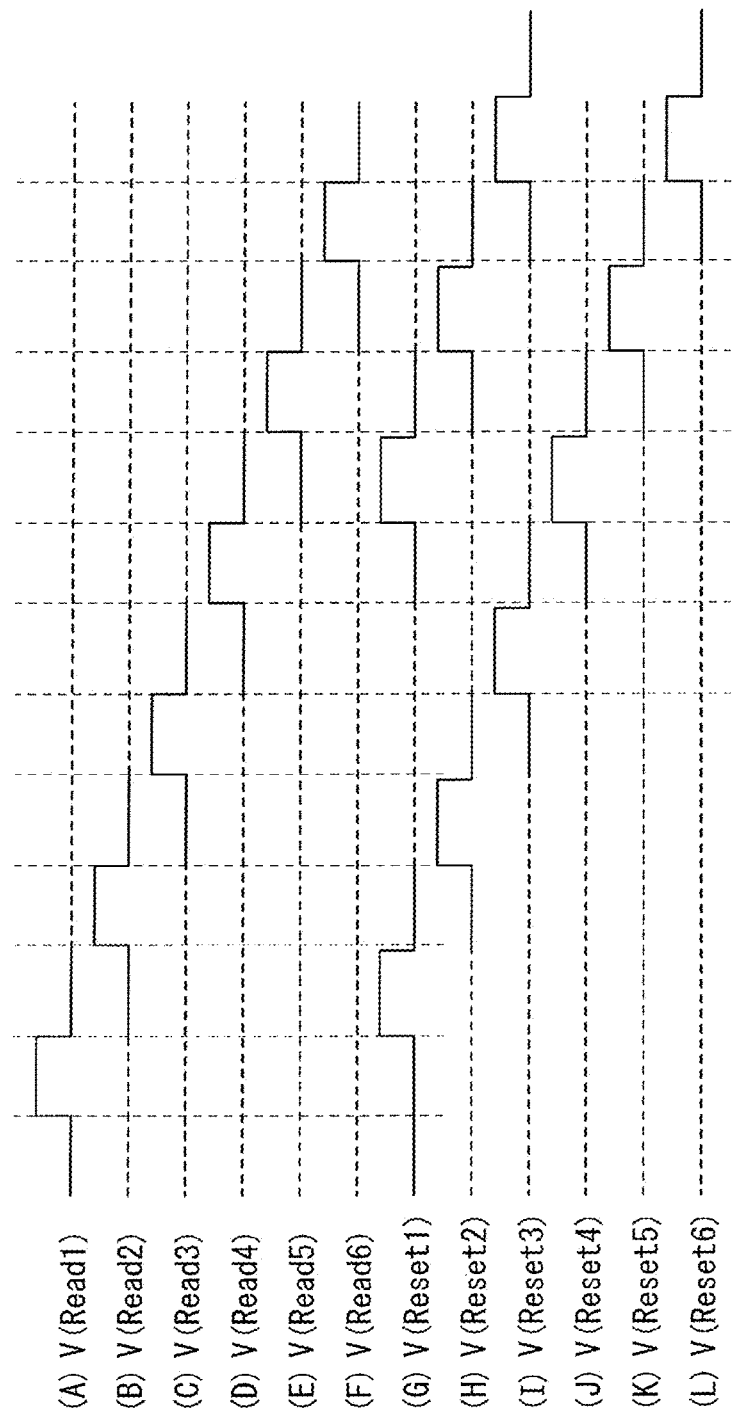
FIG. 33 is a timing chart corresponding to the operation timing illustrated in FIG. 31.

FIG. 31 illustrates a first example of image pickup operation timing of the photoelectric converter 102 with the active pixel circuit illustrated in FIG. 26 and FIG. 27. FIG. 33 illustrates a timing chart corresponding to the operation timing illustrated in FIG. 31. Arrows extending from upper to lower, illustrated in upper part of FIG. 31, schematically illustrate the operation timing of the photoelectric converter 102. The horizontal direction corresponds to time, and the vertical direction corresponds to a scan line of the pixel section 112 (FIG. 24). FIG. 31 illustrates an example of performing the readout operation (scan) line-sequentially from the upper horizontal line to the lower horizontal line. In FIG. 31, "Read" indicates that the readout operation is performed, and "Reset" indicates that the normal (first time) reset operation is performed. "Ex-Reset" indicates that an additional (second time) reset operation is performed during one frame period. "X-ray" indicates an image pickup period (exposure period) in which radiation (for example, X-ray) is irradiated to the pixel section 112.

As illustrated in FIG. 31, while the readout operation is performed sequentially from the upper line to the lower line, the normal (first time) reset operation is performed sequentially from the upper line to the lower line and with a predetermined interval of time. Subsequently, after a predetermined interval of time, the additional (second time) reset operation is performed sequentially from the upper line to the lower line. These operations are performed during one frame period. The readout operation is performed at the time when the read-control signal V(Read) is applied to the gate terminal of the select/read transistor Tr13. The reset operation is performed at the time when the reset-control signal V(Reset) is applied to the gate terminal of the reset transistor Tr11.

In FIG. 33, application timings of the reset-control signals V(Reset) to be applied to the gate terminal of the reset transistor Tr11 and application timings of the read-control signals V(Read) to be applied to the gate terminal of the select/read transistor Tr13 are illustrated for six horizontal lines. For example, the reset-control signal V(Reset) to be applied to the gate terminal of the reset transistor Tr11 on the first horizontal line located on the uppermost side is assumed to V(Reset1), and the reset-control signal V(Reset) to be applied to the gate terminal of the reset transistor Tr11 on the second horizontal line located next to the uppermost line is assumed to V(Reset2). In the operation timing example in FIG. 31 and FIG. 33, the reset operation is performed twice after the readout operation during one frame period. Therefore, voltage pulse signal is intermittently applied twice as the reset-control signal V(Reset) to the gate terminal of the reset transistor Tr11 over a period exceeding 1H (horizontal scan) period. Consequently, the predetermined reset voltage Vrst is intermittently supplied to the storage node N over a period exceeding 1H period.

FIG. 31 illustrates an example of performing the reset operation twice during one frame period. Alternatively, the reset operation may be performed three or more times after the readout operation during one frame period.

(First Example of Operation Timing Applied to Passive Pixel Circuit)

Figure 32:
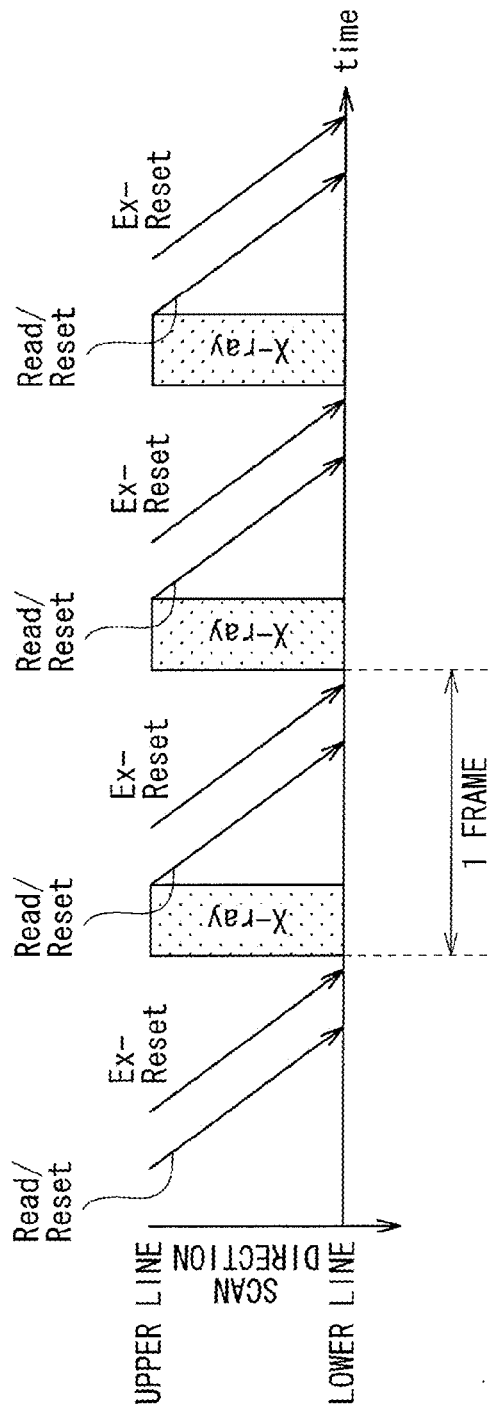
FIG. 32 is an explanatory diagram illustrating a first example of operation timing applied to the passive pixel circuit illustrated in FIGS. 28 and 29.
Figure 34:
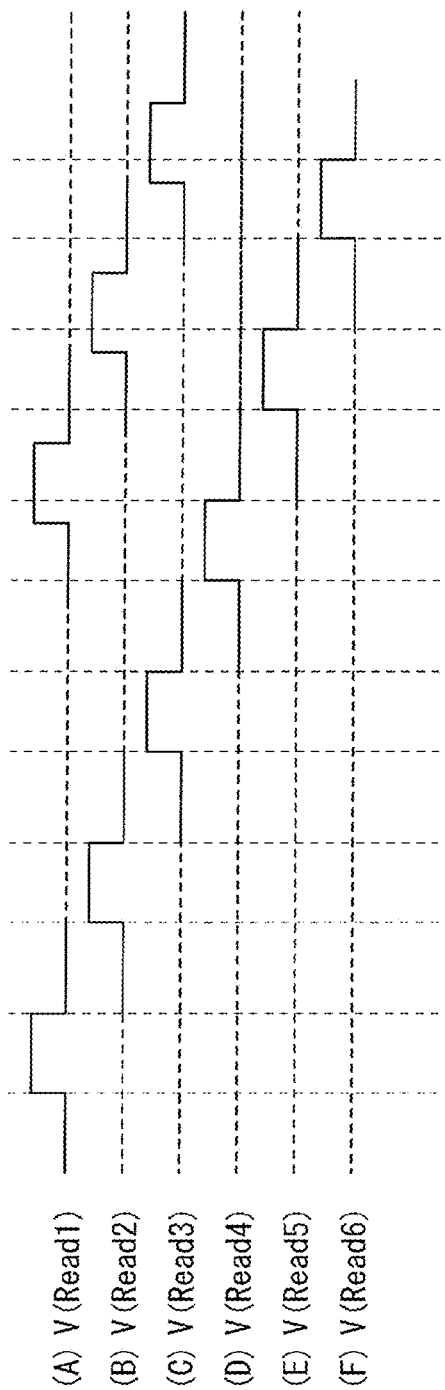
FIG. 34 is a timing chart corresponding to the operation timing illustrated in FIG. 32.

FIG. 32 illustrates a first example of image pickup operation of the photoelectric converter 102 with the passive pixel circuit illustrated in FIG. 28 and FIG. 29. FIG. 34 illustrates a timing chart corresponding to the operation timing illustrated in FIG. 32. FIG. 32 illustrates, similar to the example of FIG. 31, an example of performing the readout operation (scan) line-sequentially from the upper horizontal line to the lower horizontal line. Similar to the example of FIG. 31, "Read" in FIG. 32 indicates that the readout operation is performed, and "Reset" indicates that the normal (first time) reset operation is performed. "Ex-Reset" indicates that the additional (second time) reset operation is performed during one frame period. "X-ray" indicates the image pickup period (exposure period) in which radiation (for example, X-ray) is irradiated to the pixel section 112. Incidentally, in the passive pixel circuit as described above, since the readout operation double as the normal reset operation, the readout operation and the first-time reset operation are indicated at the same timing.

As illustrated in FIG. 32, the readout operation is performed( ) sequentially from the upper line to the lower line. At the same time, the normal (first time) reset operation is performed sequentially from the upper line to the lower line. Subsequently, after a predetermined interval of time, the additional (second time) reset operation is performed sequentially from the upper line to the lower line. These operations are performed during one frame period. As described above, the readout operation is performed when the read-control signal V(Read) is applied to the gate terminal of the select/read transistor Tr13 and the switch 193 of the charge amplification circuit is to be OFF. The additional reset operation is performed when the select/read transistor Tr3 is to be ON similar to the readout operation and the switch 193 of the charge amplification circuit is to be ON.

FIG. 34 illustrates application timings of the read-control signals V(Read) to be applied to the gate terminal of the select/read transistor Tr13 for six horizontal lines. In the operation timing example in FIG. 32 and FIG. 34, the reset operation is performed twice after the readout operation during one frame period. Therefore, the predetermined reset voltage Vrst is intermittently supplied to the storage node N over a period exceeding 1H period.

FIG. 32 illustrates an example of performing the reset operation twice during one frame period. Alternatively, the reset operation may be performed three or more times after the readout operation during one frame period.

(Second Example of Operation Timing Applied to Active Pixel Circuit)

Figure 35:
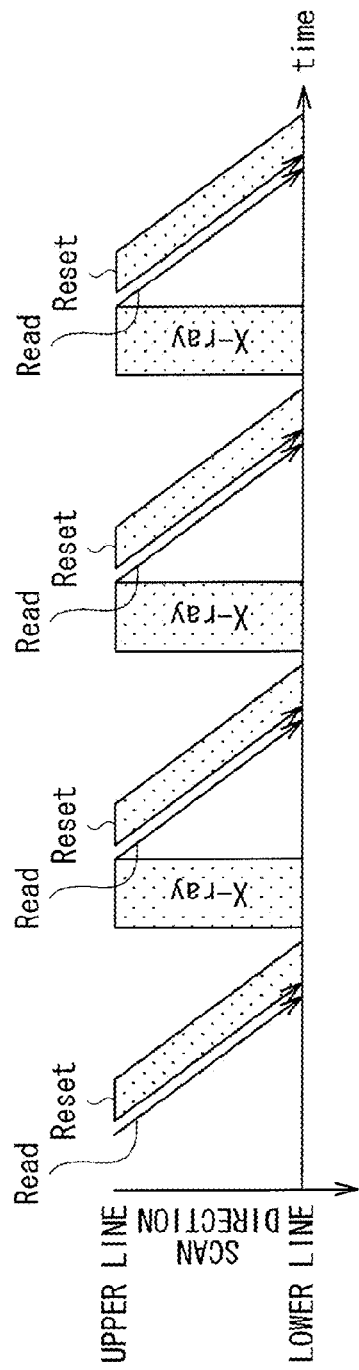
FIG. 35 is an explanatory diagram illustrating a second example of operation timing applied to the active pixel circuit illustrated in FIGS. 26 and 27.
Figure 36:
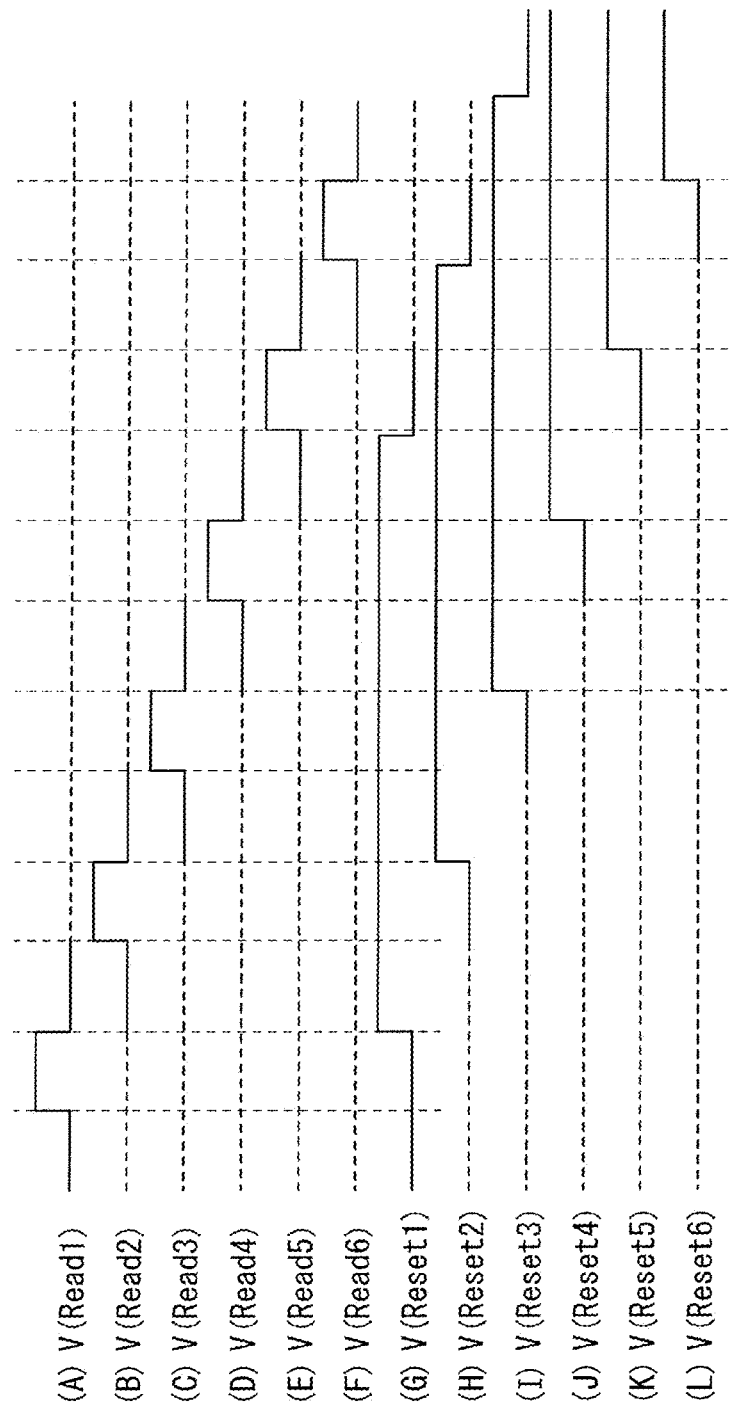
FIG. 36 is a timing chart corresponding to the operation timing illustrated in FIG. 35.

FIG. 35 illustrates a second example of image pickup operation timing of the photoelectric converter 102 with the active pixel circuit illustrated in FIG. 26 and FIG. 27. FIG. 36 illustrates a timing chart corresponding to the operation timing illustrated in FIG. 35. FIG. 35 illustrates, similar to the example of FIG. 31, an example of performing the readout operation (scan) line-sequentially from the upper horizontal line to the lower horizontal line. Similar to the example of FIG. 31, "Read" in FIG. 32 indicates that the readout operation is performed, and "Reset" indicates that the reset operation is performed. "X-ray" indicates the image pickup period (exposure period) in which radiation (for example, X-ray) is irradiated to the pixel section 112.

As illustrated in FIG. 35, while the readout operation is performed sequentially from the upper line to the lower line, the reset operation is performed sequentially from the upper line to the lower line with a predetermined interval of time. FIG. 36 illustrates application timings of the reset-control signals V(Reset) to be applied to the gate terminal of the reset transistor Tr11 and application timings of the read-control signals V(Read) to be applied to the gate terminal of the select/read transistor Tr13 for six horizontal lines similarly to the example of FIG. 33. In the operation timing example of FIG. 35 and FIG. 36, the reset operation is performed only once after the readout operation during one frame period. With the reset operation, the continuous voltage pulse signal is applied to the gate terminal of the reset transistor Tr11 as the reset-control signal V(Reset) over a period exceeding 1H (horizontal scan) period. Consequently, the predetermined reset voltage Vrst is continuously supplied to the storage node N over a period exceeding 1H period.

(Third Example of Operation Timing Applied to Active Pixel Circuit)

Figure 37:
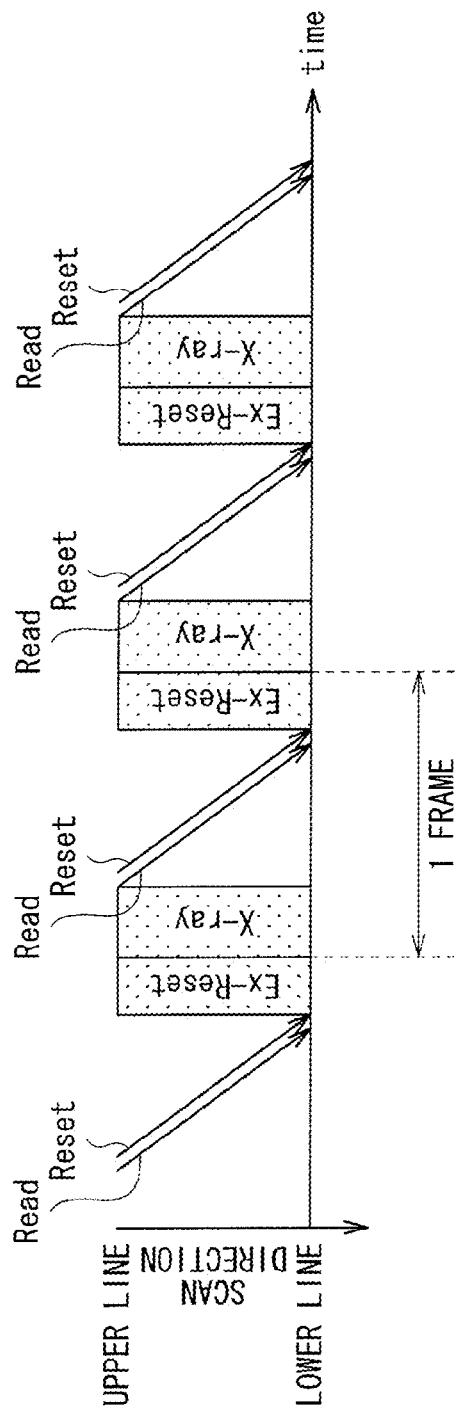
FIG. 37 is an explanatory diagram illustrating a third example of operation timing applied to the active pixel circuit illustrated in FIGS. 26 and 27.

FIG. 37 illustrates a third example of image pickup operation timing of the photoelectric converter 102 with the active pixel circuit illustrated in FIG. 26 and FIG. 27. FIG. 36 illustrates, similar to the example of FIG. 31, an example of performing the readout operation (scan) line-sequentially from the upper horizontal line to the lower horizontal line. Similar to the example of FIG. 31, "Read" in FIG. 32 indicates that the readout operation is performed, and "Reset" indicates that the normal (first time) reset operation is performed. "Ex-Reset" indicates that the additional (second time) reset operation is performed during one frame period. "X-ray" indicates the image pickup period (exposure period) in which radiation (for example, X-ray) is irradiated to the pixel section 112. Consequently, like the operation timing example of FIG. 31 and FIG. 33, the reset operation is performed twice after the readout operation during one frame period. Therefore, voltage pulse signal is intermittently applied twice as the reset-control signal V(Reset) to the gate terminal of the reset transistor Tr11 over a period exceeding 1H (horizontal scan) period. Consequently, the predetermined reset voltage Vrst is intermittently supplied to the storage node N over a period exceeding 1H period.

As illustrated in FIG. 37, while the readout operation is performed sequentially from the upper line to the lower line, the normal (first time) reset operation is performed sequentially from the upper line to the lower line and with a predetermined interval of time. Subsequently, after a predetermined interval of time, the additional (second time) reset operation is performed. In the example of FIG. 31, the second-time reset operation is performed line-sequentially from the upper line to the lower line, whereas in the example of FIG. 37, the reset operation is performed collectively for all pixels. At this time, the reset operation is performed by applying the reset-control signal V(Reset) to the gate terminal of the reset transistor Tr11 for all pixels.

(Second Example of Operation Timing Applied to Passive Pixel Circuit)

Figure 38:
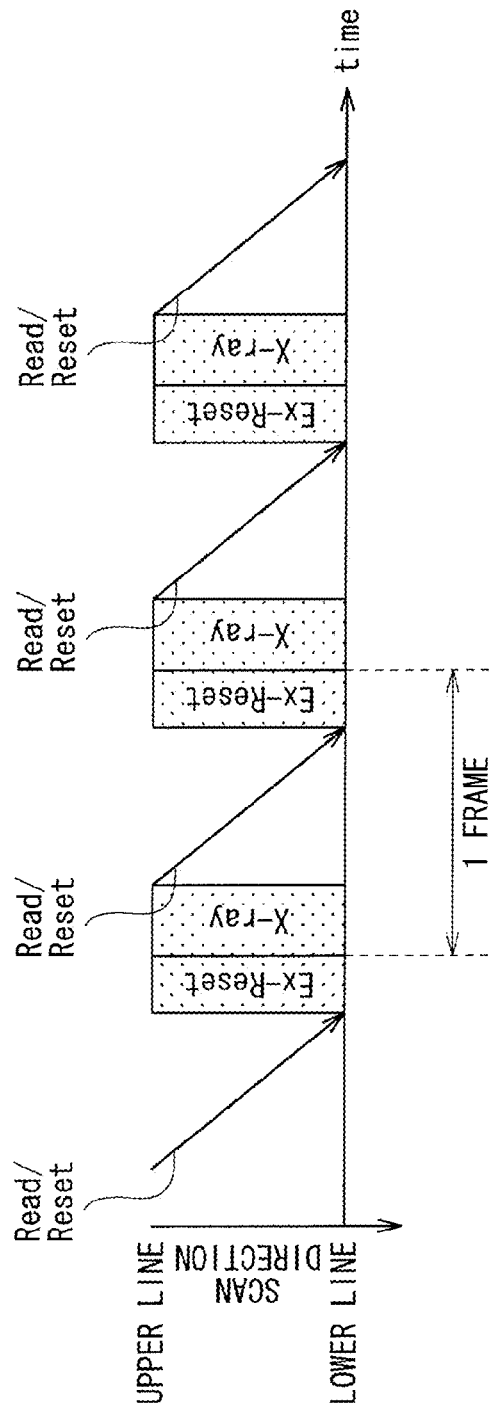
FIG. 38 is an explanatory diagram illustrating a second example of operation timing applied to the passive pixel circuit illustrated in FIGS. 28 and 29.

FIG. 38 illustrates a second example of image pickup operation timing of the photoelectric converter 102 with the passive pixel circuit illustrated in FIG. 28 and FIG. 29. FIG. 38 illustrates, similar to the example of FIG. 31, an example of performing the readout operation (scan) line-sequentially from the upper horizontal line to the lower horizontal line. Similar to the example of FIG. 31, "Read" in FIG. 38 indicates that the readout operation is performed, and "Reset" indicates that the normal (first time) reset operation is performed. "Ex-Reset" indicates that the additional (second time) reset operation is performed during one frame period. "X-ray" indicates the image pickup period (exposure period) in which radiation (for example, X-ray) is irradiated to the pixel section 112. Incidentally, in the passive pixel circuit as described above, since the readout operation double as the normal reset operation, the readout operation and first time reset operation are indicated at the same timing.

As illustrated in FIG. 38, the readout operation is performed sequentially from the upper line to the lower line. At the same time, the normal (first time) reset operation is performed sequentially from the upper line to the lower line. Subsequently, after a predetermined interval of time, the additional (second time) reset operation is performed. In the example of FIG. 32, the second-time reset operation is performed line-sequentially from the upper line to the lower line, whereas in the example of FIG. 38, the reset operation is performed collectively for all pixels. At this time, the reset operation is performed when the select/read transistor Tr3 is to be ON similar to the readout operation and the switch 193 of the charge amplification circuit is to be ON.

[Relation Between Length of Reset Period and Afterimage (Residual Voltage)]

The discussion will be made in terms of relation between the length of a reset period (a period in which the predetermined reset voltage Vrst is supplied to the storage node N) and afterimages (residual voltage) in the radiation image pickup device.

Figure 39:
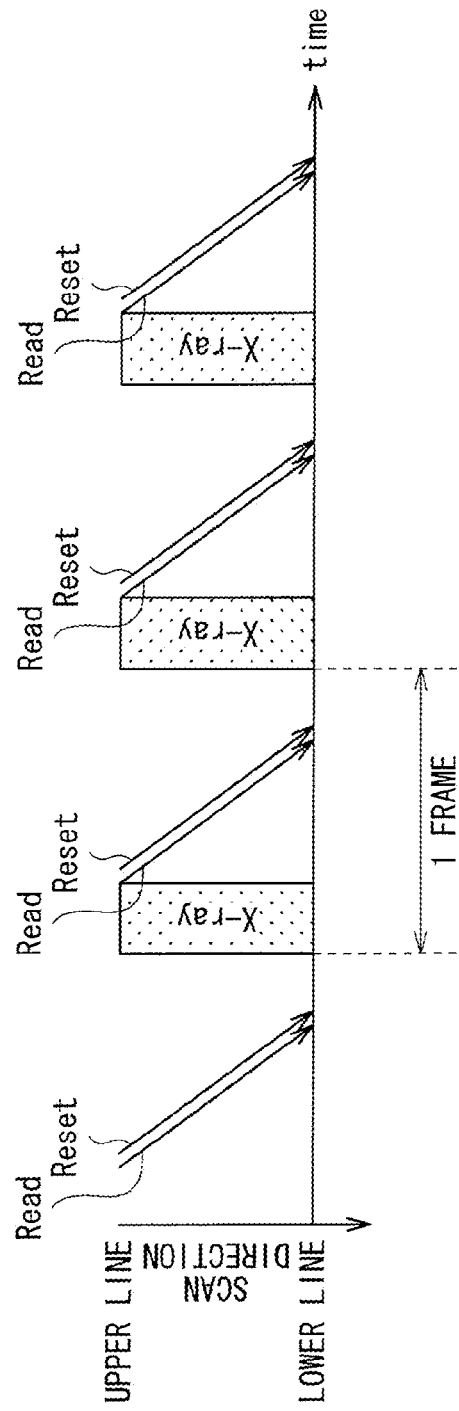
FIG. 39 is an explanatory diagram illustrating a first example of operation timing of a comparative example applied to an active pixel circuit.
Figure 40:
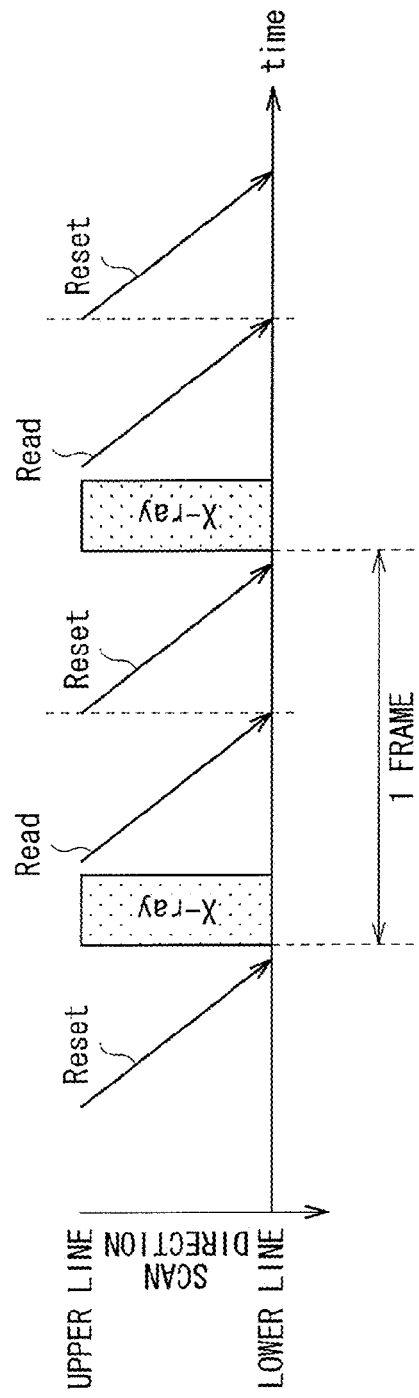
FIG. 40 is an explanatory diagram illustrating a second example of operation timing of the comparative example applied to an active pixel circuit.

FIG. 39 illustrates a first comparative example of operation timing applied to the active pixel circuit. In the first comparative example, the second-time reset operation is omitted from the operation timing example illustrated in FIG. 31. FIG. 40 illustrates a second comparative example of operation timing applied to the active pixel circuit. In the second comparative example, in contrast to the first comparative example of FIG. 39, the reset operation is performed after the readout operation from the upper line to the lower line is all completed.

Figure 41:
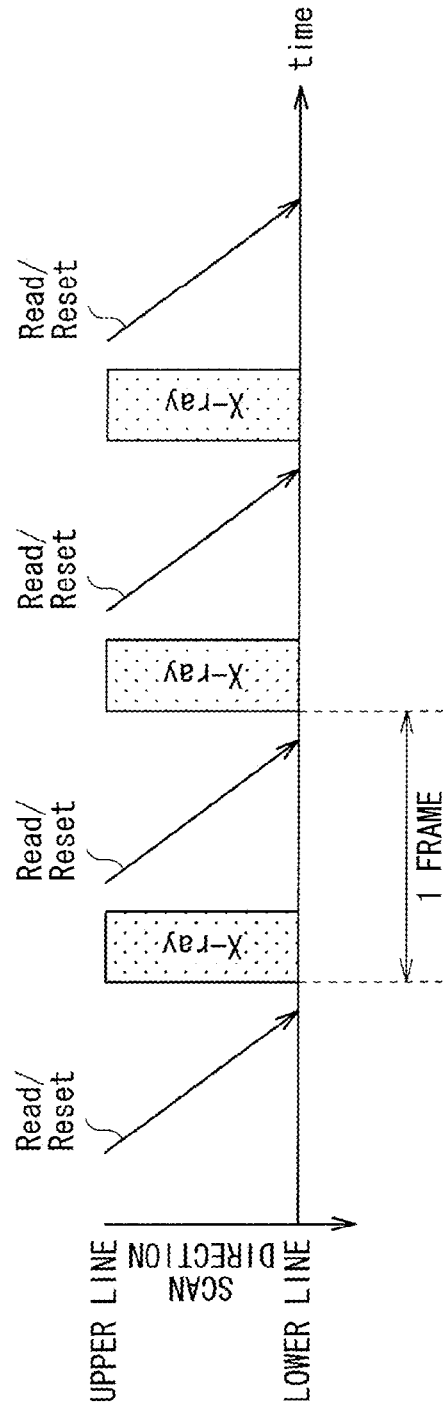
FIG. 41 is an explanatory diagram illustrating a first example of operation timing of a comparative example applied to a passive pixel circuit.

FIG. 41 illustrates a first comparative example of operation timing applied to the passive pixel circuit. In the first comparative example applied to the passive pixel circuit, the second-time reset operation is omitted from the operation example illustrated in FIG. 32.

(Measurement Results of Residual Voltage at Operation Timing in Comparative Examples)

When the radiation image pickup device is operated at the operation timings in these comparative examples, even if the reset operation is completed, afterimages (residual voltage) occur in the output voltage from each pixel. FIG. 45 to FIG. 48 illustrate results obtained by measuring the residual voltage.

Figure 42:
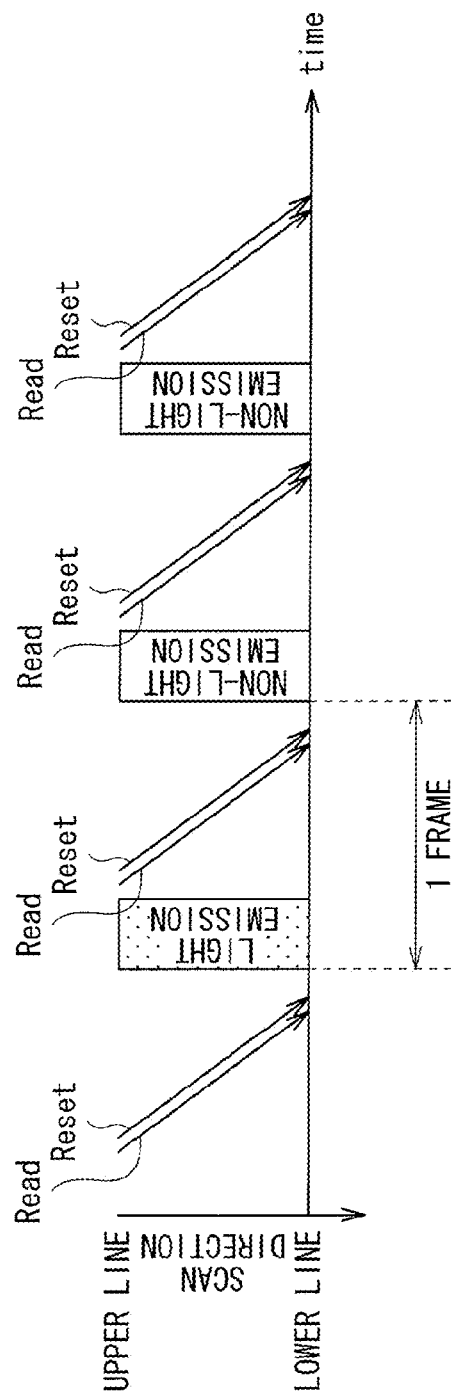
FIG. 42 is an explanatory diagram illustrating operation timing for verifying properties of the active pixel circuit.
Figure 43:
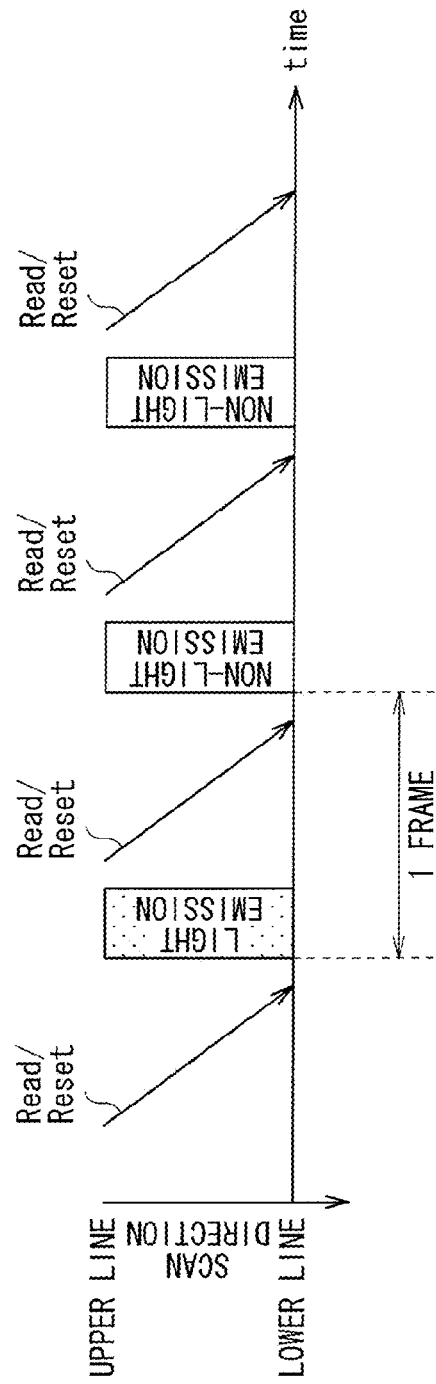
FIG. 43 is an explanatory diagram illustrating operation timing for verifying properties of the passive pixel circuit.
Figure 44:
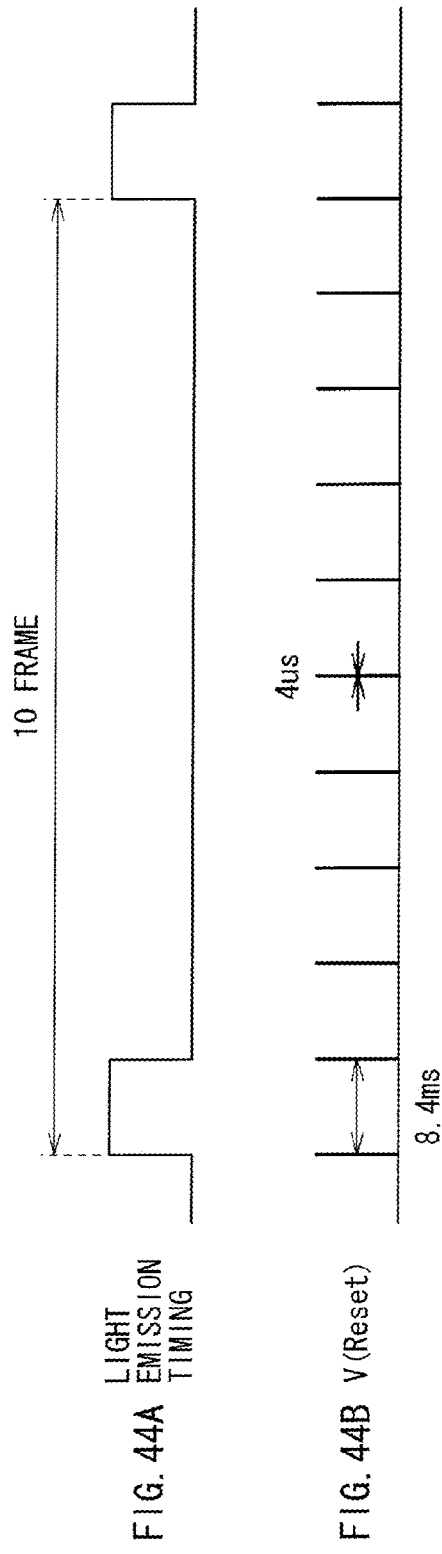
FIG. 44 is a timing chart showing a timing of light irradiation for verifying properties in Part (A), and a timing chart showing application timing of a reset-control signal for verifying properties in Part (B)

FIG. 42 and FIG. 44 illustrate operation timings used in the measurement of the residual voltage. FIG. 42 illustrates operation timing for verifying properties of the active pixel circuit. Although the basic operation timings are similarly to those of the comparative example in FIG. 39, to measure the residual voltage, light irradiation from a light source for measurement (LED) is performed during only first frame of 10 frames as illustrated in FIG. 42 and in Part (A) of FIG. 44, and light irradiation is not performed in the remaining frames. The reset operation is performed for each frame as illustrated in FIG. 42 and in Part (B) of FIG. 44. Incidentally, although the measurement results of the active pixel circuit are illustrated in FIG. 45 to FIG. 48, the similar measurement results may be obtained for the passive pixel circuit. FIG. 43 illustrates operation timing for verifying properties of the passive pixel circuit.

Figure 45:
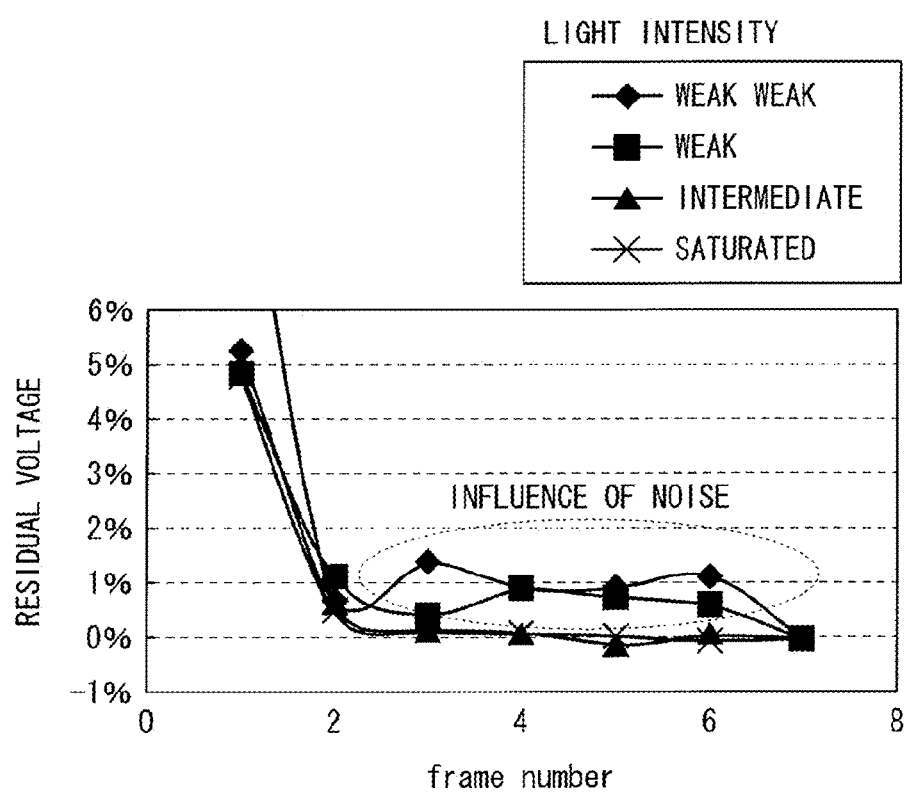
FIG. 45 is a graph showing results obtained by directly measuring output voltages of an active pixel circuit.

FIG. 45 illustrates results obtained by directly measuring the output voltage of the active pixel circuit. The measurement results are obtained by directly measuring the output voltage of the pixel circuit without including the peripheral circuit configuring the radiation image pickup device. The vertical axis indicates a ratio of the residual voltage. The horizontal axis indicates elapsed time corresponding to the number of frames. Here, with reference to the frame at the time of irradiating light, the subsequent frame is assumed to a first frame. In FIG. 45, the amount of light emitted from the measurement light source (light intensity) is measured at four levels. The four levels include a case in which the light intensity is large so that the photoelectric conversion element PD11 is in saturated state, a case in which the light intensity is intermediate, a case in which the light intensity is weak, and a case in which the light intensity is weaker (weak weak). Although the disturbance due to the influence of noise is measured in this measurement, substantially, dependence of the residual voltage depending on the light intensity is hardly observed.

FIG. 46 is a graph showing results obtained by measuring the output voltage of the single pixel circuit, after passing through the amplifier 133, in the second configuration example of the active pixel circuit illustrated in FIG. 27 (configuration example in which the storage node N is located on the cathode electrode (n-type semiconductor region) side of the photoelectric conversion element PD11). FIG. 47 is a graph showing results obtained by measuring the output voltage of the single pixel circuit, after passing through the amplifier 133, in the first configuration example of the active pixel circuit illustrated in FIG. 26 (configuration example in which the storage node N is located on the anode electrode (p-type semiconductor region) side of the photoelectric conversion element PD11). FIG. 45 is measurement results of the pixel circuit incorporated in the radiation image pickup device, whereas FIG. 46 and FIG. 47 are measurement results of the single pixel circuit (single sensor element) not incorporated in the radiation image pickup device. Part (A) of FIG. 46 and Part (A) of FIG. 47 illustrate light emitting timing of the measurement light source, application timing of the reset-control signal V(Reset), and the output voltages in the same figure. Each of Part (B) of FIG. 46 and Part (B) of FIG. 47 is enlarged view of waving portion of the output voltage in each of Part (A) of FIG. 46 and Part (A) of FIG. 47. Each of Part (C) of FIG. 46 and Part (C) of FIG. 47 is enlarged view of waving portion of the output voltage in each of Part (B) of FIG. 46 and Part (B) of FIG. 47. From the measurement results of FIG. 46 and FIG. 47, it is understood that the output voltage is temporarily reset to the predetermined reset voltage at the time when the first-time reset operation is performed after the light irradiation is performed. However, thereafter, the output voltage is not maintained at the predetermined reset voltage and decay occurs in the waveform over a plurality of frames. This tendency occurs regardless of whether the storage node N is located on the cathode electrode (n-type semiconductor region) side or the anode electrode (p-type semiconductor region) side of the photoelectric conversion element PD11.

Figure 48A:
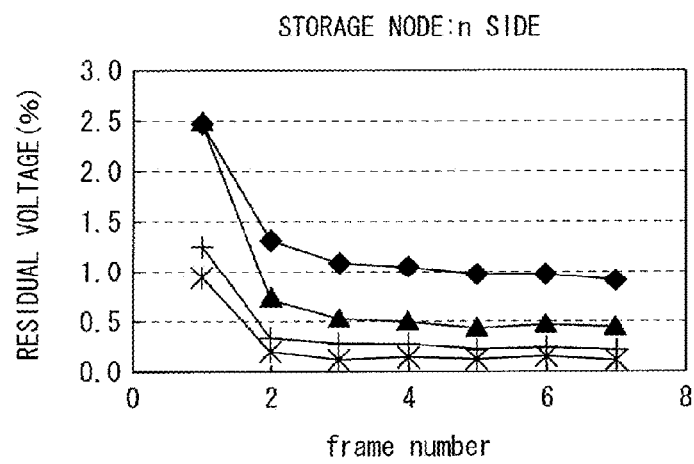
FIGS. 48A and 48B are graphs showing results obtained by directly verifying the output voltages of the single pixel circuit, without passing through an amplifier, in the second configuration example of the active pixel circuit and in the first configuration example of the active pixel circuit, respectively.
Figure 48B:
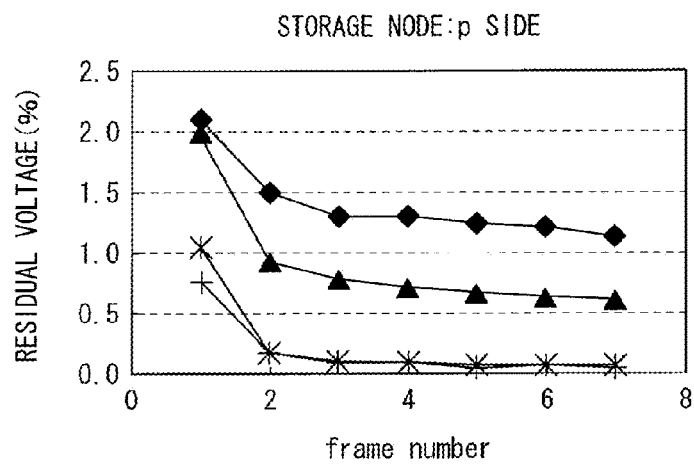

FIG. 48A illustrates results obtained by directly verifying the output voltage of the single pixel circuit without passing through the amplifier 133 in the second configuration example of the active pixel circuit. FIG. 48B illustrates results obtained by directly verifying the output voltage of the single pixel circuit without passing through the amplifier 133 in the first configuration example of the active pixel circuit. In FIG. 48A and FIG. 48B, the vertical axis indicates a ratio of the residual voltage. The horizontal axis indicates elapsed time corresponding to the number of frames. Here, with reference to the frame at the time of irradiating light, the subsequent frame is assumed to a first frame. Like the measurement results of FIG. 46 and FIG. 47, FIG. 48A and FIG. 48B illustrate the measurement results of the single pixel circuit (single sensor element) not incorporated in the radiation image pickup device. In FIG. 48A and FIG. 48B, a plurality of measurement results depending on the manufacturing condition of the element are simultaneously illustrated. In the measurement results of FIG. 48A and FIG. 48B, relatively large residual voltage is observed for about two frame periods after the light irradiation. This tendency occurs regardless of whether the storage node N is located on the cathode electrode (n-type semiconductor region) side (FIG. 48A) or the anode electrode (p-type semiconductor region) side (FIG. 48B) of the photoelectric conversion element PD11.

(Measurement Results of Residual Voltage when Reset Operation is Changed)

Figure 49:
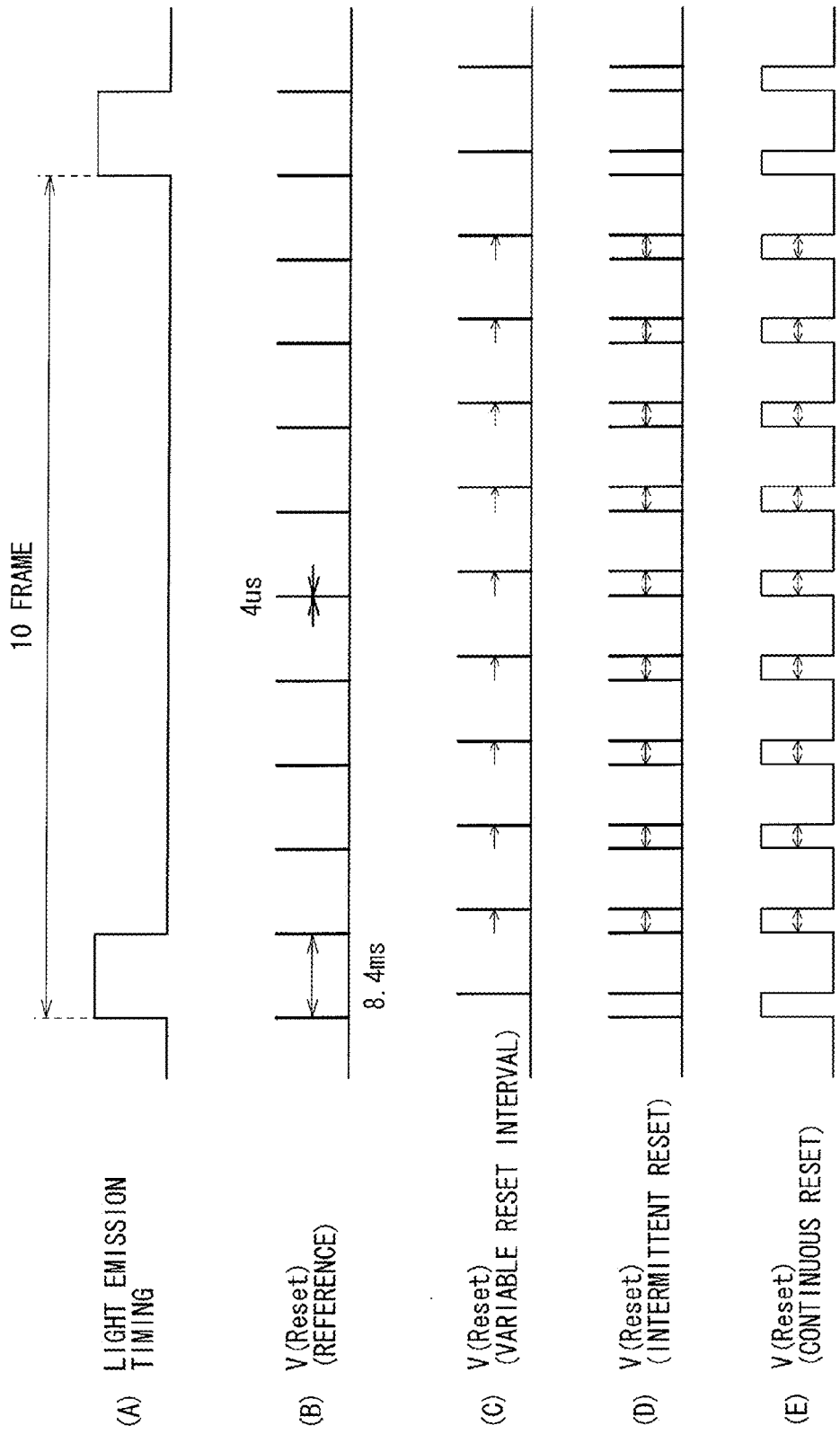
FIG. 49 is an explanatory diagram illustrating operation timing for verifying properties of the active pixel circuit.
Figure 50:
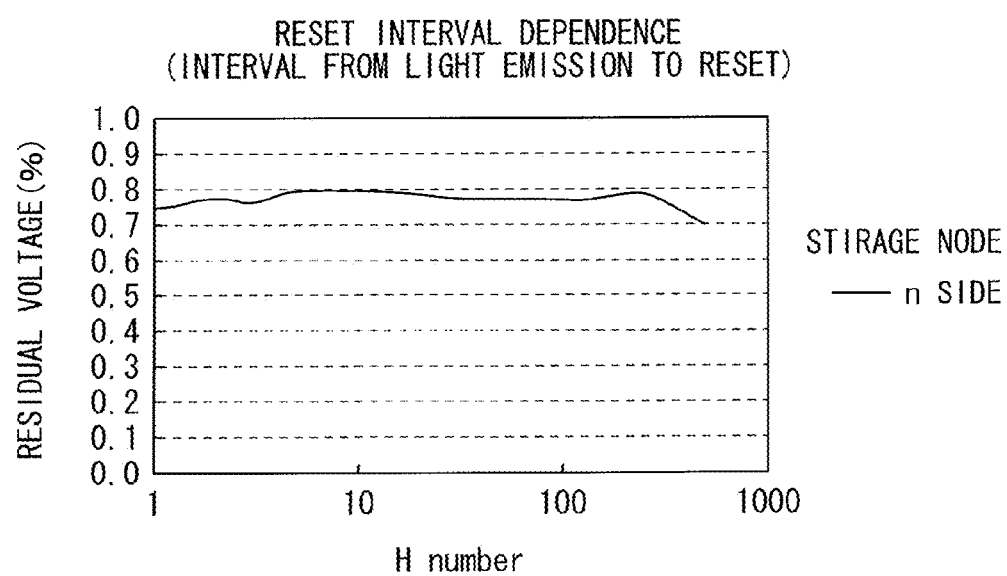
FIG. 50 is a graph showing results obtained by measuring the output voltage in a case in which an application timing of a reset voltage is changed in the active pixel circuit.

The measurement results described above are measured in a case in which the light irradiation by the measurement light source (LED) and the reset operation (application of the reset-control signal V(Reset)) are performed at the timing illustrated in Part(A) and Part (B) of FIG. 49 (FIG. 44). In contrast, as illustrated in Part (C) of FIG. 49, the residual voltage when the timing of performing the reset operation is changed is measured. The results are illustrated in FIG. 50. The period for one reset operation is the same as that illustrated in Part (B) of FIG. 49 (4 μsec). In FIG. 50, the horizontal axis indicates time of the reset interval using, as a unit, H (horizontal scan) period in the image pickup operation of the radiation image pickup device. Here, 1H (horizontal scan) period is equal to 6 μsec. FIG. 50 illustrates measurement results in the second configuration example of the active pixel circuit (configuration example in a case in which the storage node N is located on the cathode electrode (n-type semiconductor region) side of the photoelectric conversion element PD11). As understood from the results of FIG. 50, remarkable change in the characteristics of the residual voltage does not appear only by changing the reset intervals.

Figure 51A:
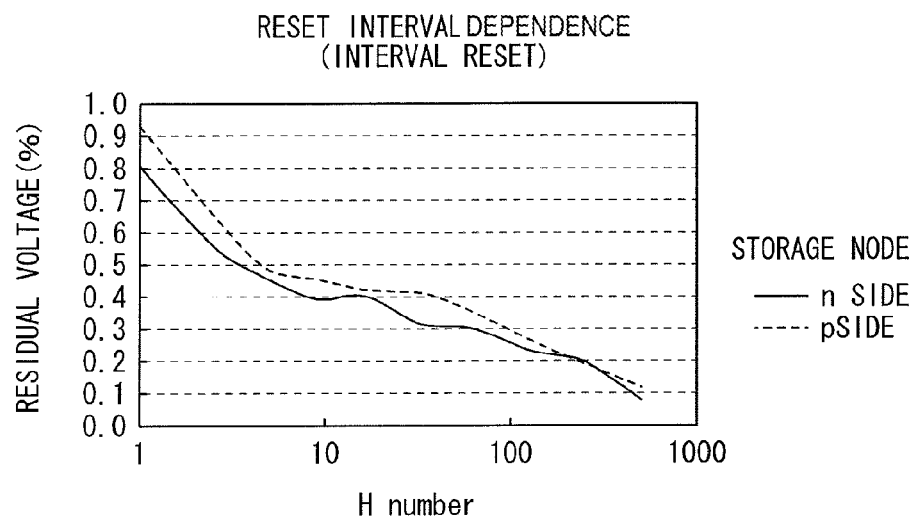
FIGS. 51A and 51B are graphs showing results obtained by measuring the output voltages in the active pixel circuit when the reset voltage is intermittently applied during one frame period and when the reset voltage is continuously applied during one frame period, respectively.

As illustrated in Part (D) of FIG. 49, the residual voltage is measured when the reset operation is performed intermittently twice during one frame period. The results are illustrated in FIG. 51A. The period for one reset operation is the same as that illustrated in Part (B) of FIG. 49 (4 μsec). In FIG. 51A, the horizontal axis indicates time of the reset interval using, as a unit, H (horizontal scan) period in the pickup operation of the radiation image pickup device. Here, 1H (horizontal scan) period is equal to 6 μsec. FIG. 51A illustrates, in the same figure, the measurement results in the second configuration example of the active pixel circuit illustrated in FIG. 27 and the measurement results in the first configuration example of the active pixel circuit illustrated in FIG. 26 (the configuration example in which the storage node N is located on the anode electrode (p-type semiconductor region) side of the photoelectric conversion element PD11). As understood from the results of FIG. 51A, by intermittently performing the reset operation twice, the residual voltage may be reduced. The effect of reducing the residual voltage is obtained by intermittently performing the reset operation over a period exceeding 1H period. Particularly, the residual voltage is reduced to almost half by intermittently performing the reset operation twice with the interval of about 10H periods (60 μsec).

Figure 51B:
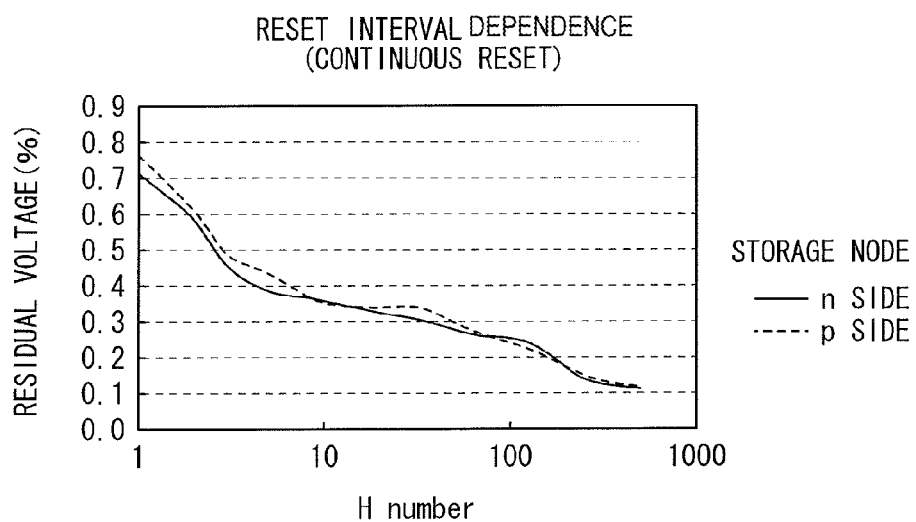

As illustrated in Part (E) of FIG. 49, the residual voltage is measured when the reset operation is continuously performed during one frame period (when the reset voltage is continuously applied). The results are illustrated in FIG. 51B. In FIG. 51B, the horizontal axis indicates time of performing the continuous reset operation using, as a unit, H (horizontal scan) period in the image pickup operation of the radiation image pickup device. Here, 1H (horizontal scan) period is equal to 6 μsec. FIG. 51B illustrates, in the same figure, the measurement results in the second configuration example of the active pixel circuit illustrated in FIG. 27 and the measurement results in the first configuration example of the active pixel circuit illustrated in FIG. 26. As understood from the results of FIG. 51B, by continuously applying the reset voltage, the residual voltage may be reduced. The effect of reducing the residual voltage is obtained by continuously applying the reset voltage over a period exceeding 1H period. Particularly, the residual voltage is reduced to almost half by continuously performing the reset operation over about 10H periods (60 μsec).

As described above, according to the radiation image pickup device of the present embodiment, the predetermined reset voltage is continuously or intermittently supplied to the storage node N over a period exceeding 1H period. Therefore, it may be possible to perform stable detection operation (image-pickup operation) by reliably resetting the electric charge stored in the storage node N so as to reduce afterimages.

<Modification of Second Embodiment>

In the second embodiment, there has been exemplified the indirect type radiation image pickup device photoelectrically converting, by the pixel section 112, light obtained by wavelength conversion of radiation by the wavelength converter 140 (in FIG. 25), however the direct type radiation image pickup device directly converting radiation into electric charge by the pixel section 112 may be provided.

The present application contains subject matter related to that disclosed in Japanese Priority Patent Application JP 2009-270424 filed in the Japan Patent Office on Nov. 27, 2009, and JP 2010-225548 filed on Oct. 5, 2010, the entire content of which is hereby incorporated by references.

It should be understood by those skilled in the art that various modifications, combinations, sub-combinations and alterations may occur depending on design requirements and other factors insofar as they are within the scope of the appended claims or the equivalents thereof.

What is claimed is:

1. A sensor device including a plurality of sensor elements two-dimensionally arranged and a sensor driving section driving the sensor elements, each of the sensor elements comprising:

a photoelectric conversion element that generates electric charge according to an amount of received light;

a charge storage section connected to one end of the photoelectric conversion element and that stores electric charge generated by the photoelectric conversion element;

a readout section that reads either a voltage value resulting from the electric charge stored in the charge storage section or the stored electric charge, to output the read voltage value or the read electric charge as a sensor detection signal; and a reset section that resets the electric charge stored in the charge storage section by supplying a predetermined reset voltage to the charge storage section, wherein, the sensor driving section is configured to control the reset section so that during one frame period the predetermined reset voltage is intermittently supplied to the charge storage section over a period exceeding one horizontal scan period, the reset section is configured to perform a first reset operation and a second reset operation in one frame period, the first reset operation is performed line-sequentially by each horizontal line, and the second reset operation is performed collectively for all of a plurality of the charge storage sections.

2. The sensor device according to claim 1, wherein the photoelectric conversion element includes a non-single-crystal semiconductor layer formed on an insulating substrate, the non-single-crystal semiconductor layer having a PIN structure composed of a p-type semiconductor region, an n-type semiconductor region and an intrinsic semiconductor region formed between the p-type semiconductor region and the n-type semiconductor region.

3. The sensor device according to claim 2, wherein:
the photoelectric conversion element further includes a gate electrode disposed on the insulating substrate to face the intrinsic semiconductor region with a gate dielectric film in between, and
the sensor device is configured such that a voltage applied to the gate electrode lies in the range of a voltage applied to the p-type semiconductor region to a voltage applied to the n-type semiconductor region, both inclusive.

4. The sensor device according to claim 2, wherein:
each of the readout section and the sensor driving section includes a transistor having a semiconductor layer, and
the semiconductor layer and the non-single-crystal semiconductor layer are formed in a common layer level on the insulating substrate.

5. The sensor device according to claim 1, wherein:
the reset section is a reset transistor,
the reset transistor includes a gate terminal to which a reset-control signal for on-off control of the reset transistor is applied, and
the sensor driving section is configured to intermittently apply a pulse signal, as the reset-control signal, twice or more during the period exceeding one horizontal scan period to the gate terminal of the reset transistor, thereby intermittently supplying the predetermined reset voltage to the charge storage section over the period exceeding one horizontal scan period.

6. The sensor device according to claim 1, further comprising:
a backlight that periodically emits illumination light from a rear side of a sensor panel toward a surface of the sensor panel, the sensor panel being provided with the plurality of sensor elements arranged in a matrix form in a predetermined sensor area; and
a signal processing section that detects an object in proximity to the surface of the sensor panel based on a difference between the sensor detection signals obtained from the sensor elements when the sensor elements are radiated with the illumination light from the backlight and the sensor detection signals obtained from the sensor elements when the sensor elements are not radiated with the illumination light.

7. The sensor device according to claim 1, wherein a readout period by the readout section in one horizontal line is overlapped at least partially by a reset period by the reset section in a horizontal line that is other than the one horizontal line.

8. A display device with an input function, the display device including a display panel provided with a plurality of display pixels and a plurality of sensor elements which are two-dimensionally arranged, a display driving section that drives the display pixels, and a sensor driving section that drives the sensor elements, each of the sensor elements comprising:
a photoelectric conversion element that generates electric charge according to an amount of received light;
a charge storage section connected to one end of the photoelectric conversion element and that stores electric charge generated by the photoelectric conversion element;
a readout section that reads either a voltage value resulting from the electric charge stored in the charge storage section or the stored electric charge to output the read voltage value or the read electric charge as a sensor detection signal; and
a reset section that resets the electric charge stored in the charge storage section by supplying a predetermined reset voltage to the charge storage section,
wherein the sensor driving section is configured to control the reset section so that during one frame period the predetermined reset voltage is intermittently supplied to the charge storage section over a period exceeding one horizontal scan period,
the reset section is configured to perform a first reset operation and a second reset operation in one frame period,
the first reset operation is performed line-sequentially by each horizontal line, and
the second reset operation is performed collectively for all of a plurality of the charge storage sections.

9. The display device with the input function according to claim 8, wherein:
the photoelectric conversion element includes a non-single-crystal semiconductor layer formed on an insulating substrate, the non-single-crystal semiconductor layer having a PIN structure composed of a p-type semiconductor region, an n-type semiconductor region and an intrinsic semiconductor region formed between the p-type semiconductor region and the n-type semiconductor region,
each of the readout section and the sensor driving section as well as each of the display pixels and the display driving section includes a transistor having a semiconductor layer, and
the semiconductor layer and the non-single-crystal semiconductor layer are formed in a common layer level on the insulating substrate.

10. The display device with the input function according to claim 8, wherein the sensor driving section is configured to control the reset section so that during one frame period the predetermined reset voltage is intermittently supplied to the charge storage section over a period of 100 μsec or more.

11. An electronic unit comprising the display device with the input function according to claim 8.

12. A radiation image pickup device including a pixel section, which is provided with a plurality of sensor elements two-dimensionally arranged and which generates electric charge in response to incident radiation or light obtained by wavelength conversion of the incident radiation, and a sensor driving section that drives the sensor elements, each of the sensor elements comprising:
a photoelectric conversion element that generates electric charge according to an amount of received light;
a charge storage section connected to one end of the photoelectric conversion element and that stores electric charge generated by the photoelectric conversion element;
a readout section that reads either a voltage value resulted from to the electric charge stored in the charge storage section or the stored electric charge, to output the read voltage value or the read electric charge as a sensor detection signal; and
a reset section that resets the electric charge stored in the charge storage section through supplying a predetermined reset voltage to the charge storage section, wherein
the sensor driving section configured to control the reset section so that during one frame period the predetermined reset voltage is intermittently supplied to the charge storage section over a period exceeding one horizontal scan period, the reset section is configured to perform a first reset operation and a second reset operation in one frame period, the first reset operation is performed line-sequentially by each horizontal line, and the second reset operation is performed collectively for all of a plurality of the charge storage sections.

13. The radiation image pickup device according to claim 12, wherein the photoelectric conversion element has a PIN structure in which a p-type semiconductor region, an n-type semiconductor region and an intrinsic semiconductor region are stacked in a direction perpendicular to a substrate, the intrinsic semiconductor region being formed between the p-type semiconductor region and the n-type semiconductor region.

14. The radiation image pickup device according to claim 12, further comprising a wavelength conversion section that converts the incident radiation into light having a wavelength longer than that of the radiation, wherein,
the pixel section is configured to generate electric charge in response to the light generated by the wavelength conversion section.

15. A method of driving a sensor element, comprising steps of:

providing a plurality of sensor elements two-dimensionally arranged, each of the sensor elements including:

a photoelectric conversion element generating electric charge according to an amount of received light;

a charge storage section connected to one end of the photoelectric conversion element and storing electric charge generated by the photoelectric conversion element;

a readout section reading either a voltage value resulted from the electric charge stored in the charge storage section or the stored electric charge, to output the read voltage value or the read electric charge as a sensor detection signal; and a reset section resetting the electric charge stored in the charge storage section through supplying a predetermined reset voltage to the charge storage section, and controlling the reset section so that during one frame period the predetermined reset voltage is intermittently supplied to the charge storage section over a period exceeding one horizontal scan period, and controlling the reset section to perform a first reset operation and a second reset operation in one frame period, the first reset operation being performed line-sequentially by each horizontal line, and the second reset operation being performed collectively for all of a plurality of the charge storage sections.

* * * * *